US009026236B2

(12) United States Patent
Ishikawa et al.

(10) Patent No.: US 9,026,236 B2
(45) Date of Patent: May 5, 2015

(54) AUDIO SIGNAL PROCESSING APPARATUS, AUDIO CODING APPARATUS, AND AUDIO DECODING APPARATUS

(75) Inventors: Tomokazu Ishikawa, Osaka (JP); Takeshi Norimatsu, Hyogo (JP); Kok Seng Chong, Singapore (SG); Huan Zhou, Singapore (SG); Haishan Zhong, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 714 days.

(21) Appl. No.: 13/256,055

(22) PCT Filed: Oct. 19, 2010

(86) PCT No.: PCT/JP2010/006180

§ 371 (c)(1),
(2), (4) Date: Sep. 12, 2011

(87) PCT Pub. No.: WO2011/048792

PCT Pub. Date: Apr. 28, 2011

(65) Prior Publication Data

US 2012/0022676 A1 Jan. 26, 2012

(30) Foreign Application Priority Data

Oct. 21, 2009 (JP) ................................ 2009-242603
Jan. 13, 2010 (JP) ................................ 2010-005282
Mar. 16, 2010 (JP) ................................ 2010-059784

(51) Int. Cl.

*G06F 17/00* (2006.01)
*G10L 21/04* (2013.01)
*G10L 21/0388* (2013.01)

(52) U.S. Cl.

CPC ............. *G10L 21/04* (2013.01); *G10L 21/0388* (2013.01)

(58) Field of Classification Search

USPC ........................................................ 700/94
See application file for complete search history.

(56) References Cited

U.S. PATENT DOCUMENTS 5,073,938 A 12/1991 Galand
6,199,038 B1 * 3/2001 Tsutsui ......................... 704/229

(Continued)

FOREIGN PATENT DOCUMENTS

CN 1954362 4/2007
CN 1981326 6/2007

(Continued)

OTHER PUBLICATIONS

Extended European Search Report issued Feb. 28, 2014 in corresponding European patent Application No. 13193649.4.

(Continued)

*Primary Examiner* — Paul McCord
(74) *Attorney, Agent, or Firm* — Wenderoth, Lind & Ponack, L.L.P.

(57) ABSTRACT

To provide an audio signal processing apparatus which can perform, with low operation amount, audio signal processing that is either time stretch and/or compression processing or frequency modulation processing. The audio signal processing apparatus is intended to transform an input audio signal sequence using a predetermined adjustment factor. The audio signal processing apparatus includes a filter bank (2601) which transforms the input audio signal sequence into Quadrature Mirror Filter (QMF) coefficients using a filter for Quadrature Mirror Filter analysis (a QMF analysis filter) and an adjusting unit (2602) which adjusts the QMF coefficients based on a predetermined adjustment factor.

22 Claims, 31 Drawing Sheets

(56) References Cited

U.S. PATENT DOCUMENTS

| | | | | |
|---|---|---|---|---|
| 6,680,972 | B1 | 1/2004 | Liljeryd et al. | |
| 6,925,116 | B2 | 8/2005 | Liljeryd et al. | |
| 7,283,955 | B2 | 10/2007 | Liljeryd et al. | |
| 7,328,162 | B2 | 2/2008 | Liljeryd et al. | |
| 7,756,713 | B2 | 7/2010 | Chong et al. | |
| 8,023,525 | B2 * | 9/2011 | Oh et al. | 370/432 |
| 8,069,040 | B2 | 11/2011 | Vos | |
| 8,078,474 | B2 | 12/2011 | Vos et al. | |
| 8,078,475 | B2 | 12/2011 | Tsushima | |
| 8,140,324 | B2 | 3/2012 | Vos et al. | |
| 8,244,526 | B2 | 8/2012 | Vos et al. | |
| 8,260,611 | B2 | 9/2012 | Vos et al. | |
| 8,332,228 | B2 | 12/2012 | Vos et al. | |
| 8,364,494 | B2 | 1/2013 | Vos et al. | |
| 8,484,036 | B2 | 7/2013 | Vos et al. | |
| 8,892,448 | B2 | 11/2014 | Vos et al. | |
| 2003/0182106 | A1 * | 9/2003 | Bitzer et al. | 704/207 |
| 2004/0078194 | A1 | 4/2004 | Liljeryd et al. | |
| 2004/0078205 | A1 | 4/2004 | Liljeryd et al. | |
| 2004/0125878 | A1 | 7/2004 | Liljeryd et al. | |
| 2006/0271356 | A1 | 11/2006 | Vos | |
| 2006/0277038 | A1 | 12/2006 | Vos et al. | |
| 2006/0277039 | A1 | 12/2006 | Vos et al. | |
| 2006/0277042 | A1 | 12/2006 | Vos et al. | |
| 2006/0282262 | A1 | 12/2006 | Vos et al. | |
| 2006/0282263 | A1 | 12/2006 | Vos et al. | |
| 2007/0088541 | A1 | 4/2007 | Vos et al. | |
| 2007/0088542 | A1 | 4/2007 | Vos et al. | |
| 2007/0088558 | A1 | 4/2007 | Vos et al. | |
| 2007/0244706 | A1 | 10/2007 | Tsushima | |
| 2008/0071549 | A1 | 3/2008 | Chong et al. | |
| 2008/0114606 | A1 * | 5/2008 | Ojala et al. | 704/500 |
| 2008/0126086 | A1 | 5/2008 | Vos et al. | |
| 2009/0304198 | A1 | 12/2009 | Herre et al. | |
| 2009/0316568 | A1 * | 12/2009 | Harris et al. | 370/203 |
| 2010/0080397 | A1 | 4/2010 | Suzuki et al. | |
| 2010/0161323 | A1 | 6/2010 | Oshikiri | |
| 2010/0241434 | A1 | 9/2010 | Ono | |
| 2011/0004479 | A1 * | 1/2011 | Ekstrand et al. | 704/500 |
| 2011/0022402 | A1 | 1/2011 | Engdegard et al. | |
| 2011/0099018 | A1 | 4/2011 | Neuendorf et al. | |
| 2013/0090933 | A1 * | 4/2013 | Villemoes et al. | 704/500 |

FOREIGN PATENT DOCUMENTS

| | | |
|---|---|---|
| EP | 0 287 741 | 10/1988 |
| EP | 1 845 699 | 10/2007 |
| EP | 2 093 757 | 8/2009 |
| JP | 2008/102527 | 8/2008 |
| JP | 2010-78915 | 4/2010 |
| TW | 200703237 | 1/2007 |
| TW | 200828269 | 7/2008 |
| WO | 98/57436 | 12/1998 |
| WO | 2007/126015 | 11/2007 |
| WO | 2008/102527 | 8/2008 |
| WO | 2010/003543 | 1/2010 |

OTHER PUBLICATIONS

Lutz Gundel et al., “Aliasing in QMF-Bank Systems with Signal Modifications Between Analysis and Synthesis”, European Conference on Speech Technology, Edinburgh, Sep. 1987, [European Conference on Speech Technology], Edinburgh, CEP Consultants, GB, vol. 2, Sep. 1, 1987, pp. 193-196, XP000093487.

International Search Report issued Dec. 7, 2010 in corresponding International Application No. PCT/JP2010/006180.

Jean Laroche et al., “Improved Phase Vocoder Time-Scale Modification of Audio”, IEEE Transactions on Audio and Speech Processing, vol. 7, No. 3, May 1999, pp. 1-10.

Extended European Search Report issued Aug. 2, 2013 in corresponding European Application No. 10824645.5.

Office Action and Search Report issued Dec. 2, 2014 in Taiwanese Application No. 099135730, with partial English language translation.

* cited by examiner

AUDIO SIGNAL PROCESSING APPARATUS, AUDIO CODING APPARATUS, AND AUDIO DECODING APPARATUS

TECHNICAL FIELD

The present invention relates to an audio signal processing apparatus which digitally processes an audio signal and a speech signal (hereinafter referred to as audio signals as a whole).

BACKGROUND ART

A phase vocoder technique is known as a technique for compressing and stretching an audio signal on a time axis. A phase vocoder apparatus as disclosed in NPL (Non Patent Literature) 1 performs, in a frequency domain, stretch or compression processing (time stretch processing) in a time direction, and pitch transform processing (pitch shift processing), by applying Fast Fourier Transform (FFT) or Short Time Fourier Transform (STFT) on a digital audio signal.

A pitch is also referred to as a pitch frequency, and represents the pitch of a sound. The time stretch processing is processing for stretching or compressing the time length of an audio signal without changing the pitch of the audio signal. The pitch shift processing is an example of frequency modulation processing and is processing for changing the pitch of an audio signal without changing the time length of the audio signal. The pitch shift processing is also referred to as pitch stretch processing.

When the reproduction rate of an audio signal is simply changed, both of the time length and the pitch of the audio signal are changed. On the other hand, when the reproduction rate of an audio signal having a time length stretched or compressed is changed without changing the original pitch, only the pitch of the audio signal may be transformed and the time length of the audio signal is returned to the original time length. For this reason, pitch shift processing may involve time stretch processing. Likewise, time stretch processing may involve pitch shift processing. In this way, the time stretch processing and the pitch shift processing have a relational correspondence.

The time stretch processing makes it possible to change the duration time (reproduction time) of an input audio signal without changing the spectrum characteristics of part of the spectrum signal obtained by performing FFT on the input audio signal. The principal is as indicated below.

(a) The audio signal processing apparatus which executes time stretch processing firstly divides the input audio signal into segments corresponding to constant time intervals, and analyses the segments corresponding to the constant time intervals (for example, for each unit of 1024 samples). At this time, the audio signal processing apparatus processes the input audio signal such that the respective segments are overlapped with at least one of the other segments by a time interval (for example, a unit of 128 samples) that is shorter than and within a unit of time (a time segment). Here, the time interval for overlap is referred to as a hop size.

In FIG. 30A, the hop size of an input signal is denoted as $R_a$. Likewise, an audio signal that is calculated by phase vocoder processing and is to be output is an audio signal divided into segments which are overlapped with at least one of the others by a time interval corresponding to a constant number of samples. In FIG. 30B, the hop size of the audio signal to be output is denoted as $R_s$. $R_s>R_a$ is satisfied when performing a time stretch, and $R_s<R_a$ is satisfied when performing time compression. Here, a description is given of the example of performing the time stretch ($R_s>R_a$). A time stretch rate r is defined according to Expression 1.

[Math. 1]

$$r=\frac{R_a}{R_s} \quad \text{(Expression 1)}$$

(b) As described above, each of time block signals divided into segments corresponding to constant time intervals and partly overlapped with at least one of the others has a temporally coherent pattern in many cases. For this reason, the audio signal processing apparatus performs frequency transform on each time block signal. Typically, the audio signal processing apparatus performs frequency transform on each input time block signal to adjust the phase information. Next, the audio signal processing apparatus returns the frequency domain signal to a time domain signal as the time block signal to be output.

According to the above principle, a classical phase vocoder apparatus performs transform into the frequency domain using STFT, and performs the short time inverse Fourier transform after performing various kinds of adjustment processing in the frequency domain. In this way, time transform and pitch shift processing are performed. Next, the STFT-based processing is described.

(1) Analysis

First, the audio signal processing apparatus executes an analysis window function having a window length of L, for each time block unit including at least one overlap by the hop size $R_a$. More specifically, the audio signal processing apparatus transforms each of the blocks into a frequency domain block using FFT. For example, the frequency characteristics at the point $uR_a$ (u is an element of N) are calculated according to Expression 2.

[Math. 2]

$$X(uR_a,k)=\sum_{m=0}^{L-1}x(uR_a,m)h(m)W_L^{mk}=|X(uR_a,k)|\cdot e^{j\varphi(uR_a,k)} \quad \text{(Expression 2)}$$

Here, h(n) denotes an analysis window function. Also, k denotes a frequency index, and the range is represented according to k=0, . . . , L−1. In addition, $W_L^{mk}$ is calculated according to the following expression.

$$W_L^{mk}=e^{-j2\pi mk/L} \quad \text{[Math. 3]}$$

(2) Adjustment

The calculated phase information of the frequency signal which is the phase information of the frequency signal before being subjected to the adjustment is assumed to be $\phi(uR_a, k)$. In the adjusted phase, the audio signal processing apparatus calculates a frequency component $\omega(uR_a, k)$ having a frequency index k according to the following method.

First, in order to calculate the frequency component $\omega(uR_a, k)$, the audio signal processing apparatus calculates an increment $\Delta\phi_k^u$ between $(u-1)R_a$ and $uR_a$ which are consecutive analysis points, according to Expression 3.

[Math. 4]

$$\Delta\varphi_k^u = \varphi(uR_a, k) - \varphi((u-1)R_a, k) - R_a\Omega_k \left(\Omega_k = \frac{2\pi k}{L}\right) \quad \text{(Expression 3)}$$

Since the increment $\Delta \phi_k^u$ is calculated at a time interval $R_a$, the audio signal processing apparatus can calculate each frequency component ω ($uR_a$, k) according to Expression 4.

[Math. 5]

$$\omega(uR_a, k) = \Omega_k + \frac{\Delta_p\varphi_k^u}{R_a}(\Delta_p\alpha \in [-\pi, \pi)) \quad \text{(Expression 4)}$$

Next, the audio signal processing apparatus calculates the phase at a synthesis point $uR_s$ according to Expression 5.

$$\psi(uR_s,k)=\psi((u-1)R_s,k)+R_s\cdot\omega(uR_a,k) \quad \text{(Expression 5)}$$

(3) Reconstruction

The audio signal processing apparatus calculates, for each frequency index, the amplitude $|X(uR_a, k)|$ of the frequency signal calculated by FFT and the adjusted phase ψ ($uR_s$, k). Next, the audio signal processing apparatus reconstructs the frequency signal into a time signal using the inverse FFT. The reconstruction is executed according to Expression 6.

[Math. 6]

$$\hat{x}(uR_s, m) = \sum_{k=0}^{L-1} |X(uR_a, k)| \cdot e^{j\psi(uR_s,k)} \cdot W_L^{-mk} \cdot h(k) \quad \text{(Expression 6)}$$

The audio signal processing apparatus inserts the reconstructed time block signal into the synthesis point $uR_s$. Next, the audio signal processing apparatus generates a time-stretched signal by performing overlap addition of a current synthesized output signal and the synthesized output signal for the previous block. The overlap addition with the synthesized output of the previous block is as represented by Expression 7.

[Math. 7]

$$y(uR_s+m)=y(uR_s+m)+\hat{x}(uR_s,m)(m=0, \ldots ,L-1) \quad \text{(Expression 7)}$$

These three steps are performed also on an analysis point (u+1) $R_a$. These three steps are repeated for every input signal block. As a result, the audio signal processing apparatus can calculate signals each having a time stretched by a stretch rate of $R_s/R_a$.

Here, in order to modify modulation (temporal fluctuation) in the amplitude direction of the time-stretched signal, a window function h(m) needs to satisfy a power-complementary condition.

Examples of processing corresponding to time stretches include pitch shift processing. The pitch shift processing is a method for changing the pitch of a signal without changing the duration time of the signal. One simple method for changing the pitch of a digital audio signal is to decimate (re-sample) an input signal. The pitch shift processing can be combined with time stretch processing. For example, the audio signal processing apparatus can re-sample an input signal having a time length equal to that of the original input signal after the time stretch processing.

On the other hand, there is an approach for directly calculating the pitch in pitch shift processing. The method for calculating the pitch in pitch shift processing may produce an adverse effect more serious than that in the re-sampling on the time axis, but the details are not mentioned here.

Here, the time stretch processing may be time compression processing depending on a stretch rate. Accordingly, the term "time stretch" means "a time stretch and/or time compression" including the concept of "time compression".

CITATION LIST

Non Patent Literature

[NPL 1]

Improved Phase Vocoder Time—Scale Modification of Audio (IEEE Trans ASP Vol. 7, No. 3, May 1989)

SUMMARY OF INVENTION

Technical Problem

However, as described above, a finer hop size must be set in order to allow a typical phase vocoder apparatus which performs FFT and inverse FFT to perform a high-quality time stretch. This requires that FFT processing and inverse FFT processing are performed huge number of times, and thus the operation amounts are large.

In addition, the audio signal processing apparatus may perform processing different from time stretch processing, after the time stretch processing. In this case, the audio signal processing apparatus needs to transform a signal in a time domain into a signal in a domain for analysis. Examples of such domains for analysis include a Quadrature Mirror Filter (QMF) domain having components on both the time axis direction and the frequency axis direction. With the components on both the time axis direction and the frequency axis direction, the QMF domain is also referred to as a hybrid complex domain, a hybrid time-frequency domain, a sub-band domain, a frequency sub-band domain, etc.

In general, the complex QMF filter bank is one approach for transforming a signal in a time domain into a signal in a hybrid complex domain which has components both on the time axis and the frequency axis. The QMF filter bank is typically used for the Spectral Band Replication (SBR) technique, and parametric-based audio coding methods such as Parametric Stereo (PS) and Spatial Audio Coding (SAC). The QMF filter banks used in these coding methods have characteristics of over-sampling, by double, a signal in a frequency domain represented using a complex value for each sub-band. This is a technical specification for processing a signal in a sub-band frequency domain without causing aliasing.

This is described below in detail. A QMF analysis filter bank transforms a discrete time signal x(n) of a real value of an input signal into a complex signal $s_k(n)$ of a sub-band frequency domain. Here, $s_k(n)$ is calculated according to Expression 8.

[Math. 8]

$$s_k(n) = \sum_{l=0}^{L-1} x(M \cdot n - l)p(l)e^{j\frac{\pi}{M}(k+0.5)(l+\alpha)} \quad \text{(Expression 8)}$$

Here, p(n) is an impulse response of an L−1-order prototype filter having low-pass characteristics. Here, α denotes a phase parameter, and M denotes the number of sub-bands. In addition, k denotes an index of a sub-band, and k=0.1, . . . , M−1.

Here, each of signal segments divided by the QMF analysis filter bank into signals of sub-band domains is referred to as a QMF coefficient. In many cases in a parametric coding approach, QMF coefficients are adjusted at a pre-stage of synthesis processing.

The QMF synthesis filter bank calculates sub-band signals $s'_k(n)$ by padding 0 on each of starting M coefficients among the QMF coefficients (or by embedding 0 into the same). Next, the QMF synthesis filter bank calculates a time signal x'(n) according to Expression 9.

[Math. 9]

$$x'(n) = 2\Re\left\{\sum_{k=0}^{M-1}\sum_{l=0}^{L-1} s'_k(n-l)p(l)e^{-j\frac{\pi}{M}(k+0.5)(l+\beta)}\right\} \quad \text{(Expression 9)}$$

Here, β denotes a phase parameter.

In the above case, each of a linear phase prototype filter factor p(n) and a phase parameter are designed to have a real value such that the real value signal x(n) of an input almost satisfies a reconstruction (perfect reconstruction) enabling condition.

As described above, the QMF transform is a transform into a mixture of the time axis direction and the frequency axis direction. In other words, it is possible to extract the frequency components included in a signal and a time-series variation in the frequency. In addition, it is possible to extract the frequency components for each sub-band and each unit of time. Here, the unit of time is referred to as a time slot.

FIG. 31 illustrates this in detail. A real-number input signal is divided into blocks each having a length L and being overlapped by a hop size M. In the QMF analysis processing, each block is transformed into a block including M complex sub-band signals each of which corresponds to a single time slot (the upper column of FIG. 31). In this way, L number of samples of time domain signals is transformed into L number of complex QMF coefficients. As shown in the middle column of FIG. 31, each of these complex QMF coefficients is composed of a combination of one of L/M time slots and one of M sub-bands. Each time slot is synthesized into the M real-number time signals in QMF synthesis processing using the QMF coefficients for the (L/M−1) time slots that proceed the current time slot (the bottom column of FIG. 31).

As in the earlier-described STFT, the audio signal processing apparatus can calculate a frequency signal at a moment in the QMF domain by the original combination of the time resolution and the frequency resolution.

In addition, the audio signal processing apparatus can calculate the phase difference between the phase information of a time slot and the phase information of an adjacent time slot, based on the complex QMF coefficient block composed of the L/M time slots and the M sub-bands. For example, the phase difference between the phase information of a time slot and the phase information of an adjacent time slot is calculated according to Expression 10.

$$\Delta\phi(n,k)=\phi(n,k)-\phi(n-1,k) \quad \text{(Expression 10)}$$

Here, φ(n, k) denotes phase information. In addition, n denotes a time slot index, and n=0, 1, . . . , L/M−1. In addition, k denotes a sub-band index, and k=0, 1, . . . , M−1.

In some cases, an audio signal is processed in such a QMF domain after being subjected to time stretch processing.

However, in this case, the audio signal processing apparatus is required to perform processing of transforming a signal in a time domain into a signal in the QMF domain, in addition to the time stretch processing that involves FFT processing and inverse FFT processing each requiring a large operation amount. In this case, the operation amount is further increased.

In view of this, the present invention has an object to provide an audio signal processing apparatus which can execute audio signal processing with a low operation amount.

Solution to Problem

In order to solve the aforementioned problem, an audio signal processing apparatus according to the present invention which transforms an input audio signal sequence using a predetermined adjustment factor includes: a filter bank which transforms the input audio signal sequence into Quadrature Mirror Filter (QMF) coefficients using a filter for Quadrature Mirror Filter analysis (a QMF analysis filter); and an adjusting unit configured to adjust the QMF coefficients depending on the predetermined adjustment factor.

In this way, the audio signal processing is executed in the QMF domain. Since no conventional audio signal processing that requires a large operation amount is performed, the operation amount is reduced.

In addition, the adjusting unit may be configured to adjust the QMF coefficients depending on the predetermined adjustment factor indicating a predetermined time stretch or compression rate such that the input audio signal sequence having time stretched or compressed at the predetermined time stretch or compression rate can be obtained from the adjusted QMF coefficients.

In this way, the processing corresponding to a time stretch and/or time compression of the audio signal is executed in the QMF domain. Since no conventional time stretch and/or compression processing that requires a large operation amount is performed, the operation amount is reduced.

In addition, the adjusting unit may be configured to adjust the QMF coefficients depending on the predetermined adjustment factor indicating a predetermined frequency modulation rate such that the input audio signal sequence having a frequency modulated at the predetermined frequency modulation rate can be obtained from the adjusted QMF coefficients.

In this way, the processing corresponding to frequency modulation of the audio signal is executed in the QMF domain. Since no conventional frequency modulation processing that requires a large operation amount is performed, the operation amount is reduced.

In addition, the filter bank may perform sequential transform of the input audio signal sequence into the QMF coefficients in units of time intervals of input audio signals of the input audio signal sequence to generate the QMF coefficients based on the time intervals, and the adjusting unit may include: a calculating circuit which calculates phase information for each of combinations of one of time slots and one of sub-bands of the QMF coefficients generated based on the time intervals; and an adjusting circuit which adjusts the QMF coefficients by adjusting the phase information for each combination of the time slot and the sub-band, depending on the predetermined adjustment factor.

In this way, the phase information of the QMF coefficient is adaptively adjusted according to the adjustment factor.

In addition, the adjusting circuit may adjust the phase information for each time slot, by adding, for each sub-band, (a) a value calculated depending on the phase information of a starting time slot of the QMF coefficients and the predetermined adjustment factor to (b) the phase information for each time slot.

In this way, the phase information is adaptively adjusted for each time slot according to the adjustment factor.

In addition, the calculating circuit may further calculate amplitude information for each combination of the time slot and the sub-band of the QMF coefficients generated based on the time intervals, and the adjusting circuit may adjust the QMF coefficients by adjusting the amplitude information for each combination of the time slot and the sub-band, depending on the predetermined adjustment factor.

In this way, the amplitude information of the QMF coefficient is adaptively adjusted according to the adjustment factor.

In addition, the adjusting unit may further include a bandwidth restricting unit configured to extract, from the QMF coefficients, new QMF coefficients corresponding to a predetermined bandwidth, either before or after the adjustment of the QMF coefficients.

In this way, only the QMF coefficient of the necessary frequency bandwidth is obtained.

In addition, for each sub-band, the adjusting unit may be configured to adjust the QMF coefficients by weighting a rate for the adjustment of the QMF coefficients.

In this way, the QMF coefficient is adaptively adjusted according to the frequency bandwidth.

In addition, the adjusting unit may further include a domain transformer which transforms the QMF coefficients into new QMF coefficients having a different time resolution and a different frequency resolution, either before or after the adjustment of the QMF coefficients.

In this way, the QMF coefficients are transformed into QMF coefficients having sub-bands of which number is suitable for the processing.

In addition, the adjusting unit may be configured to adjust the QMF coefficients by detecting a transient component included in the QMF coefficients before being subjected to the adjustment, extracting the detected transient component from the QMF coefficients before being subjected to the adjustment, adjusting the extracted transient component, and returning the adjusted transient component to the adjusted QMF coefficients.

In this way, the influence of transient components undesirable for the time stretch processing is suppressed.

In addition, the audio signal processing apparatus may further include: a high frequency generating unit configured to generate, from the adjusted QMF coefficients by using a predetermined transform factor, high frequency coefficients that are new QMF coefficients corresponding to a frequency bandwidth higher than a frequency bandwidth corresponding to the QMF coefficients before being subjected to the adjustment; and a high frequency complementing unit configured to complement a coefficient of a bandwidth without any high frequency coefficients using the high frequency coefficients partly corresponding to adjacent bandwidths at both sides of the bandwidth without any high frequency coefficients, the bandwidth without any high frequency coefficients being a bandwidth which is included in the high frequency bandwidth and for which no high frequency coefficients has been generated by the high frequency generating unit.

In this way, the QMF coefficient corresponding to the high frequency band is obtained.

Furthermore, an audio coding apparatus according to the present invention which codes a first audio signal sequence includes: a first filter bank which transforms the first audio signal sequence into first Quadrature Mirror Filter (QMF) coefficients using a filter for Quadrature Mirror Filter analysis (a QMF analysis filter); a down-sampling unit configured to down-sample the first audio signal sequence to generate a second audio signal sequence; a first coding unit configured to code the second audio signal sequence; a second filter bank which transforms the second audio signal sequence into second QMF coefficients using the QMF analysis filter; an adjusting unit configured to adjust the second QMF coefficients depending on the predetermined adjustment factor; a second coding unit configured to generate a parameter to be used for decoding by comparing the first QMF coefficients and the adjusted second QMF coefficients, and code the parameter; and a superimposing unit configured to superimpose the coded second audio signal sequence and the coded parameter.

In this way, the audio signal is coded according to the audio signal processing in the QMF domain. Since no conventional audio signal processing that requires a large operation amount is performed, the operation amount is reduced. In addition, the QMF coefficient obtained by the audio signal processing in the QMF domain is used in the later-stage processing without being transformed into an audio signal in a time domain. Accordingly, the operation amount is further reduced.

Furthermore, an audio decoding apparatus according to the present invention which decodes a first audio signal sequence in an input bitstream includes: a demultiplexing unit configured to demultiplex the input bitstream into a coded parameter and a coded second audio signal sequence; a first decoding unit configured to decode the coded parameter; a second decoding unit configured to decode the coded second audio signal sequence; a first filter bank which transforms the second audio signal sequence decoded by the second decoding unit into Quadrature Mirror Filter (QMF) coefficients using a filter for Quadrature Mirror Filter analysis (a QMF analysis filter); an adjusting unit configured to adjust the QMF coefficients depending on a predetermined adjustment factor; a high frequency generating unit configured to generate, from the adjusted QMF coefficients by using the decoded parameter, high frequency coefficients that are new QMF coefficients corresponding to a frequency bandwidth higher than a frequency bandwidth corresponding to the QMF coefficients before being subjected to the adjustment; and a second filter bank which transforms the high frequency coefficients and the QMF coefficients before being subjected to the adjustment into the first audio signal sequence in a time domain, using a filter for Quadrature Mirror Filter synthesis (a QMF synthesis filter).

In this way, the audio signal is decoded according to the audio signal processing in the QMF domain. Since no conventional audio signal processing that requires a large operation amount is performed, the operation amount is reduced. In addition, the QMF coefficient obtained by the audio signal processing in the QMF domain is used in the later-stage processing without being transformed into an audio signal in the time domain. Accordingly, the operation amount is further reduced.

Furthermore, an audio signal processing method according to the present invention which is for transforming an input audio signal sequence using a predetermined adjustment factor includes: transforming the input audio signal sequence into Quadrature Mirror Filter (QMF) coefficients using a filter for Quadrature Mirror Filter analysis (a QMF analysis filter); and adjusting the QMF coefficients depending on the predetermined adjustment factor.

In this way, the audio signal processing apparatus according to the present invention is implemented as the audio signal processing method.

Furthermore, an audio coding method according to the present invention which is for coding a first audio signal sequence includes: transforming the first audio signal sequence into first Quadrature Mirror Filter (QMF) coefficients using a filter for Quadrature Mirror Filter analysis (a QMF analysis filter); down-sampling the first audio signal sequence to generate a second audio signal sequence; coding the second audio signal sequence; transforming the second audio signal sequence into second QMF coefficients using the QMF analysis filter; adjusting the second QMF coefficients depending on the predetermined adjustment factor; generating a parameter to be used for decoding by comparing the first QMF coefficients and the adjusted second QMF coefficients, and coding the parameter; and superimposing the coded second audio signal sequence and the coded parameter.

In this way, the audio coding apparatus according to the present invention is implemented as the audio coding method.

Furthermore, an audio decoding method according to the present invention which is for decoding a first audio signal sequence in an input bitstream includes: demultiplexing the input bitstream into a coded parameter and a coded second audio signal sequence; decoding the coded parameter; decoding the coded second audio signal sequence; transforming the second audio signal sequence decoded in the decoding into Quadrature Mirror Filter (QMF) coefficients using a filter for Quadrature Mirror Filter analysis (a QMF analysis filter); adjusting the QMF coefficients depending on a predetermined adjustment factor; generating, from the adjusted QMF coefficients by using the decoded parameter, high frequency coefficients that are new QMF coefficients corresponding to a frequency bandwidth higher than a frequency bandwidth corresponding to the QMF coefficients before being subjected to the adjustment; and transforming the high frequency coefficients and the QMF coefficients before being subjected to the adjustment into the first audio signal sequence in a time domain, using a filter for Quadrature Mirror Filter synthesis (a QMF synthesis filter).

In this way, the audio decoding apparatus according to the present invention is implemented as the audio decoding method.

Furthermore, a program according to the present invention causes a computer to execute the audio signal processing method.

In this way, the audio signal processing method according to the present invention is implemented as the program.

Furthermore, a program according to the present invention causes a computer to execute the audio coding method.

In this way, the audio coding method according to the present invention is implemented as the program.

Furthermore, a program according to the present invention causes a computer to execute the audio decoding method.

In this way, the audio decoding method according to the present invention is implemented as the program.

Furthermore, an integrated circuit according to the present invention which transforms an input audio signal sequence using a predetermined adjustment factor includes: a filter bank which transforms the input audio signal sequence into Quadrature Mirror Filter (QMF) coefficients using a filter for Quadrature Mirror Filter analysis (a QMF analysis filter); and an adjusting unit configured to adjust the QMF coefficients depending on the predetermined adjustment factor.

In this way, the audio signal processing apparatus according to the present invention is implemented as the integrated circuit.

Furthermore, an integrated circuit apparatus according to the present invention which codes a first audio signal sequence includes: a first filter bank which transforms the first audio signal sequence into first Quadrature Mirror Filter (QMF) coefficients using a filter for Quadrature Mirror Filter analysis (a QMF analysis filter); a down-sampling unit configured to down-sample the first audio signal sequence to generate a second audio signal sequence; a first coding unit configured to code the second audio signal sequence; a second filter bank which transforms the second audio signal sequence into second QMF coefficients using the QMF analysis filter; an adjusting unit configured to adjust the second QMF coefficients depending on the predetermined adjustment factor; a second coding unit configured to generate a parameter to be used for decoding by comparing the first QMF coefficients and the adjusted second QMF coefficients, and code the parameter; and a superimposing unit configured to superimpose the coded second audio signal sequence and the coded parameter.

In this way, the audio coding apparatus according to the present invention is implemented as the integrated circuit.

Furthermore, an integrated circuit apparatus according to the present invention which decodes a first audio signal sequence in an input bitstream includes: a demultiplexing unit configured to demultiplex the input bitstream into a coded parameter and a coded second audio signal sequence; a first decoding unit configured to decode the coded parameter; a second decoding unit configured to decode the coded second audio signal sequence; a first filter bank which transforms the second audio signal sequence decoded by the second decoding unit into Quadrature Mirror Filter (QMF) coefficients using a filter for Quadrature Mirror Filter analysis (a QMF analysis filter); an adjusting unit configured to adjust the QMF coefficients depending on a predetermined adjustment factor; a high frequency generating unit configured to generate, from the adjusted QMF coefficients by using the decoded parameter, high frequency coefficients that are new QMF coefficients corresponding to a frequency bandwidth higher than a frequency bandwidth corresponding to the QMF coefficients before being subjected to the adjustment; and a second filter bank which transforms the high frequency coefficients and the QMF coefficients before being subjected to the adjustment into the first audio signal sequence in a time domain, using a filter for Quadrature Mirror Filter synthesis (a QMF synthesis filter).

In this way, the audio decoding apparatus according to the present invention is implemented as the integrated circuit.

Advantageous Effects of Invention

The present invention makes it possible to execute audio signal processing with a small operation amount.

DESCRIPTION OF EMBODIMENTS

Embodiments of the present invention are described below with reference to the drawings.

Embodiment 1

An audio signal processing apparatus according to Embodiment 1 executes time stretch processing by performing QMF transform, phase adjustment, and inverse QMF transform on an input audio signal.

Figure 1:
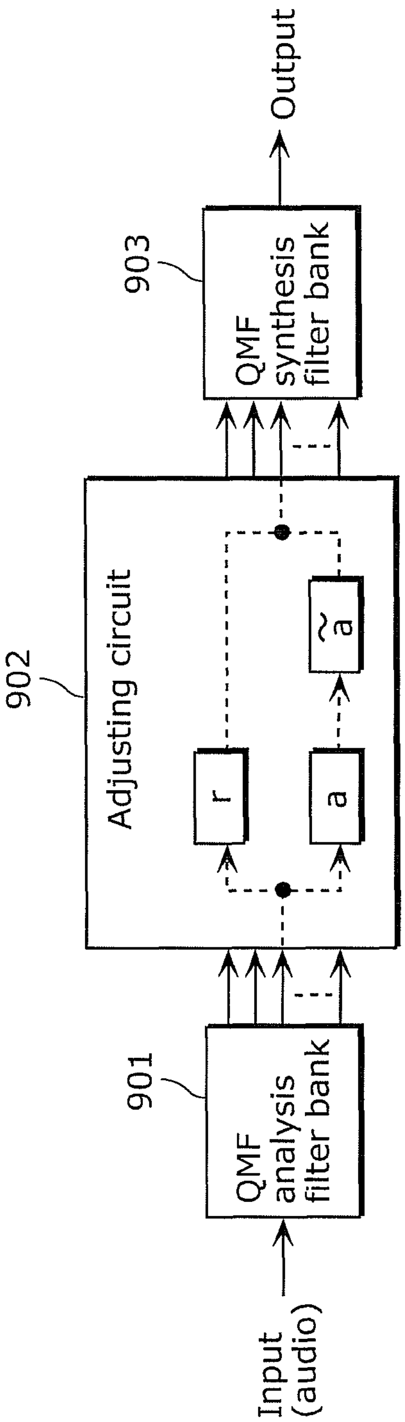
FIG. 1 is a structural diagram of an audio signal processing apparatus according to Embodiment 1.

FIG. 1 is a structural diagram of an audio signal processing apparatus according to Embodiment 1. First, the QMF analysis filter bank 901 transforms the input audio signal into a QMF coefficient X(m, n). Here, m denotes a sub-band index, and n denotes a time slot index. The adjusting circuit 902 adjusts the QMF coefficient obtained by the transform. Adjustment by the adjusting circuit 902 is described hereinafter. Expression 11 represents each of QMF coefficients before being subjected to adjustment, based on the amplitude and phase.

[Math. 10]

$$X(m,n)=(m,n)=r(m,n)\cdot\exp(j\cdot a(m,n)) \quad \text{(Expression 11)}$$

Here, r(m, n) denotes amplitude information, and a(m, n) denotes phase information. The adjusting circuit 902 adjusts the phase information a(m, n) into the following phase information.

$$\tilde{a}(m,n) \quad \text{[Math. 11]}$$

The adjusting circuit 902 calculates new QMF coefficients based on the phase information after being subjected to the adjustment and the amplitude information r(m, n) before being subjected to the adjustment according to Expression 12.

[Math. 12]

$$\tilde{X}(m,n)=r(m,n)\cdot\exp(j\cdot\tilde{a}(m,n)) \quad \text{(Expression 12)}$$

Lastly, the QMF synthesis filter bank 903 transforms the new QMF coefficient calculated according to Expression 12 into a time signal. An approach for adjusting phase information is described hereinafter.

In Embodiment 1, the QMF-based time stretch processing includes the following steps. The time stretch processing includes: (1) a step of adjusting phase information; and (2) a step of executing an overlap addition in a QMF domain, based on the addition theorem in the QMF transform.

The following description is given of time stretches taking an example of performing time stretches on 2L number of samples of time signals each having a real-number value, using a stretch factor s. For example, the QMF analysis filter bank 901 transforms the 2L number of samples of time signals each having a real-number value into 2L number of QMF coefficients each composed of a combination of one of 2L/M time slots and one of M sub-bands. In other words, the QMF analysis filter bank 901 transforms the 2L number of samples of time signals each having a real-number value into QMF coefficients in a hybrid time-frequency domain.

As in the STFT-based time stretch method, the QMF coefficients calculated by the QMF transform are susceptible to analysis window functions at a pre-stage of adjusting the phase information. In Embodiment 1, the transform into the QMF coefficients is executed using the following three steps.

(1) The analysis window functions h(n) (window length L) are transformed into analysis window functions H(v, k) (each composed of a combination of one of the L/M time slots and one of the M sub-bands) for use in the QMF domain.

(2) The calculated analysis window functions H(v, k) are simplified as shown below.

[Math. 13]

$$H_0(v) = \sum_{k=0}^{M-1} H(v, k)\ (v = 0, \ldots , L/M - 1)$$

(3) The QMF analysis filter bank 901 calculates the QMF coefficients according to $X(m, k)=X(m, k)\cdot H_0(w)$ (here, w=mod (m, L/M), and mod( ) denotes operation for calculating a residual).

Figure 2:
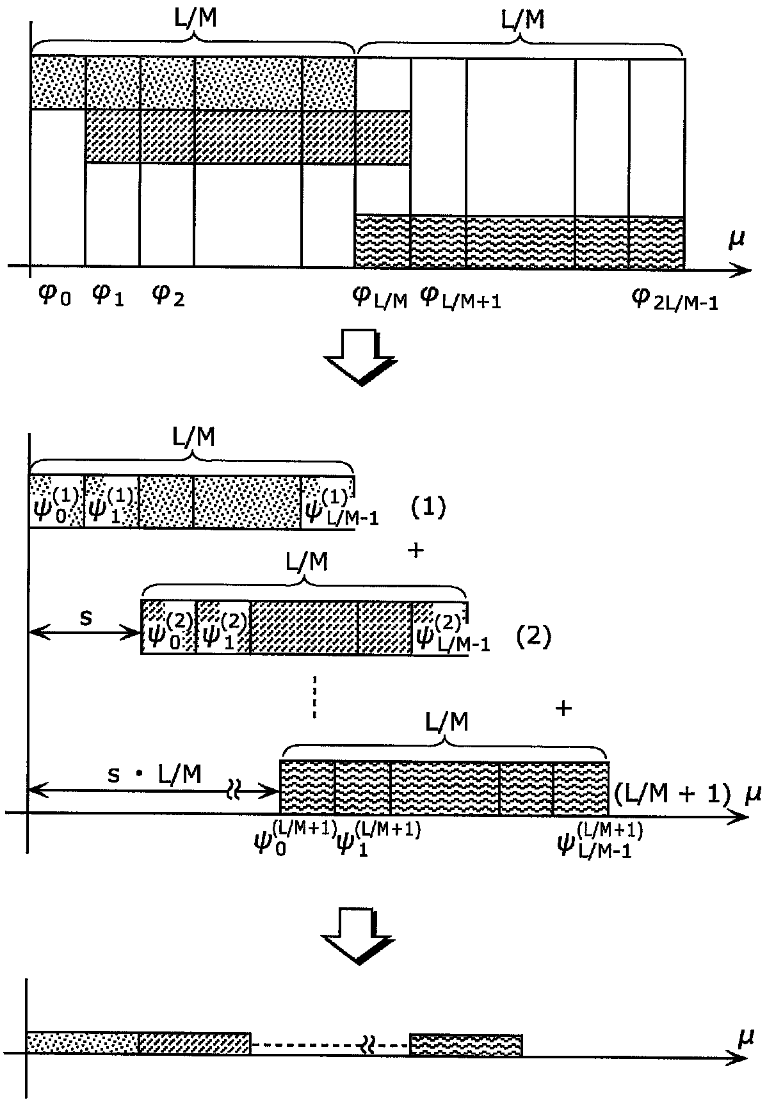
FIG. 2 is an illustration of time stretch processing according to Embodiment 1.

As shown in the upper column of FIG. 2, each of the original QMF coefficients is composed of a combination of one of the L/M time slots and one of the L/M+1 QMF blocks. Here each of the blocks is overlapped with at least one of the others by a hop size.

The adjusting circuit 902 adjusts the phase information of each of the QMF blocks before being subjected to the adjustment with an aim to reliably prevent discontinuity of the phase information, and thereby generates new QMF blocks. In other words, in the case where μ-th and μ+1-th QMF blocks are overlapped with each other, the continuity of the phase information of the new QMF blocks needs to be secured at a μ·s sampling point (s denotes a stretch factor). This corresponds to securing the continuity at a jump point μ·M·s (μ is an element of N) in the time domain.

The adjusting circuit 902 calculates the phase information $\phi_u(k)$ of each of the QMF blocks before being subjected to the adjustment, based on the QMF coefficient X(u, k) that is a complex (a time slot index u=0, . . . , 2L/M−1, and a sub-band index k=0, 1, . . . , M−1). As shown in the middle column of FIG. 2, the adjusting circuit 902 calculates the QMF blocks in an ascending order of generation of their time slots to generate new QMF blocks. The respective QMF blocks are shown in mutually different patterns. FIG. 2 shows a case of processing with shifts by a hop size corresponding to two time slots.

The phase information of an n-th (n=1, . . . , L/M+1) new QMF block is represented as $\psi_u^{(n)}(k)$ (a time slot index u=0, . . . , L/M−1, and a sub-band index k=0, 1, . . . , M−1). The new phase information $\psi_u^{(n)}(k)$ of each of new QMF blocks already subjected to time stretches varies depending on the position at which the QMF block is re-arranged.

In the case where the first QMF block $X_{(1)}(u, k)$ (u=0, . . . , L/M−1) is re-arranged, the new phase information $\psi_u^{(1)}(k)$ of the QMF block is assumed to be the same as the phase information $\phi_u(k)$ of the QMF block before being subjected to the adjustment. In other words, the new phase information $\psi_u^{(1)}(k)$ is calculated according to $\psi_u^{(1)}(k)=\phi_u(k)$ (u=0, . . . , L/M−1, k=0, 1, . . . , M−1).

The second QMF block $X^{(2)}(u, k)$ (u=0, . . . , L/M−1) is re-arranged with a shift by the hop size corresponding to the s time slot (FIG. 2 shows a case of two time slots). In this case, the frequency components of the starting block needs to be continuous to the frequency components in the s-th time slot in the first new QMF block $X^{(1)}(u, k)$. Accordingly, the frequency components of the first time slot in the second new QMF block $X^{(2)}(u, k)$ match the frequency components of the second time slot corresponding to the original QMF block. In other words, the new phase information $\psi_0^{(2)}(k)$ is calculated according to $\psi_0^{(2)}(k)=\psi_0^{(1)}(k)+\Delta\phi_1(k)$.

Since the phase information of the first time slot is changed, the remaining phase information is adjusted according to the phase information of the original QMF blocks. In other words, the new phase information $\psi_u^{(2)}(k)$ is calculated according to $\psi_u^{(2)}(k)=\phi_{u-1}^{(2)}(k)+\Delta\phi_{u+1}(k)$ (u=0, . . . , L/M−1).

Here, $\Delta\phi_u(k)$ is calculated according to $\Delta\phi_u(k)=\phi_u(k)-\phi_{u-1}(k)$ as being a phase difference of the QMF block before being subjected to the adjustment.

The adjusting circuit 902 generates the QMF block before being subjected to the adjustment by repeating the above-described processing L/M+1 times. In other words, the adjusted phase information $\psi_u^{(m)}(k)$ of the m-th (m=3, . . . , L/M+1) new QMF block is calculated according to Expressions 13 and 14.

$$\psi_0^{(m)}(k)=\psi_0^{(m-1)}(k)+\Delta\phi_{m-1}(k) \quad \text{(Expression 13)}$$

$$\psi_u^{(m)}(k)=\psi_{u-1}^{(m)}(k)+\Delta\phi_{m+u-1}(k)(u=1, \ldots ,L/M-1) \quad \text{(Expression 14)}$$

By using the amplitude information of the original QMF blocks as the amplitude information of the corresponding new QMF blocks, the adjusting circuit 902 can calculate the QMF coefficients of the new QMF blocks.

The adjusting circuit 902 may adjust the phase information according to different adjustment methods selectively used for the even sub-bands and the odd sub-bands in the QMF domain. For example, an audio signal having a strong harmonic structure (excellent tonality) has phase information ($\Delta\phi(n, k)=\phi(n, k)-\phi(n-1, k)$) that varies depending on each of the frequency components in the QMF domain. In this case, the adjusting circuit 902 determines a frequency component ω(n, k) at a moment according to Expression 15.

[Math. 14]

$$\omega(n, k) = \begin{cases} princarg(\Delta\varphi(n, k)) & k \text{ is even} \\ princarg(\Delta\varphi(n, k) - \pi) & k \text{ is odd} \end{cases} \quad \text{(Expression 15)}$$

Here, princarg(α) denotes transform of α, and is defined according to Expression 16.

$$\text{princarg}(\alpha)=\text{mod}(\alpha+\pi,-2\pi)+\pi \quad \text{(Expression 16)}$$

Here, mod(a, b) denotes a residual obtained by dividing a by b.

To sum up, the phase difference information $\Delta\phi_u(k)$ in the above-described phase adjustment method is calculated according to Expression 17.

[Math. 15]

$$\Delta\varphi_u(k) = \begin{cases} princarg(\varphi_u(k) - \varphi_{u-1}(k)) & k \text{ is even} \\ princarg(\varphi_u(k) - \varphi_{u-1}(k) - \pi) & k \text{ is odd} \end{cases} \quad \text{(Expression 17)}$$

Furthermore, the QMF synthesis filter bank 903 may not necessarily apply the QMF synthesis processing on every one of the new QMF blocks in order to reduce the operation amount for the time stretch processing. Instead, the QMF synthesis filter bank 903 may perform overlap addition on the new QMF blocks and apply the QMF synthesis processing on the resulting signals.

As in the STFT-based stretch processing, the QMF coefficients calculated by the QMF transform are susceptible to the synthesis window functions at the pre-stage of the overlap addition. For this reason, as in the above-described analysis window functions, the synthesis window functions are obtained according to $X^{(n+1)}(u, k)=X^{(n+1)}(u, k)\cdot H_0(w)$ (here, w=mod(u, L/M)).

The addition theorem is satisfied in the QMF transform, and thus it is possible to perform overlap addition on every one of the L/M+1 QMF blocks, using the hop size of the s time slot. Here, Y(u, k) as a result of the overlap addition is calculated according to Expression 18.

$$Y(ns+u,k)=Y(ns+u,k)+X^{(n+1)}(u,k)(n=0, \ldots, L/M, u=1, \ldots, L/M, k=0,1, \ldots, M-1) \quad \text{(Expression 18)}$$

The QMF synthesis filter bank 903 can generate the final audio signal that has been subjected to the time stretch by applying the QMF synthesis filter on the above Y(u, k). It is clear that s-times time stretch processing can be performed on the original signal, judging from the range of the time index u of Y(u, k).

As shown in the above Expression 12, in Embodiment 1, the adjusting circuit 902 performs phase adjustment and amplitude adjustment in the QMF domain. As described so far, the QMF analysis filter bank 901 transforms the audio signal segments each corresponding to a unit of time into sequential QMF coefficients (QMF blocks). Next, the adjusting circuit 902 adjusts the amplitudes and phases of the respective QMF blocks such that the continuity in the phases and amplitudes of the adjacent QMF blocks is maintained according to a pre-specified stretch rate (s times, for example, s=2, 3, 4, etc.). In this way, the phase vocoder processing is performed.

The QMF synthesis filter bank 903 transforms the QMF coefficients in the QMF domain subjected to the phase vocoder processing into signals in the time domain. This yields audio signals in the time domain each having a time length stretched by s times. There are cases where the QMF coefficients are rather suitable depending on the signal processing at a later stage of the time stretch processing. For example, the QMF coefficients in the QMF domain subjected to the phase vocoder processing may be further subjected to any audio processing such as bandwidth expansion processing based on the SBR technique. The QMF synthesis filter bank 903 may be configured to transform the time domain audio signals after the later-stage signal processing.

Figure 3:
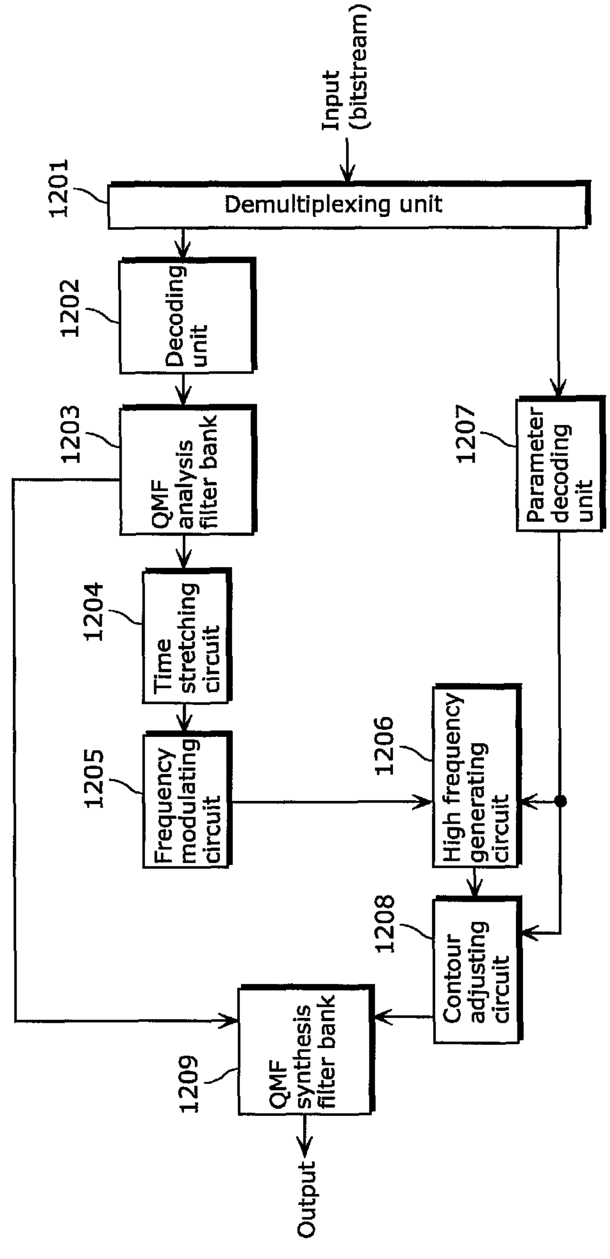
FIG. 3 is a structural diagram of an audio decoding apparatus according to Embodiment 1.

The structure shown in FIG. 3 is an example of such a combination. This is an example of an audio decoding apparatus which performs a combination of the phase vocoder processing in the QMF domain and the technique for expanding the bandwidth of an audio signal. The following description is given of the structure of the audio decoding apparatus using the phase vocoder processing.

A demultiplexing unit 1201 demultiplexes an input bitstream into parameters for generating high frequency components and coded information for decoding low frequency components. A parameter decoding unit 1207 decodes the parameters for generating high frequency components. A decoding unit 1202 decodes the audio signal of the low frequency components, based on the coded information for decoding low frequency components. A QMF analysis filter bank 1203 transforms the decoded audio signals into the audio signals in the QMF domain.

A frequency modulating circuit 1205 and a time stretching circuit 1204 perform the phase vocoder processing on the audio signals in the QMF domain. Subsequently, a high frequency generating circuit 1206 generates a signal of high frequency components using the parameters for generating high frequency components. A contour adjusting circuit 1208 adjusts the frequency contour of the high frequency components. A QMF synthesis filter bank 1209 transforms the audio signals of the low frequency components and the high frequency components in the QMF domain into time domain audio signals.

It is to be noted that the coding processing and the decoding processing on the low frequency components may use any format that conforms to any one of the audio coding schemes such as the MPEG-AAC format, the MPEG-Layer 3 format, etc., or may use the format that conforms to a speech coding scheme such as the ACELP.

In addition, when performing the phase vocoder processing in the QMF domain, the adjusting circuit 902 may perform weighted operation for each sub-band index of the QMF block, as the calculation of the QMF coefficients adjusted according to Expression 12. In this way, the adjusting circuit 902 can perform modulation using modulation factors that vary for the respective sub-band indices. For example, there is an audio signal which has a sub-bad index that corresponds to high frequency and in which distortion is increased at the time of a time stretch. The adjusting circuit 902 may use such a modulation factor that attenuates the audio signal.

Furthermore, the audio signal processing apparatus may include another QMF analysis filter bank at a later stage of the QMF analysis filter bank 901, as an additional structural element for performing the phase vocoder processing in the QMF domain. When only a single QMF analysis filter bank 901 is provided, the frequency resolution of low frequency components may be low. In this case, it is impossible to obtain a sufficient effect even when the phase vocoder processing is performed on the audio signal including a lot of low frequency components.

For this reason, in order to increase the frequency resolution of the low frequency components, it is possible to use another QMF analysis filter bank for analyzing the low frequency portions (such as the half of the QMF blocks included in the output by the QMF analysis filter bank 901. In this way, the frequency resolution is doubled. In addition, the adjusting circuit 902 performs the above-described phase vocoder processing in the QMF domain. In this way, the effects of reducing the operation amount and the memory consumption amount are increased with the sound quality maintained.

Figure 4:
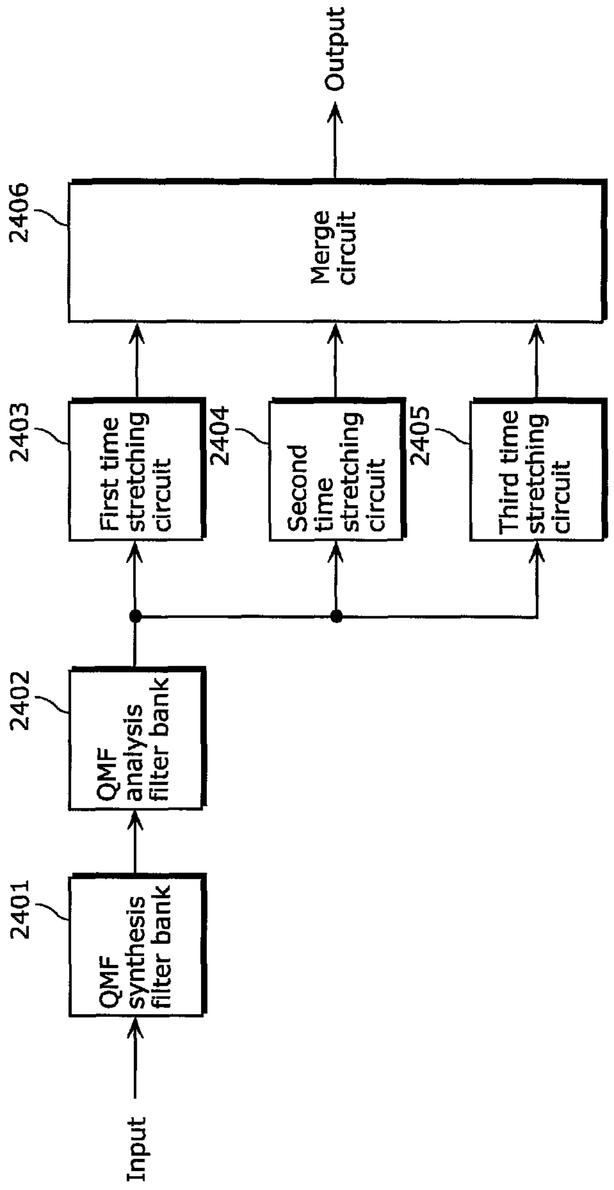
FIG. 4 is a structural diagram of a frequency modulating circuit according to Embodiment 1.

FIG. 4 is a diagram showing an exemplary structure for increasing the resolutions in the QMF domain. The QMF synthesis filter bank 2401 synthesizes an input audio signal using a QMF synthesis filter first. Next, the QMF analysis filter bank 2402 calculates the QMF coefficients using another QMF analysis filter (a filter for Quadrature Mirror Filter (QMF) analysis) having a doubled resolution. Plural phase vocoder processing circuits (a first time stretching circuit 2403, a second time stretching circuit 2404, and a third time stretching circuit 2405) are arranged in parallel to perform pitch shift processing involving a double time stretch, a triple time stretch, and a quadruple time stretch on the QMF domain signals having the doubled resolution, respectively.

The respective phase vocoder processing circuits integrally perform the phase vocoder processing using the doubled resolution and mutually different stretch rates. A merge circuit 2406 synthesizes the signals resulting from the phase vocoder processing.

As clear from the above descriptions, the phase vocoder processing by the QMF filters do not involve FFT processing such as STFT-based phase vocoder processing. For this reason, the phase vocoder processing by the QMF filters provides a remarkable advantageous effect of significantly reducing the operation amount.

Embodiment 2

Embodiment 2 to be described is an embodiment for extending the block-based time axis stretch method according to Embodiment 1. An audio signal processing apparatus according to Embodiment 2 includes the same structural elements as the audio signal processing apparatus according to Embodiment 1 as shown in FIG. 1. Here, in order to prevent the influence due to the earlier-described discontinuity in phase information, phase information is calculated according to the following two kinds of methods.

(a) An adjusting circuit 902 adjusts the phase information of the QMF blocks such that the phase information of an overlapped time slot in each of the QMF blocks is continuous, after the adjustment, to the phase information of an overlapping time slot in a next QMF block. In other words, the adjusting circuit 902 adjusts the phase information according to $\psi_0^{(m)}(k)=\psi_0^{(m-1)}(k)+\Delta\phi_{m-1}(k)$.

(b) The adjusting circuit 902 adjusts the phase information of the QMF blocks such that the phase information of consecutive time slots in each of the QMF blocks is continuous to each other after the adjustment. In other words, the adjusting circuit 902 adjusts the phase information according to $\psi_u^{(m)}(k)=\psi_{u-1}^{(m)}(k)+\Delta\phi_{m+u-1}(k)$ (here, u=1, . . . , L/M−1).

In the above, the method for adjusting the phase information is conceived assuming that the phase information changes from the phase information of the QMF blocks before being subjected to the adjustment, depending on the components having excellent tonality.

However, in reality, the above assumption is not always correct. Typically, the above assumption is not correct in the case where the original signal is an acoustically transient signal. A transient signal is a signal having a non-stable format, for example, a signal including a sharp attack noise in the time domain. The following is known from the assumption that there is a constant relationship between the phase information and the frequency components. In other words, when the transient signal discretely includes a large amount of components having an excellent tonality and includes a wide range of frequency components in a short time interval, it is difficult to process the transient signal. As a result, the output signal to be generated includes distortions that can be perceived acoustically after being subjected to a time stretch processing and/or time compression processing.

In Embodiment 2, in order to address the aforementioned problem that occurs when performing time stretch processing on a signal including a lot of transient signals, the time stretch processing involving phase information adjustment according to Embodiment 1 is modified to the time stretch and/or compression processing for both a signal having an excellent tonality and a transient signal.

First, the adjusting circuit 902 detects, in the QMF domain, transient components included in a transient signal, in order to exclude the time stretch and/or compression processing that possibly causes such a problem.

There are various kinds of approaches for detecting a transient state as disclosed by a large number of documents. Embodiment 2 shows two simple approaches for detecting a transient response in a QMF block.

Figure 5A:
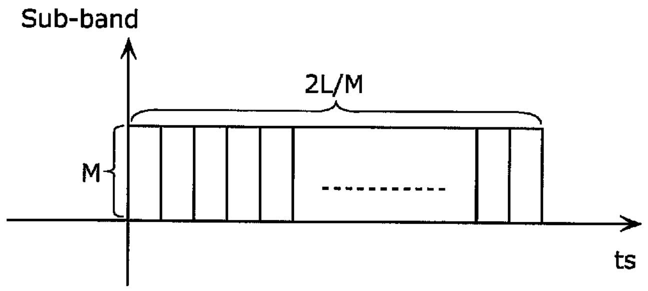
FIG. 5A is an illustration of a QMF coefficient block according to Embodiment 2.

FIG. 5A is an illustration of a case of performing a time stretch on a QMF block X(u, k) (a combination of 2L/M number of time slots and M number of sub-bands) calculated by the QMF transform. The first approach is a method for detecting a transient state according to a change in the energy values of the QMF blocks. The second approach is a method for detecting a change in the amplitude values of the QMF blocks on the frequency axis.

Figure 5B:
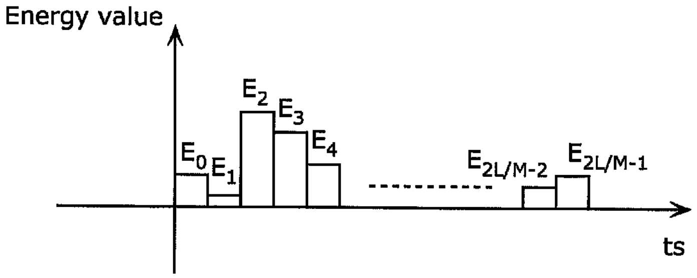
FIG. 5B is a diagram showing an energy distribution in time slots in a QMF domain.
Figure 5C:
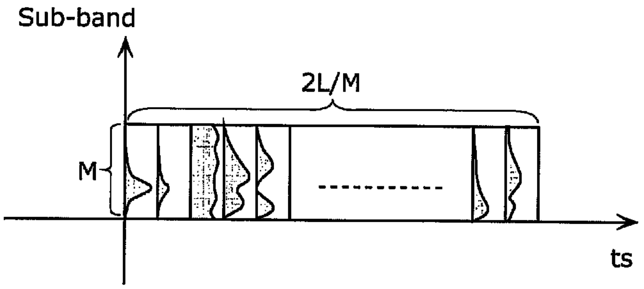
FIG. 5C is a diagram showing an energy distribution in sub-bands in the QMF domain.

The first detection method is as described below. As shown in FIG. 5B, the adjusting circuit 902 calculates the energy values $E_0$ to $E_{2L/M-1}$ for the respective time slots in each QMF block. FIG. 5C is a diagram showing the energy value of each sub-band. The adjusting circuit 902 calculates, for each time slot, the difference in the energy value according to $dE_u=E_{u+1}-E_u$ (here, u=0, . . . , 2L/M−2). A transient component is detected in the i-th time slot according to the following expression using a predetermined threshold value $T_0$.

$$\frac{dE_i}{\sum_j dE_j} \geq T_0 \ (j \in [0, 2L/M-2], dE_j > 0) \quad \text{[Math. 16]}$$

The second detection method is as described below. When the amplitude in every combination of a time slot and a sub-band included in the QMF block is A(u, k), the information concerning the amplitude contour for each time slot is calculated according to the following expression.

$$F_u = \frac{M \cdot \sqrt[M]{\prod_{k=0}^{M-1} A(u,k)}}{\sum_{k=0}^{M-1} A(u,k)} \quad \text{[Math. 17]}$$

(Here, u=0, . . . , 2L/M−1)

When $F_i>T_1$ and the expression indicated below is satisfied based on the predetermined threshold value $T_1$ and $T_2$, the transient component is detected in the i-th time slot.

$$\min_k(A(i,k)) > T_2 \quad \text{[Math. 18]}$$

When a transient component is detected in the $u_0$-th time slot, the phase information stretch processing is modified for the new QMF block including the $u_0$-th time slot.

The stretch processing is modified aiming at two objects. The first object is to prevent processing of the $u_0$-th time slot in arbitrary phase information stretch processing. The other object is to maintain the continuity within a QMF block and between QMF blocks when the $u_0$-th time slot is assumed to be by-passed without being subjected to any processing. In order to achieve these two objects, the earlier-described phase information stretch processing is modified as shown below.

In the m-th new QMF block (m=2, . . . , L/M+1), the phase $\psi_u^{(m)}(k)$ is as indicated below.

Figure 6A:
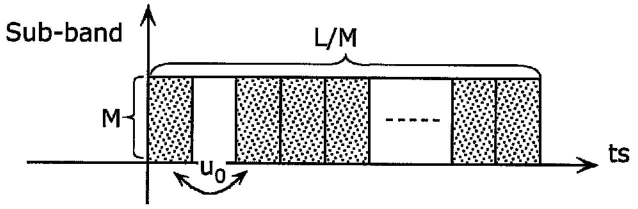
FIG. 6A is an illustration of a first pattern of time stretch processing according to transient components.

When (a) $m<u_0<m+L/M-1$ is satisfied, in order to secure the continuity of the phase information within the QMF block, the phase $\psi_u^{(m)}(k)$ is calculated according to the following expression (FIG. 6A).

$$\psi_u^{(m)}(k) = \begin{cases} \psi_{u-1}^{(m)}(k) + \Delta\varphi_{m+u-1} & \text{if } u < u_0 \text{ or } u > u_0+1 \\ \varphi_{u_0}(k) & \text{if } u = u_0 \\ \psi_{u-2}^{(m)}(k) + (\Delta\varphi_{m+u-1}(k) + \Delta\varphi_{m+u-2}(k)) & \text{if } u = u_0+1 \end{cases} \quad \text{[Math. 19]}$$

Figure 6B:
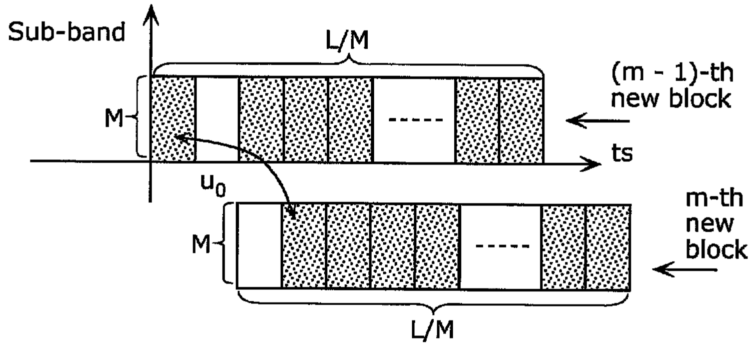
FIG. 6B is an illustration of a second pattern of time stretch processing according to transient components.

When (b) $m=u_0$ and $mod(u_0, s)=0$ are satisfied, in order to prevent the processing of the $u_0$-th time slot in the arbitrary phase information processing, the phase $\psi_0^{(m)}(k)$ is calculated according to the following expression (FIG. 6B).

$$\psi_0^{(m)}(k)=\phi_{u_0}(k) \quad \text{[Math. 20]}$$

In addition, in order to secure the continuity of the phase information between the QMF blocks, the phase information $\psi_1^{(m)}(k)$ is calculated according to the following expression.

$$\psi_1^{(m)}(k)=\psi_{u_0-2}^{(m-1)}(k)+s\cdot(\Delta\phi_{u_0}(k)+\Delta\phi_{u_0-1}(k)) \quad \text{[Math. 21]}$$

Figure 6C:
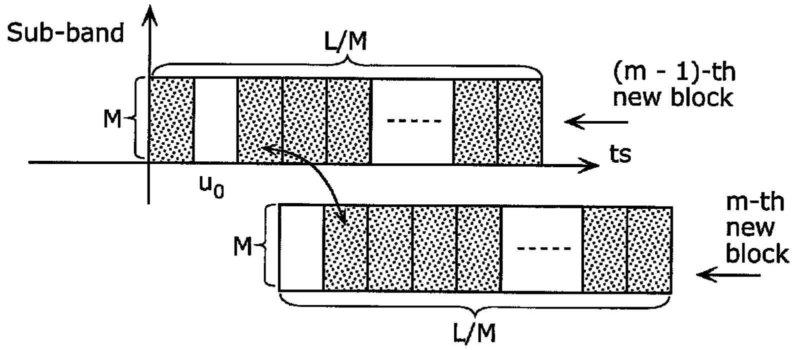
FIG. 6C is an illustration of a third pattern of time stretch processing according to transient components.

When (c) $m=u_0$ and $mod(u_0, s)\neq 0$ are satisfied, in order to prevent the processing of the $u_0$-th time slot in the arbitrary phase information processing, the phase $\psi_0^{(m)}(k)$ is calculated according to the following expression (FIG. 6C).

$$\psi_0^{(m)}(k)=\phi_{u_0}(k) \quad \text{[Math. 22]}$$

In addition, in order to secure the continuity of the phase information between the QMF blocks, the phase information $\psi_1^{(m)}(k)$ is calculated according to the following expression.

$$\psi_1^{(m)}(k)=\psi_{u_0-1}^{(m-1)}(k)+s\cdot\Delta\phi_{u_0}(k) \quad \text{[Math. 23]}$$

In reality, from the acoustic viewpoint, the stretch processing on transient signals are not desirable in many cases. The adjusting circuit 902 may eliminate transient signal components from a QMF block and then perform stretch processing, and return the eliminated transient signal to the QMF block subjected to the stretch processing, instead of skipping the stretch processing on the transient signal.

Figure 7A:
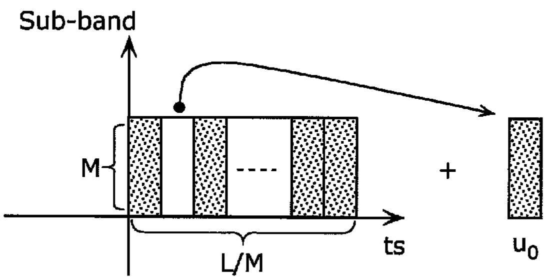
FIG. 7A is an illustration of transient component extraction processing according to Embodiment 2.
Figure 7B:
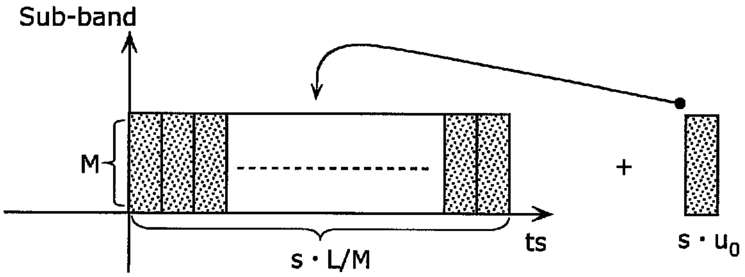
FIG. 7B is an illustration of transient component insertion processing according to Embodiment 2.

Each of FIGS. 7A and 7B shows the aforementioned processing. Here, a description is given of taking an example case of performing a time stretch on a QMF block signal X(u, k) (a combination of the L/M number of time slots and the M number of sub-bands) calculated by the QMF transform and detecting in advance a transient signal in the $u_0$-th time slot according to the above-described transient signal detection method. Each of the blocks is subjected to the time stretch involving the following steps.

(1) The adjusting circuit 902 extracts the $u_0$-th time slot component from the QMF block, and pads the extracted $u_0$-th time slot with "0", or performs "interpolation" processing thereon.

(2) The adjusting circuit 902 stretches the new QMF block signals into the s·L/M number of time slots.

(3) The adjusting circuit 902 inserts the time slot signal extracted in the above (1) to the block position stretched in the above (2) (the position corresponds to the $s\cdot u_0$-th time slot position).

Here, the above approach is a simple example in the case where the $s\cdot u_0$-th time slot position is not appropriate for the transient response component. This is because the time resolution in the QMF transform is low.

The simple example needs to be extended in order to achieve a time stretching circuit that provides a higher sound quality. Furthermore, information indicating the accurate position of the transient response component is necessary. In reality, some pieces of information concerning the QMF domain, such as amplitude information and phase transition information are useful for identifying the accurate position of the transient response component.

It is preferable that the position of the transient response component (hereinafter referred to as a transient position) be specified by the two steps of detecting amplitude components and phase transition information of the respective QMF block signals. A description is given of a case where an impulse component is present at a time $t_0$ only. The impulse component is a typical example of a transient response component.

First, the adjusting circuit 902 roughly estimates the transient position $t_0$ by calculating the amplitude information of each QMF block in the QMF domain.

With consideration of the aforementioned QMF transform proceeding, the following is known. Due to analysis window processing, the impulse component affects plural time slots in the QMF domain. Analysis of the distribution of the amplitude values in these time slots shows the following two cases.

(1) When the $n_0$-th time slot has a higher energy (a square of the amplitude value), the adjusting circuit 902 estimates the transient position $t_0$ according to $(n_0-5)\cdot 64-32<t_0<(n_0-5)\cdot 64+32$.

(2) When the $n_0-1$-th and $n_0$-th time slot has approximately the same energy, the adjusting circuit 902 estimates the transient position $t_0$ according to $t_0=(n_0-5)\cdot 64-32$.

Here, $(n_0-5)$ shows that the QMF analysis filter bank 901 delays the signal by five time slots. In addition, in the case of the above (2), the adjusting circuit 902 can accurately determine the transient position based only on the amplitude analysis.

Furthermore, in the case of the above (1), the adjusting circuit 902 can determine the transient position $t_0$ more efficiently by using the phase information of the QMF domain.

A description is given of a case of analyzing the phase information $\phi(n_0, k)$ (k=0, 1, . . . M−1) within the $n_0$-th time slot. The transition rate of the phase information $\phi(n_0, k)$ that rotates (rounds) by $2\pi$ must have a complete linear relationship between the transient position $t_0$ and either the time slot that is closest in the left (past in time) to the transient position $t_0$ or the midpoint of the $n_0$-th time slot. In short, $k\cdot\Delta t=C_0-g_0$ is satisfied. Here, the phase transition rate is according to the following expression.

$$g_0 = \frac{d(\text{unwrap}(\varphi(n_0, k)))}{dk} \quad \text{[Math. 24]}$$

Here, unwrap (P) is a function of modifying the change equal to or greater than $\pi$ when the radian phase P is rotated by $2\pi$. $C_0$ denotes a constant number.

In addition, $\Delta t$ is the distance from the time slot that is closest in the left (past in time) to the transient position $t_0$ or the distance from the $n_0$-th time slot to the transient position $t_0$. In short, $\Delta t$ is calculated according to Expression 19.

[Math. 25]

$$\Delta t = \begin{cases} t_0 - ((n_0-5)\cdot 64 - 32) & \text{if } g_0 < 0 \\ t_0 - (n_0-5)\cdot 64 & \text{otherwise} \end{cases}; \quad \text{(Expression 19)}$$

The exemplary parameter is a value as shown according to Expression 20.

[Math. 26]

$$C_0 = \begin{cases} -1.5953 & \text{if } g_0 < 0 \\ 3.117 & \text{otherwise} \end{cases}; \quad \text{(Expression 20)}$$

$$K = 0.0491.$$

Figure 8:
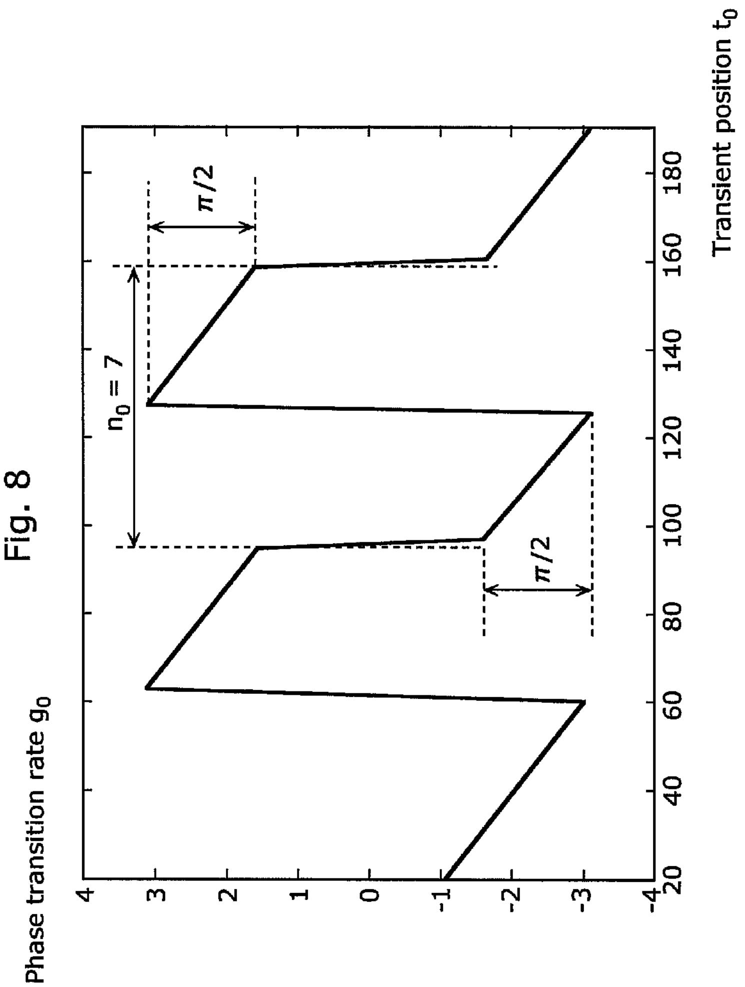
FIG. 8 is a diagram showing a linear relationship between transient positions and QMF phase transition rates.

FIG. 8 is a diagram showing a linear relationship between a transient position $t_0$ and a QMF phase transition rate $g_0$. As shown in FIG. 8, $t_0$ and $g_0$ are associated with each other one to one as long as $n_0$ (the index of the time slot having the largest energy) is fixed.

Based on this, another example is explained. The example is an approach for processing transient components in a QMF domain during time stretch processing. Compared with the earlier-described simple approach, this approach has the following advantageous effects. First, this approach makes it possible to accurately detect the transient position of the original signal. In addition, this approach makes it possible to detect the time slot in which time-stretched transient component is present, together with the appropriate phase information. This approach is described in detail below. The procedure of this approach is also shown in the flowchart in FIG. 9.

The QMF analysis filter bank 901 receives an input time signal x(n) (S2001). The QMF analysis filter bank 901 calculates a QMF block X(m, k) based on the time signal x(n) that is subjected to a time stretch (S2002). Here, it is assumed that the amplitude at X (m, k) is r(m, k), and that the phase information is φ(m, k). In the case where this QMF block includes a transient component, the optimum time stretch approach is as indicated below.

(a) An adjusting circuit 902 detects a time slot $m_0$ including a transient signal, based on the energy distribution, according to Expression 21 (S2003).

[Math. 27]

$$m_0 = \max_m \left( \sum_{k=0}^{K-1} r(m, k) \right) \quad \text{(Expression 21)}$$

(b) The adjusting circuit 902 estimates a phase transition rate of a time slot in which transient response is noticeable from among time slots in which transient response is present (S2004). The phase transition rate is indicated below.

$$\tilde{\omega}_0 \quad \text{[Math. 28]}$$

In other words, the adjusting circuit 902 estimates a phase angle $\omega_0$ and the following phase transition rate of a time slot.

$$\tilde{\omega}_0 \quad \text{[Math. 29]}$$

(c) The adjusting circuit 902 calculates a polynominal residual according to Expression 22.

[Math. 30]

$$\Delta\phi_k = \text{unwrap}(\phi(m,k)) - \omega_0 - \tilde{\omega}_0 \cdot k \quad \text{(Expression 22)}$$

(d) The adjusting circuit 902 determines the transient position $t_0$ according to Expression 23 (S2005).

[Math. 31]

$$t_0 = \begin{cases} (m_0 - 5) \cdot 64 - 32 + \text{round}((-1.5953 - \varpi_0)/K) & \text{if } \varpi_0 < 0 \\ (m_0 - 5) \cdot 64 + \text{round}((3.117 - \varpi_0)/ < K) & \text{otherwise} \end{cases} \quad \text{(Expression 23)}$$

Here, a constant number K is represented according to K=0.0491.

(d) The adjusting circuit 902 determines an area that is in a transient state according to Expression 24 (S2006).

[Math. 32]

$$\overline{T}_0 = \begin{cases} m_0 & \text{if mod}(t_0, 64) = 0 \\ m_0 - 1, m_0, m_0 + 1 & \text{otherwise} \end{cases} \quad \text{(Expression 24)}$$

The adjusting circuit 902 decreases the QMF coefficient within the area in a transient state using a scalar value according to Expression 25 (S2007).

[Math. 33]

$$X(m,k) = \alpha \cdot X(m,k) \text{ if } m \in \overline{T}_0 \quad \text{(Expression 25)}$$

Here, α is a small value such as 0.001.

(f) The adjusting circuit 902 performs normal time stretch processing on a QMF block that is not in a transient state.

(g) The adjusting circuit 902 calculates a new time slot and the phase transition rate at a transient position $s \cdot t_0$.

(i) The adjusting circuit 902 calculates a time-stretched time slot index $m_1$ according to $m_1 = \text{ceil}((s \cdot t_0 - 32)/64) + 5$ (S2009). Here, ceil represents processing for rounding up the argument to the closest integer.

(ii) The adjusting circuit 902 calculates the distance between the transient position and the position that is closest in the left side (past in time) to the new time slot, according to Expression 26.

$$\Delta t_1 = s \cdot t_0 - (m_1 - 5) \cdot 64 + 32 \quad \text{(Expression 26)}$$

(iii) The adjusting circuit 902 calculates the new phase transition rate according to Expression 27.

[Math. 34]

$$\varpi_1 = \begin{cases} -1.5953 - K \cdot \Delta t_1 & \text{if } 0 \le \Delta t_1 < 31 \\ 3.117 - K \cdot (\Delta t_1 - 31) & \text{otherwise} \end{cases} \quad \text{(Expression 27)}$$

(h) The adjusting circuit 902 synthesizes a new QMF coefficient at a time slot $m_1$ in which transient response is noticeable.

The amplitude at the time slot $m_1$ succeeds the time slot $m_0$ before the stretch. The adjusting circuit 902 calculates the phase information based on the phase transition rate and the phase difference according to Expression 28 (S2010).

[Math. 35]

$$\hat{\phi}(m_1,k) = \text{unwrap}(\Delta\phi_k) - \overline{\omega}_1 \cdot k - \omega_0 \quad \text{(Expression 28)}$$

The adjusting circuit 902 calculates a new QMF coefficient according to Expression 29 (S2011).

[Math. 36]

$$\hat{X}(m_1,k)=r(m_0,k)\cdot\exp(j\cdot\hat{\phi}(m_1,k)) \quad \text{(Expression 29)}$$

(i) The adjusting circuit 902 determines a new transient area according to Expression 30 (S2013).

[Math. 37]

$$\overline{T}_1=\begin{cases} m_1 & \text{if } \Delta t_1 = 32 \\ m_1-1, m_1, m_1+1 & \text{otherwise} \end{cases} \quad \text{(Expression 30)}$$

(j) In the case where the newly determined transient area includes plural time slots, the adjusting circuit 902 re-adjusts the phases of these time slots according to Expression 31 (S2015).

$$\overline{T}_1 \quad \text{[Math. 38]}$$

[Math. 39]

$$\hat{\varphi}(m_1-1,k)=\hat{\varphi}(m_1+1,k)= \begin{cases} \text{unwrap}(\Delta\varphi_k)-(\varpi_1+\pi)\cdot k-\omega_0 & \text{if } 0\le \Delta t_1 < 31 \\ \text{unwrap}(\Delta\varphi_k)-(\varpi_1-\pi)\cdot k-\omega_0 & \text{otherwise} \end{cases} \quad \text{(Expression 31)}$$

The adjusting circuit 902 re-synthesizes the QMF block coefficients obtained in the adjusted time slots, according to Expression 32.

[Math. 40]

$$\hat{X}(m_1-1,k)=r(m_0-1,k)\cdot\exp(j\cdot\hat{\phi}(m_1-1,k))$$

$$\hat{X}(m_1+1,k)=r(m_0+1,k)\cdot\exp(j\cdot\hat{\phi}(m_1+1,k)) \quad \text{(Expression 32)}$$

Lastly, the adjusting circuit 902 outputs the time-stretched QMF blocks (S2012).

In view of the operation amount, the above-described (a) to (d) that are executed to detect a transient position may be replaced with a transient response detection approach performed in a direct time domain. For example, a transient position detecting unit (not shown) intended to detect a transient position in a time domain is disposed at a pre-stage of the QMF analysis filter bank 901. The typical procedure as the transient response detection approach in a time domain is as indicated below.

(1) The transient position detecting unit divides a time signal x(n) ($n=0, 1, \ldots, N\cdot L_0-1$) into N segments each having a length of L0.

(2) The transient position detecting unit calculates the energy of each segment according to the following expression.

[Math. 41]

$$E_s(i)=\sum_{n=i\cdot L_0}^{(i+1)\cdot L_0-1} x^2(n)$$

(3) The transient position detecting unit calculates the energy of the whole segment according to $E_{lt}(i)=a\cdot E_{lt}(i-1)+(1-a)\cdot Es(i)$.

(4) When $E_s(i)/E_{lt}(i)>R_1$ and $E_s(i)>R_2$ are satisfied, the transient position detecting unit determines that the i-th segment is a transient segment including a transient response component. Here, $R_1$ and $R_2$ are predetermined thresholds.

(5) The transient position detecting unit calculates the center position of the transient segment as an approximate position of a final transient position, according to $t_0=(i+0.5)\cdot L_0$.

Figure 9:
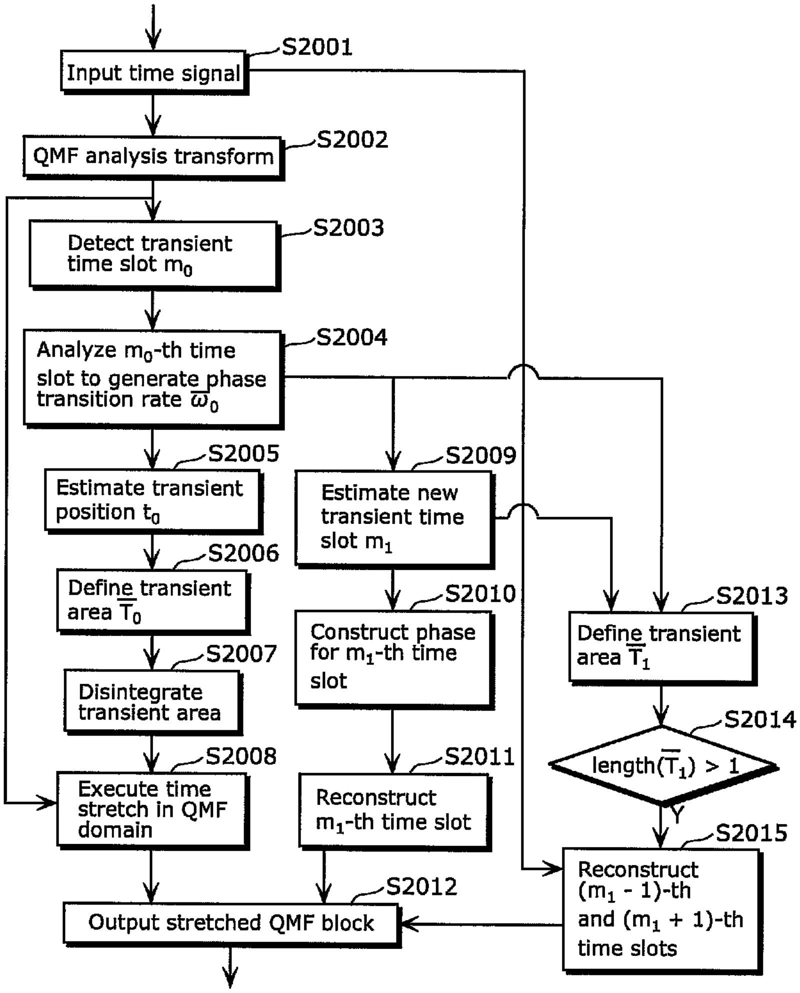
FIG. 9 is an illustration of time stretch processing according to Embodiment 2.
Figure 10:
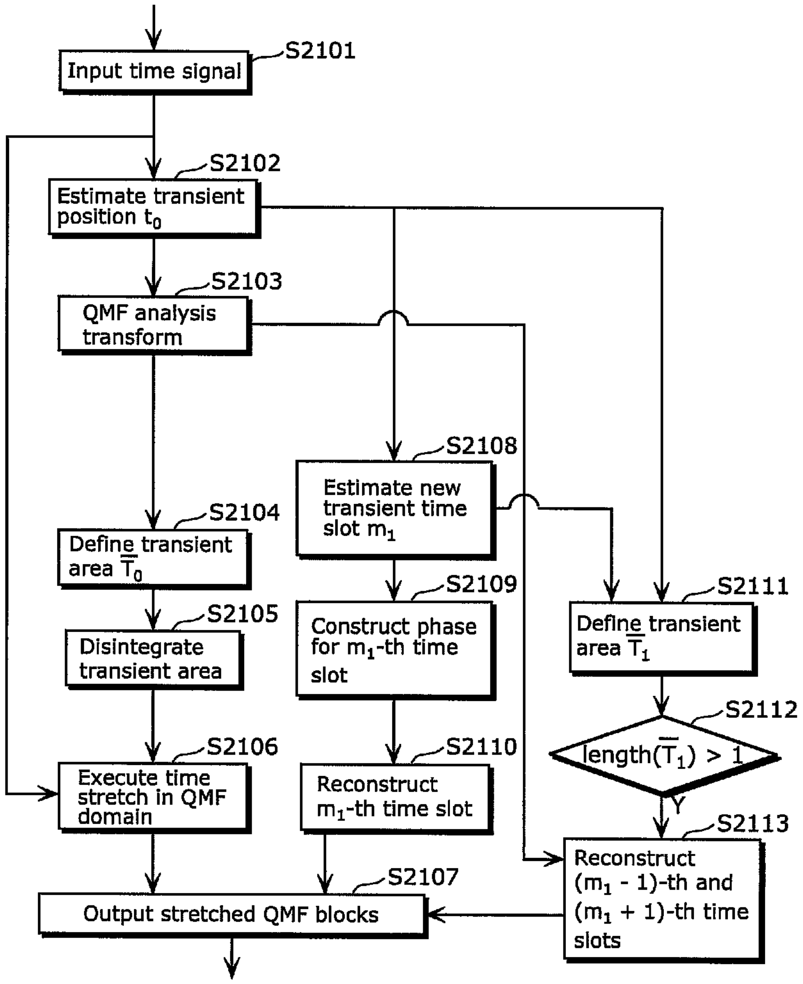
FIG. 10 is a flowchart of a variation of time stretch processing according to Embodiment 2.

In the case of detecting a transient component in a time domain, the flowchart in FIG. 9 is modified as shown in FIG. 10.

Here, as in Embodiment 1, it is possible to combine the audio signal processing according to Embodiment 2 with other audio processing in the QMF domain. For example, the QMF analysis filter bank 901 transforms the audio signal segments each corresponding to a unit of time into sequential QMF coefficients (QMF blocks). Next, the adjusting circuit 902 adjusts the amplitudes and phases of the QMF blocks such that the continuity in the phases and amplitudes of adjacent QMF blocks is maintained according to a pre-specified stretch rate (s times, for example, s=2, 3, 4, etc.). In this way, the phase vocoder processing is performed.

The QMF synthesis filter bank 903 transforms the QMF coefficients in the QMF domain subjected to the phase vocoder processing into signals in the time domain. This yields audio signals in the time domain each having a time length stretched by s times. There are cases where the QMF coefficients are rather suitable depending on the signal processing at a later stage of the time stretch processing. For example, the QMF coefficients in the QMF domain subjected to the phase vocoder processing may be further subjected to any audio processing such as bandwidth expansion processing based on the SBR technique. The QMF synthesis filter bank 903 may be configured to transform the audio signals in the time domain after the later-stage signal processing.

The structure shown in FIG. 3 is an example of such a combination. This is an example of an audio decoding apparatus which performs a combination of the phase vocoder processing in the QMF domain and the technique for expanding the bandwidth of an audio signal. The following description is given of the structure of the audio decoding apparatus which performs the phase vocoder processing.

A demultiplexing unit 1201 demultiplexes an input bitstream into parameters for generating high frequency components and coded information for decoding low frequency components. The parameter decoding unit 1207 decodes the parameters for generating high frequency components. A decoding unit 1202 decodes the audio signal of the low frequency components, based on the coded information for decoding low frequency components. A QMF analysis filter bank 1203 transforms the decoded audio signal into the audio signal in the QMF domain.

A frequency modulating circuit 1205 and a time stretching circuit 1204 perform the phase vocoder processing on the audio signal in the QMF domain. Subsequently, a high frequency generating circuit 1206 generates a signal of high frequency components using the parameters for generating high frequency components. A contour adjusting circuit 1208 adjusts the frequency contour of the high frequency components. A QMF synthesis filter bank 1209 transforms the audio signals of the high frequency components and the low frequency components in the QMF domain into time domain audio signals.

It is to be noted that the coding processing and the decoding processing on the low frequency components may use any format that conforms to any one of the audio coding schemes such as the MPEG-AAC format, the MPEG-Layer 3 format, etc., or may use the format that conforms to a speech coding scheme such as the ACELP.

Furthermore, the audio signal processing apparatus may include another QMF analysis filter bank at a later stage of the QMF analysis filter bank 901, as an additional structural element for performing the phase vocoder processing in the QMF domain. When only a single QMF analysis filter bank 901 is provided, the frequency resolution of low frequency components may be low. In this case, it is impossible to obtain a sufficient effect even when the phase vocoder processing is performed on the audio signal including a lot of low frequency components.

For this reason, in order to increase the frequency resolution of the low frequency components, it is possible to use another QMF analysis filter bank for analyzing the low frequency portions (such as the half of the QMF blocks included in the output by the QMF analysis filter bank 901). In this way, the frequency resolution is doubled. In addition, the adjusting circuit 902 performs the above-described phase vocoder processing in the QMF domain. In this way, the effects of reducing the operation amount and the memory consumption amount are increased with the sound quality maintained.

FIG. 4 is a diagram showing an exemplary structure for increasing the resolutions in the QMF domain. The QMF synthesis filter bank 2401 synthesizes an input audio signal using a QMF synthesis filter first. Next, the QMF analysis filter bank 2402 calculates the QMF coefficients using another QMF analysis filter having a doubled resolution. Plural phase vocoder processing circuits (a first time stretching circuit 2403, a second time stretching circuit 2404, and a third time stretching circuit 2405) are arranged in parallel to perform pitch shift processing involving a double time stretch, a triple time stretch, and a quadruple time stretch on the QMF domain signal having the doubled resolution, respectively.

The respective phase vocoder processing circuits integrally perform the phase vocoder processing using the doubled resolution and mutually different stretch rates are used. A merge circuit 2406 synthesizes the signals resulting from the phase vocoder processing.

It is to be noted that the audio signal processing apparatus according to Embodiment 2 may include the following structural elements.

The adjusting circuit 902 may perform flexible adjustment according to the tonality (the magnitude of the audio harmonic structure) of an input audio signal and the transient characteristics of the audio signal. The adjusting circuit 902 may adjust the phase information by detecting a transient signal indicated by a coefficient of the QMF domain. The adjusting circuit 902 may adjust the phase information such that the continuity of the phase information is secured and the transient signal component indicated by the coefficient of the QMF domain does not change. The adjusting circuit 902 may adjust the phase information by returning the QMF coefficient related to the transient signal component for which a time stretch and/or time compression is prevented to the QMF coefficient having a stretched or compressed transient component.

The audio signal processing apparatus may further include: a detecting unit which detects transient characteristics of an input signal; and an attenuator which performs processing for attenuating the transient components detected by the detecting unit. The attenuator is provided as a stage before phase adjustment. The adjusting circuit 902 extends the attenuated transient component, after the time stretch processing. The attenuator may attenuate the transient component by adjusting the amplitude value of the coefficient in the frequency domain.

The adjusting circuit 902 may increase the amplitude of the time-stretched transient component in the frequency domain to adjust the phase, and extend the time-stretched transient component.

Embodiment 3

An audio signal processing apparatus according to Embodiment 3 performs time stretch processing and frequency modulation processing by performing QMF transform on an input audio signal, and performing phase adjustment and amplitude adjustment on the QMF coefficient.

The audio signal processing apparatus according to Embodiment 3 includes the same structural elements as the audio signal processing apparatus according to Embodiment 1 as shown in FIG. 1. First, the QMF analysis filter bank 901 transforms the input audio signal into a QMF coefficient X(m, n). The adjusting circuit 902 adjusts the QMF coefficient. The QMF coefficient X(m, n) before being subjected to the adjustment is represented according to Expression 33 using amplitude and phase.

[Math. 42]

$$X(m,n)=r(m,n)\cdot\exp(j\cdot a(m,n)) \quad \text{(Expression 33)}$$

The phase information a(m, n) is adjusted by the adjusting circuit 902 into the phase information as shown below.

$$\tilde{a}(m,n) \quad \text{[Math. 43]}$$

The adjusting circuit 902 calculates a new QMF coefficient based on the phase information after the adjustment and the original amplitude information r(m, n), according to Expression 34.

[Math. 44]

$$\tilde{X}(m,n)=r(m,n)\cdot\exp(j\cdot\tilde{a}(m,n)) \quad \text{(Expression 34)}$$

Lastly, the QMF synthesis filter bank 903 transforms the new QMF coefficient calculated according to Expression 34 into a time signal. Here, the audio signal processing apparatus according to Embodiment 3 may output the new QMF coefficient directly to another audio signal processing apparatus at a later stage without applying any QMF synthesis filter. The audio signal processing apparatus at the later stage executes, for example, audio signal processing based on the SBR technique.

Figure 11:
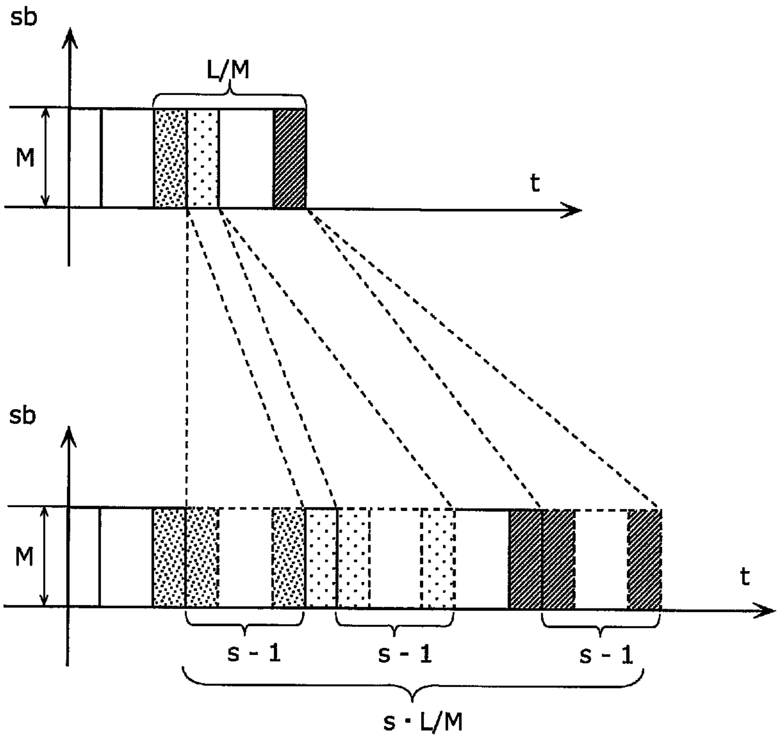
FIG. 11 is an illustration of time stretch processing according to Embodiment 3.

As shown in FIG. 11, the difference from Embodiment 1 lies in that when a time stretch factor is s, (s−1) number of virtual time slot(s) is/are inserted after the time slot in the original QMF domain.

In this case, the adjusting circuit 902 needs to maintain the pitch of the original audio signal. In addition, the adjusting circuit 902 needs to calculate phase information so as not to degrade the auditory sound quality. For example, when the phase information of the original QMF block is $\phi_n(k)$ (time slot index n=1, . . . L/M, and sub-band index k=0, 1, . . . , M−1), the adjusting circuit 902 calculates a new phase information adjusted in the virtual time slot, according to Expression 35.

$$\psi_q(k)=\psi_{q-1}(k)+\Delta\phi_n(k)$$

$$(q=s\cdot(n-1)+1, \ldots, s\cdot n, n=1, \ldots, L/M) \quad \text{(Expression 35)}$$

Here, as in Embodiment 1, the phase difference $\Delta\phi n(k)$ is calculated according to $\Delta\phi_n(k)=\phi_n(k)-\phi_{n-1}(k)$.

In addition, the phase difference $\Delta\phi_n(k)$ is also calculated according to Expression 36.

[Math. 45]

$$\Delta\varphi_n(k) = \begin{cases} princarg(\varphi_n(k) - \varphi_{n-1}(k)) & k \text{ is even} \\ princarg(\varphi_n(k) - \varphi_{n-1}(k) - \pi) & k \text{ is odd} \end{cases} \quad \text{(Expression 36)}$$

The amplitude information of the time slot to be inserted between adjacent time slots is a value for linearly complementing (interpolating) the adjacent time slots such that the amplitude information is continuous at the boundary portion for the insertion. For example, when the original QMF block is $a_n(k)$, the phase information of the virtual time slot to be inserted is for linear complementation according to Expression 37.

[Math. 46]

$$r_q(k) = \frac{a_{n-1}(k) - a_{n-1}(k)}{s} \cdot (q - s \cdot (n-1)) + a_{n-1}(k) \quad \text{(Expression 37)}$$
$$(q = s \cdot (n-1) + 1, \ldots, s \cdot n, n = 1, \ldots, L/M)$$

The QMF synthesis filter bank 903 transforms the new QMF block generated by inserting the virtual time slot in this way into a time domain signal as in Embodiment 1. In this way, a time-stretched signal is calculated. As described above, the audio signal processing apparatus according to Embodiment 3 may output the new QMF coefficient directly to another audio signal processing apparatus at the later stage without applying any QMF synthesis filter bank.

The audio signal processing apparatus according to Embodiment 3 also provides the advantageous effects equivalent to those in the STFT-based phase vocoder processing, with a significantly smaller operation amount than conventional.

Embodiment 4

An audio signal processing apparatus according to Embodiment 4 performs QMF transform on an input audio signal, and performs phase adjustment on each of QMF coefficients. The audio signal processing apparatus according to Embodiment 4 performs time stretch processing by processing the original QMF block on a per sub-band basis.

The audio signal processing apparatus according to Embodiment 4 includes the same structural elements as the audio signal processing apparatus according to Embodiment 1 as shown in FIG. 1. First, the QMF analysis filter bank 901 transforms the input audio signal into a QMF coefficient X(m, n). The adjusting circuit 902 adjusts the QMF coefficient. The QMF coefficient X(m, n) before being subjected to the adjustment is represented according to Expression 38 using amplitude and phase.

[Math. 47]

$$X(m,n)=r(m,n)\cdot\exp(j\cdot a(m,n)) \quad \text{(Expression 38)}$$

The phase information a(m, n) is adjusted by the adjusting circuit 902 into the phase information as shown below.

$$\tilde{a}(m,n) \quad \text{[Math. 48]}$$

The adjusting circuit 902 calculates a new QMF coefficient based on the phase information after the adjustment and the original amplitude information r(m, n), according to Expression 39.

[Math. 49]

$$\tilde{X}(m,n)=r(m,n)\cdot\exp(j\cdot\tilde{a}(m,n)) \quad \text{(Expression 39)}$$

Lastly, the QMF synthesis filter bank 903 transforms the new QMF coefficient calculated according to Expression 39 into a time signal. Here, the audio signal processing apparatus according to Embodiment 4 may output the new QMF coefficient directly to another audio signal processing apparatus at a later stage without applying any QMF synthesis filter. The audio signal processing apparatus at the later stage executes, for example, audio signal processing based on the SBR technique.

The QMF transform has an effect of transforming an input audio signal into an audio signal in a hybrid time-frequency domain having time characteristics. Accordingly, the STFT-based time stretch approach is applicable to the time characteristics of the QMF block.

Figure 12:
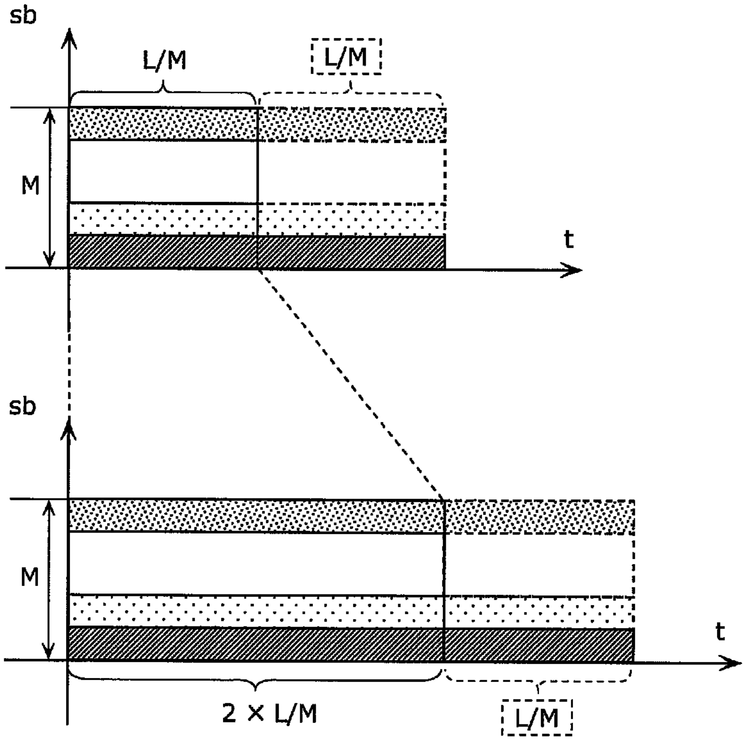
FIG. 12 is an illustration of time stretch processing according to Embodiment 4.

As shown in FIG. 12, the difference from Embodiment 1 lies in that the original QMF block is time-stretched on a per sub-band basis.

Each of the original QMF blocks is a combination of L/M number of time slots and M number of sub-bands. Each QMF block is composed of M number of scalar values, and each scalar value represents time-series information as L/M number of coefficients.

In Embodiment 4, the STFT-based time stretch approach is directly applied to the scalar value of each sub-band. In other words, the adjusting circuit 902 sequentially performs FFT transform on the scalar values of the respective sub-bands to adjust the phase information, and also performs inverse FFT transform. In this way, the adjusting circuit 902 calculates the scalar values of the new sub-bands. Here, since this time stretch processing is executed on a per sub-band basis, the operation amount is not large.

For example, when a time stretch factor is 2 (when the time of an audio signal is doubled), the adjusting circuit 902 repeats the processing on a per hop size $R_a$ basis. This yields a time stretch by which the sub-bands of the original QMF block include 2·L/M number of coefficients. The adjusting circuit 902 is capable of transforming the original QMF block into a QMF block having a doubled length by repeating the above-described steps.

The QMF synthesis filter bank 903 synthesizes the new QMF blocks generated in this way into time signals. In this way, the audio signal processing apparatus according to Embodiment 4 can perform a time stretch such that the original time signal is transformed into a time signal having the doubled length. Here, the audio signal processing method according to Embodiment 4 is referred to as a sub-band-based time stretch approach.

The time stretch processing using three different approaches have been described above based on plural embodiments. Table 1 is a comparison table for categorizing the magnitudes of operation amounts (complexity measurement).

TABLE 1

| Time stretch approaches | Complexity evaluation (Time domain outputs) | Complexity evaluation (QMF domain outputs) |
|---|---|---|
| STFT-based approach | $\frac{L}{R_a} \cdot 2 \cdot \log_2(L) \cdot L$ | $\frac{L}{R_a} \cdot 2 \cdot \log_2(L) \cdot L + 2 \cdot \log_2\left(L \cdot \frac{R_s}{R_a}\right) \cdot L \cdot \frac{R_s}{R_a}$ |
| QMF block-based approach (Embodiment 1) | $4 \cdot \log_2(L) \cdot L$ | $2 \cdot \log_2(L) \cdot L$ |
| Approach using virtual QMF slot (Embodiment 3) | $4 \cdot \log_2(L) \cdot L$ | $2 \cdot \log_2(L) \cdot L$ |
| Sub-band-based approach (Embodiment 4) | $4 \cdot \log_2(L) \cdot L + \frac{L}{R_a} \cdot 2 \cdot \log_2\left(\frac{L}{M}\right) \cdot L$ | $2 \cdot \log_2(L) \cdot L + \frac{L}{R_a} \cdot 2 \cdot \log_2\left(\frac{L}{M}\right) \cdot L$ |

It is shown that each of the three time stretch approaches requires an operation amount significantly smaller than the operation amount required when using the classical STFT-based time stretch approach. This is because the STFT-based time stretch approach involves internal loop processing. The QMF-based time stretch approach does not involve such loop processing.

Embodiment 5

Figure 13:
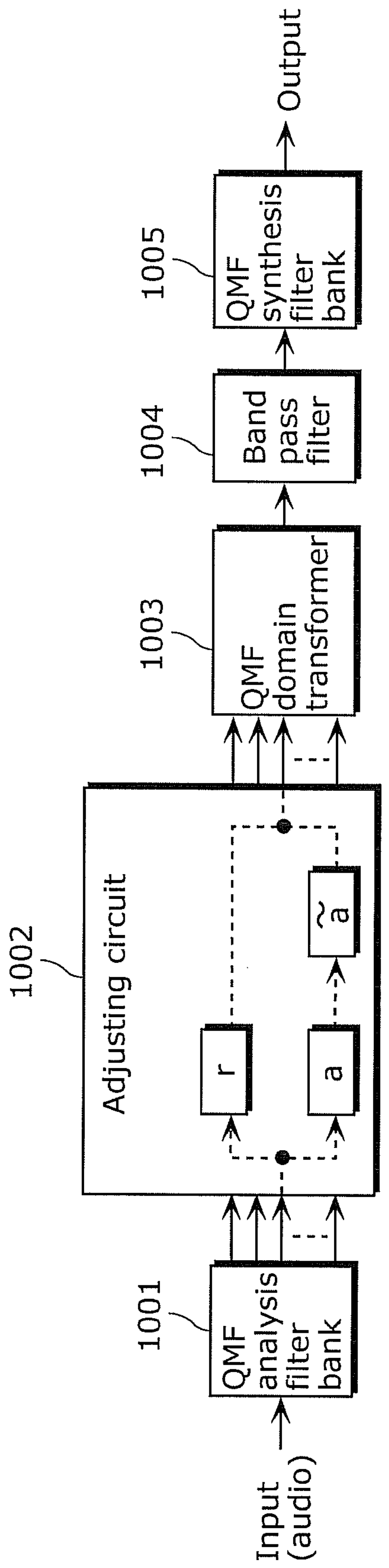
FIG. 13 is a structural diagram of an audio signal processing apparatus according to Embodiment 5.

In Embodiment 5, as in Embodiments 1 to 4, a time stretch in a QMF domain is performed. The difference lies in that the QMF coefficient in the QMF domain is adjusted as shown in FIG. 13.

A QMF analysis filter bank 1001 transforms an input audio signal into a QMF coefficient in order to perform both a time stretch and/or time compression and frequency modulation. An adjusting circuit 1002 performs phase adjustment on the resulting QMF coefficient as in Embodiments 1 to 4.

A QMF domain transformer 1003 transforms the adjusted QMF coefficient into a new QMF coefficient. A band pass filter 1004 performs bandwidth restriction on the QMF domain as necessary. The bandwidth restriction is required to reduce aliasing. Lastly, a QMF synthesis filter bank 1005 transforms the new QMF coefficient into a time domain signal.

Here, the audio signal processing apparatus according to Embodiment 5 may output the new QMF coefficient directly to another audio signal processing apparatus at a later stage without applying any QMF synthesis filter. The audio signal processing apparatus at the later stage executes, for example, audio signal processing based on the SBR technique. The outline of Embodiment 5 is as described above.

Figure 14:
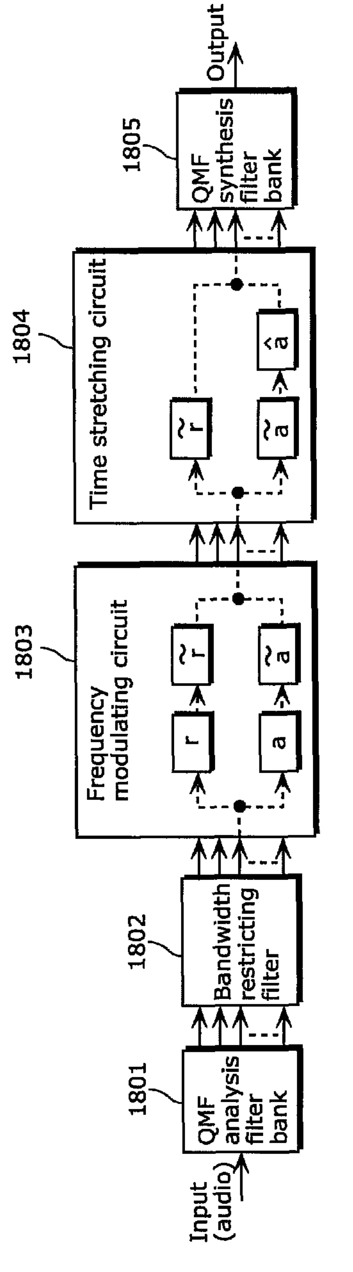
FIG. 14 is a structural diagram of a first variation of an audio signal processing apparatus according to Embodiment 5.

The structure shown in FIG. 14 is intended to perform time stretch and/or compression processing and frequency modulation processing on a target audio signal by performing transform of the phases and amplitudes of the target audio signal in the QMF domain.

First, a QMF analysis filter bank 1801 transforms the audio signal into a QMF coefficient in order to perform both a time stretch and/or time compression, and frequency modulation. A frequency modulating circuit 1803 performs frequency modulation processing on the resulting QMF coefficient in the QMF domain. A bandwidth restricting filter 1802 that is a band pass filter may place a restriction for removing aliasing before the frequency modulation processing.

Next, the frequency modulating circuit 1803 performs frequency modulation processing by sequentially applying phase transform processing and amplitude transform processing on plural QMF blocks. Next, the time stretching circuit 1804 performs time stretch and/or compression processing on the QMF coefficients generated by the frequency modulation processing. The time stretch and/or compression processing is performed as in the same manner in Embodiment 1.

Although the frequency modulating circuit 1803 and the time stretching circuit 1804 are sequentially connected in this structure, connection orders are not limited thereto. In other words, it is also good that the time stretching circuit 1804 performs time stretch and/or compression processing first, and then the frequency modulating circuit 1803 performs frequency modulation processing.

Lastly, a QMF synthesis filter bank 1805 transforms the QMF coefficient subjected to the frequency modulation processing and the time stretch and/or compression processing into a new audio signal. The new audio signal is a signal having a time length stretched or compressed in the time axis direction and the frequency axis direction, compared to the original audio signal.

Here, the audio signal processing apparatus as shown in FIG. 14 may output the new QMF coefficient directly to another audio signal processing apparatus at a later stage without applying any QMF synthesis filter. The audio signal processing apparatus at the later stage executes, for example, audio signal processing based on the SBR technique.

In Embodiments 1 to 4, time stretch approaches have been described. The audio signal processing apparatus according to Embodiment 5 is configured to further include a structural element which performs frequency modulation processing using pitch stretch processing, in addition to the structural elements of the audio signal processing apparatus in any of those embodiments. There are some approaches for adjusting time or a frequency to an ideal one. Here, the classical pitch stretch processing that is a method for re-sampling (decimating) a time-stretched signal cannot be directly applied to frequency modulation processing.

The audio signal processing apparatus as shown in FIG. 14 performs pitch stretch processing on a QMF domain, after the processing performed by the QMF analysis filter bank 1801. The processing by the QMF analysis filter bank 1801 transforms a predetermined signal component (the sinusoidal wave component in a particular frequency) in the time domain into two signals each having a different combination of QMF sub-bands. For this reason, it is difficult to demultiplex a correct signal component from a single QMF coefficient block in terms of both frequency and amplitude, and thereby perform pitch transform.

Figure 15:
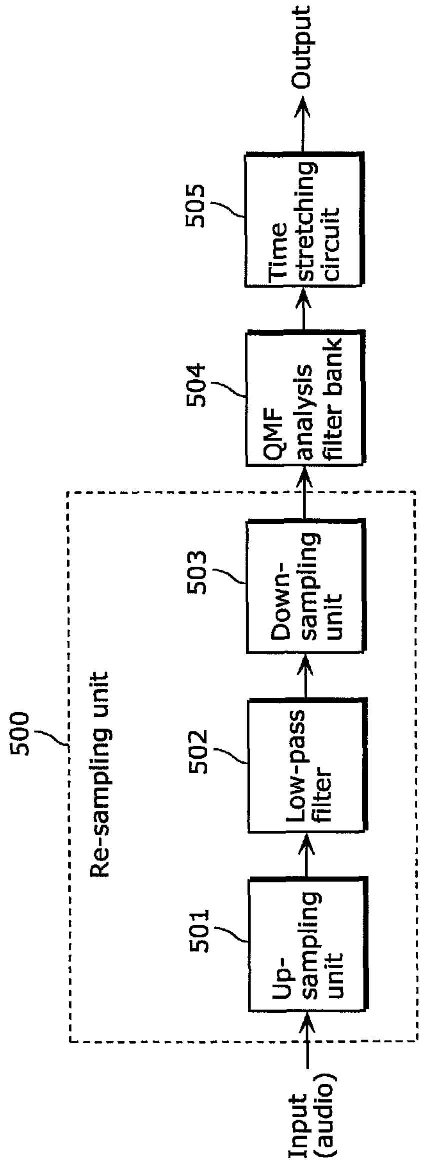
FIG. 15 is a structural diagram of a second variation of the audio signal processing apparatus according to Embodiment 5.

Accordingly, the audio signal processing apparatus according to Embodiment 5 may be modified to have a structure for performing pitch stretch processing at an earlier stage. In other words, as shown in FIG. 15, the audio signal processing apparatus is configured to re-sample an input signal in the time domain at a stage earlier than the QMF analysis filter bank. In FIG. 15, the re-sampling unit 500 re-samples an audio signal, the QMF analysis filter bank 504 transforms the audio signal into a QMF coefficient, and the time stretching circuit 505 adjusts the QMF coefficient.

The re-sampling unit 500 as shown in FIG. 15 is composed of the following three modules. In other words, the re-sampling unit 500 includes: (1) an up-sampling unit 501 for M-times up-sampling; (2) a low-pass filter 502 for suppressing aliasing; and (3) a down-sampling unit 503 for D-times down-sampling. In other words, the re-sampling unit 500 re-samples an input signal having a coefficient of M/D times the original input signal, before the processing by the QMF analysis filter bank 504. In this way, the re-sampling unit 500 generates frequency components in the whole QMF domain having a coefficient of M/D times.

In the case where pitch stretch processing must be performed plural times, for example, when double and triple pitch stretch processing must be performed, the following processing is most suitable. In order to match re-sampling processes using different multiplying factors, it is necessary to provide plural delay circuits with delay amounts mutually different according to the respective re-sampling processes. The delay circuits perform time adjustment before the output signals processed to have a double or triple pitch are synthesized.

Figure 16A:
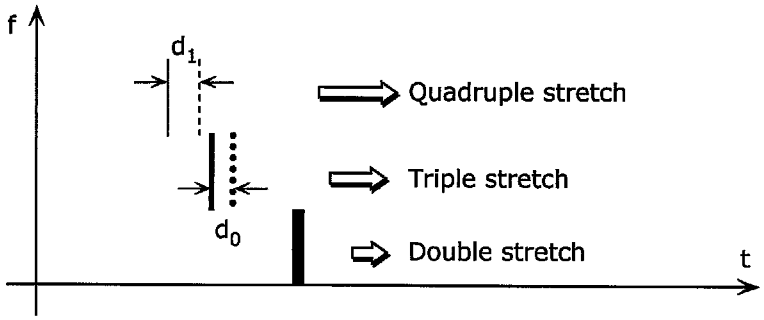
FIG. 16A is a diagram showing an output having a pitch shifted by re-sampling processing.

The following description is given taking an example of stretching a frequency bandwidth by performing double or triple pitch stretch processing on a signal including low frequency components. In order to achieve this, the audio signal processing apparatus performs re-sampling processing first. FIG. 16A is a diagram showing an output after pitch stretch processing. The vertical axis in FIG. 16A shows the frequency axis, and the horizontal axis shows the time axis.

The audio signal processing apparatus performs re-sampling processing by generating a signal processed to have a double pitch (the bold black line in FIG. 16A) or a signal processed to have a triple pitch (the thin black line in FIG. 16A) with respect to the signal including low frequency components (the boldest black lines in FIG. 16A). In the case where there is a delay in the time domain, a signal after being subjected to the double pitch stretch processing has a delay time of $d_0$, and a triple pitch stretch processing signal has a delay time of $d_1$.

Figure 16B:
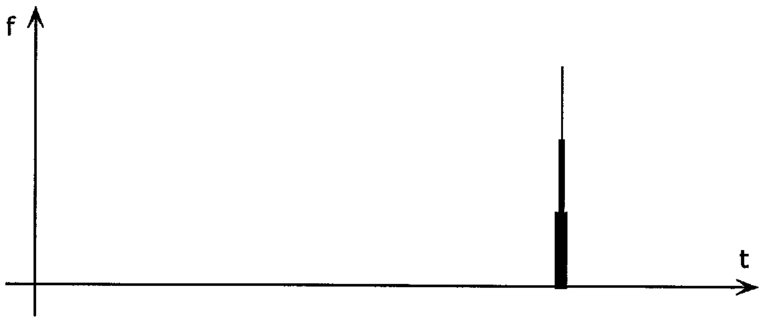
FIG. 16B is a diagram showing an expected output resulting from time stretch processing.

In order to generate a high bandwidth signal, the audio signal processing apparatus performs a double time stretch, a triple time stretch, and a quadruple time stretch on the original signal, the signal having the double frequency bandwidth, and the signal having the triple frequency bandwidth, respectively. As a result, the audio signal processing apparatus can generate, as a high bandwidth signal, a signal synthesized from these signals, as shown in FIG. 16B.

Figure 16C:
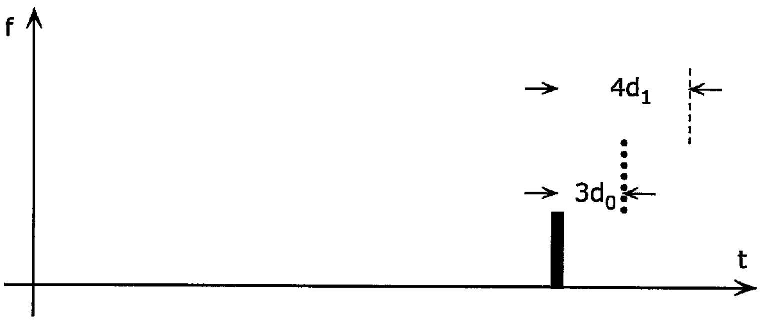
FIG. 16C is a diagram showing an erroneous output resulting from time stretch processing.

When there are time delays, the differences in the delay amounts are also subjected to a pitch stretch as shown in FIG. 16C, the high bandwidth signal may have a problem of a delay amount mismatch. The aforementioned delay circuits perform time adjustment so as to reduce the time delays.

The aforementioned re-sampling method may be performed without any modifications. However, in order to further reduce the operation amount in the above processing, the low-pass filter 502 may be implemented as a polyphase filter bank. In the case where the low-pass filter 502 has a high order, it is also good to implement the low-pass filter 502 in the FFT domain, based on the convolution principle with an aim to reduce the operation amount.

Furthermore, when M/D<1.0, in other words, when a pitch is increased by pitch stretch processing, the operation amounts in the QMF analysis filter bank 504 and the time stretching circuit 505 at later stages are larger than the processing amount necessary for the re-sampling processing. Therefore, the overall operation amount is reduced by inverting the order of the time stretches and re-sampling processes.

In addition, in FIG. 15, the re-sampling unit 500 is provided at a stage earlier than the QMF analysis filter bank 504. This arrangement is for minimizing degradation in the sound quality of a particular sound source (for example, a single sinusoidal wave etc.) due to pitch stretch processing. When pitch shift processing is performed after the processing by the QMF analysis filter bank 504, the sinusoidal wave signal included in the original audio signal is divided into plural QMF blocks. For this reason, when pitch shift processing is performed on the signal, the original sinusoidal wave signal is inevitably dispersed into many QMF blocks.

In other words, it is better to perform re-sampling processing including the above-described steps on the particular sound source such as a single sinusoidal wave. However, it is very rare that only a single sinusoidal wave signal is inputted in a general pitch shift processing on an audio signal. For this reason, the re-sampling processing that is a cause to increase the operation amount may be skipped.

In this way, the audio signal processing apparatus may be configured to directly perform pitch stretch processing on the QMF coefficient generated by the QMF analysis filter bank 504. With this structure, the quality of the audio signal subjected to the pitch stretch processing may be slightly lower when the audio signal represents the particular sound source such as the single sinusoidal wave. However, the audio signal processing apparatus with this structure can sufficiently maintain the quality of the other general audio signals. In view of this, the processing units each requiring a very large processing amount are eliminated by skipping the re-sampling processing. Accordingly, the overall processing amount is reduced.

Furthermore, the audio signal processing apparatus may be configured to have an appropriate combination of some of the structural elements selected according to an application.

Embodiment 6

An audio signal processing apparatus according to Embodiment 6 performs time stretch and/or compression processing and frequency modulation processing in a QMF domain, as in Embodiment 5. Embodiment 6 differs from Embodiment 5 in that the re-sampling processing performed in Embodiment 5 is not performed. The audio signal processing apparatus according to Embodiment 6 includes the same structural elements as the audio signal processing apparatus as shown in FIG. 13.

The audio signal processing apparatus as shown in FIG. 13 performs both time stretch and/or compression processing and frequency modulation processing. For this reason, the QMF analysis filter bank 1001 transforms an audio signal into a QMF coefficient. Next, the adjusting circuit 1002 performs phase adjustment on the resulting QMF coefficient as described in Embodiments 1 to 4.

A QMF domain transformer 1003 transforms the adjusted QMF coefficient into a new QMF coefficient. A band pass filter 1004 performs bandwidth restriction on the QMF domain as necessary. The bandwidth restriction is required when aliasing is reduced. Lastly, a QMF synthesis filter bank 1005 transforms the new QMF coefficient into a time domain signal.

Here, the audio signal processing apparatus according to Embodiment 6 may output the new QMF coefficient directly to another audio signal processing apparatus at a later stage without applying any QMF synthesis filter. The audio signal processing apparatus at the later stage executes, for example, audio signal processing based on the SBR technique. The outline of Embodiment 6 is as described above.

The audio signal processing apparatus according to Embodiment 6 performs pitch-stretch frequency modulation processing different from the processing in Embodiment 5.

Since the frequency modulation processing is performed by pitch stretch and/or compression, the frequency modulation processing performed by a pitch stretch significantly simplifies the approach for re-sampling a time domain audio signal. However, this structure requires a low-pass filter necessary for suppressing aliasing. For this reason, the low-pass filter causes a delay. In general, a low-pass filter having a high order is necessary to increase the accuracy of re-sampling processing. However, a high-order filter causes a large delay.

Figure 17:
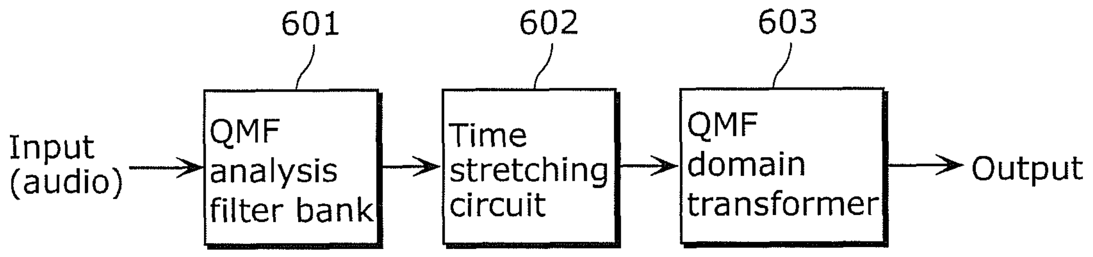
FIG. 17 is a structural diagram of an audio signal processing apparatus according to Embodiment 6.

For this reason, the audio signal processing apparatus according to Embodiment 6 as shown in FIG. 17 includes a QMF domain transformer 603 which transforms a coefficient in a QMF domain. The QMF domain transformer 603 executes pitch shift processing different from the re-sampling processing.

The QMF analysis filter bank 601 calculates the QMF coefficient from an input time signal. As in Embodiments 1 to 5, the time stretching circuit 602 performs a time stretch on the calculated QMF coefficient. The QMF domain transformer 603 performs pitch stretch processing on the time-stretched QMF coefficient.

Figure 18:
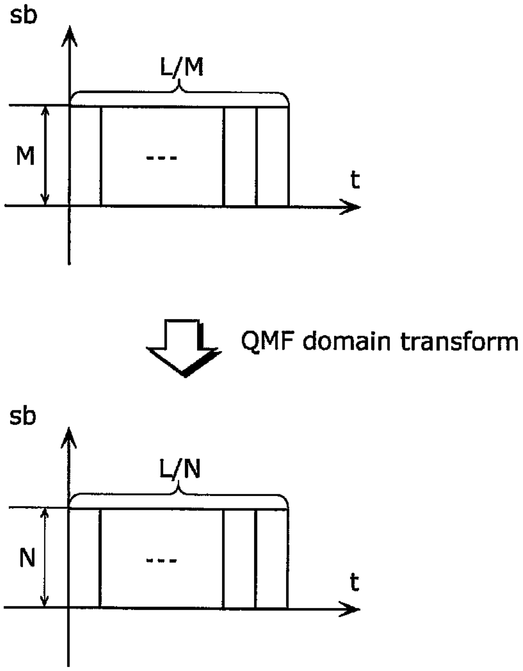
FIG. 18 is a conceptual diagram of QMF domain transform processing according to Embodiment 6.

As shown in FIG. 18, the QMF domain transformer 603 is intended to directly transform a QMF coefficient in a certain QMF domain into a QMF coefficient in another QMF domain having a frequency resolution and a time resolution different from those of the former QMF domain without additionally using a QMF synthesis filter and a QMF analysis filter. As shown in FIG. 18, the QMF domain transformer 603 is capable of transforming a certain QMF block that is composed of a combination of M number of sub-bands and L/M number of time slots into a new QMF block that is composed of a combination of N number of sub-bands and L/N number of time slots.

The QMF domain transformer 603 can change the number of time slots and the number of sub-bands. The time resolution and the frequency resolution of the output signal is modified from those of the input signal. For this reason, the new time stretch factor must be calculated in order to perform both the time stretch processing and the pitch stretch processing at the same time. For example, when a desired time stretch factor is s, and a desired pitch stretch factor is w, the new time stretch factor is calculated according to the following expression.

$$\tilde{S}=S\cdot W \quad \text{[Math. 50]}$$

FIG. 17 is a diagram showing the structure for performing both the time stretch processing and the pitch stretch processing. Here, the audio signal processing apparatus as shown in FIG. 17 is configured to perform time stretch processing (by a time stretching circuit 602) and pitch stretch processing (by a QMF domain transformer 603) in this listed order. However, the audio signal processing apparatus may be configured to perform the pitch stretch processing first and then perform the time stretch processing. Here, it is assumed that L number of input samples is prepared.

The QMF analysis filter bank 601 calculates, from each of the L number of samples, QMF blocks each composed of a combination of the M number of sub-bands and the L/M number of time slots. Based on the QMF coefficients of the respective QMF blocks calculated in this way, the time stretching circuit 602 calculates QMF blocks each composed of a combination of the M number of sub-bands and the following number of time slots.

$$\tilde{s}\cdot L/M \quad \text{[Math. 51]}$$

Lastly, the QMF domain transformer 603 transforms each of the stretched QMF block into another QMF block composed of a combination of the w·M number of sub-bands and the s·L/M number of time slots (when w>1.0, the smallest sub-band in the M number of sub-bands is the final output signal).

The processing performed by the QMF domain transformer 603 is equivalent to mathematical compression of operation processing performed by the QMF synthesis filter bank and the QMF analysis filter bank. The audio signal processing apparatus is configured to include an internal delay circuit when the operation is performed using the QMF synthesis filter bank and the QMF analysis filter bank. Compared with this, the audio signal processing apparatus including the QMF domain transformer 603 can reduce the operation delay and the operation amount. For example, when a sub-band having a sub-band index is $S_k$ (k=0, M−1) is transformed into a sub-band index $S_l$(l=0, . . . , wM−1), the audio signal processing executes the calculation according to Expression 40.

[Math. 52]

$$\begin{aligned} S_l &= \text{QMF\_ANA}_{wM}(\text{QMF\_SYN}_M(S_k, P_M), P_{wM}) \\ &= \text{QMF\_convert}(S_k, P_M, P_{wM}) \end{aligned} \quad \text{(Expression 40)}$$

Here, $P_M$ and $P_{wM}$ denotes a prototype function of a QMF analysis filter bank and a prototype function of a QMF synthesis filter bank, respectively.

Next, the following describes another example of pitch shift processing. Unlike the aforementioned pitch shift processing, the audio signal processing apparatus performs the following processing.

(a) The audio signal processing apparatus detects the frequency components of a signal included in a QMF block before being subjected to stretch processing.

(b) The audio signal processing apparatus shifts the frequency based on a predetermined transform factor. One simple method for shifting the frequency is a method of multiplying the pitch of the input signal by the transform factor.

(c) The audio signal processing apparatus generates a new QMF block having desired shifted frequency components.

The audio signal processing apparatus calculates the frequency component ω(n, k) of the signal in the QMF block calculated by the QMF transform according to Expression 41.

[Math. 53]

$$\omega(n,k)=\begin{cases} princ\arg(\Delta\varphi(n,k))/\pi+k & k \text{ is even} \\ princ\arg(\Delta\varphi(n,k)-\pi)/\pi+k & k \text{ is odd} \end{cases} \quad \text{(Expression 41)}$$

Here, princarg(α) denotes a fundamental frequency in α. In addition, Δϕ(n, k) is represented according to Δϕ(n, k)=ϕ(n, k)−ϕ(n−1, k), and denotes the phase difference of two QMF components in the same sub-band k.

The fundamental frequency after the desired stretch is calculated as $P_0\cdot\omega(n, k)$ using the transform factor $P_0$ (assuming that $P_0>1$ is satisfied).

Figure 19:
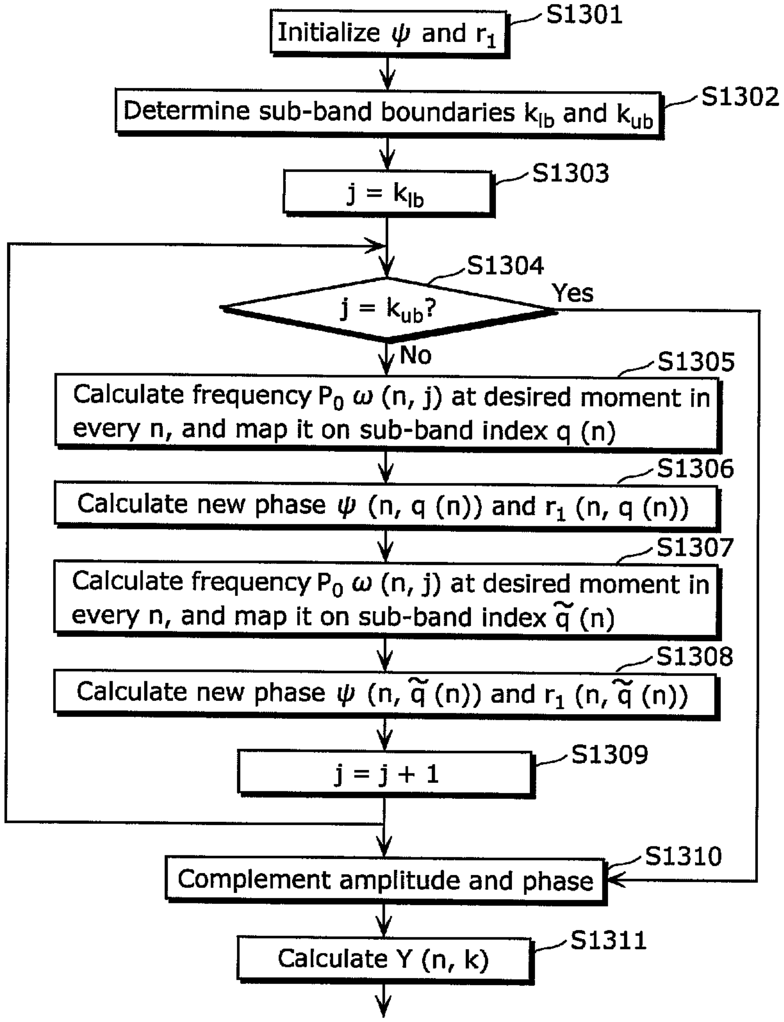
FIG. 19 is a flowchart of frequency modulation processing according to Embodiment 6.

The nature of a pitch stretch and pitch compression (referred to as shifts as a whole) is to generate desired frequency components on the shifted QMF block. The pitch shift processing is represented also as the following steps as shown in FIG. 19.

(a) First, the audio signal processing apparatus initializes the shifted QMF block (S1301). The audio signal processing apparatus sets, to 0, the phase ψ(n, k) and the amplitude $r_1$(n, k) of each of the QMF blocks.

(b) Next, the audio signal processing apparatus determines the boundaries of the sub-bands by rounding up the sub-bands by the transform factor $P_0$ (S1302). When $P_0>1$ is satisfied, the audio signal processing apparatus calculates the sub-band boundary $k_{lb}$ that is the lower one assuming that $k_{lb}=0$ is satisfied in order to prevent aliasing, and calculates the sub-band boundary $k_{ub}$ that is the higher one assuming that $k_{ub}$=floor ($M/P_0$) is satisfied.

This is because all the frequency components are included in the following range.

$$\text{Lower limit: } \frac{1}{2M},\ \text{Upper limit: } \frac{1}{P_0}\left(1-\frac{1}{2M}\right) \qquad \text{[Math. 54]}$$

(c) The audio signal processing apparatus maps the frequency $P_0\cdot\omega(n, j)$ after being subjected to the shift in the j-th sub-band at $[k_{lb}, k_{ub}]$ onto the index q(n)=round ($P_0\cdot\omega(n, j)$).

(d) The audio signal processing apparatus reconstructs the phase and amplitude of the new block (n, q(n)) (S1306). Here, the audio signal processing apparatus calculates the new amplitude according to Expression 42.

[Math. 55]

$$r_1(n, q(n)) = r_1(n, q(n)) + r_0(n, j)\cdot F\left(P_0\cdot\omega(n, j) - q(n) - \frac{1}{2}\right); \qquad \text{(Expression 42)}$$

A function F( ) is described later.

The audio signal processing apparatus calculates the new phase according to Expression 43.

[Math. 56]

$$\psi(n, q(n)) = \begin{cases} \frac{1}{2}\cdot\begin{pmatrix}\psi(n, q(n)) + \psi(n-1, q(n)) + \\ (df(n)-1)\cdot\pi\end{pmatrix} & q(n) \text{ is even} \\ \frac{1}{2}\cdot\begin{pmatrix}\psi(n, q(n)) + \psi(n-1, q(n)) + \\ (df(n)-1)\cdot\pi - \pi\end{pmatrix} & q(n) \text{ is odd}\end{cases} \qquad \text{(Expression 43)}$$

It is a prerequisite here that $df(n)=P_0\cdot\omega(n, j)-q(n)$ and ω(n, q(n)) are "involved" in the adjustment. The audio signal processing apparatus adds 2π plural times in order to assure that $-\pi\leq\psi(n, q(n))<\pi$ is satisfied.

(e) The audio signal processing apparatus maps the following sub-band index of the desired frequency components $P_0\cdot\omega(n, j)$ onto the sub-band calculated according to Expression 44 (S1307).

$$\tilde{q}(n) \qquad \text{[Math. 57]}$$

[Math. 58]

$$\tilde{q}(n) = \begin{cases} q(n)+1 & \text{if } P_0\cdot\omega(n, j) > q(n)+1/2 \\ q(n)-1 & \text{if } P_0\cdot\omega(n, j) < q(n)+1/2 \end{cases} \qquad \text{(Expression 44)}$$

(d) The audio signal processing apparatus reconstructs the phase and amplitude of the following new block (S1308).

$$(n,\tilde{q}(n)) \qquad \text{[Math. 59]}$$

Next, the audio signal processing apparatus calculates the new amplitude according to Expression 45.

[Math. 60]

$$r_1(n, \tilde{q}(n)) = r_1(n, \tilde{q}(n)) + r_0(n, j)\cdot F\left(P_0\cdot\omega(n, j) - \tilde{q}(n) - \frac{1}{2}\right); \qquad \text{(Expression 45)}$$

A function F( ) is described later.

The audio signal processing apparatus calculates the new phase according to Expression 46.

[Math. 61]

$$\psi(n,\tilde{q}(n))=\psi(n,q(n))-\psi(n-1,q(n))+\psi(n-1,\tilde{q}(n))+\pi \qquad \text{(Expression 46)}$$

$$\psi(n,\tilde{q}(n)) \qquad \text{[Math. 62]}$$

It is a prerequisite that the above phase is "involved" in the adjustment. The audio signal processing apparatus adds 2π plural times in order to assure that the following is satisfied.

$$-\pi\leq\psi(n,\tilde{q}(n))<\pi \qquad \text{[Math. 63]}$$

(g) The value included in the new QMF block may be "0" because $P_0>1$ is satisfied once the audio signal processing apparatus processes all the sub-band signals included within the range of $[k_{lb}, k_{ub}]$. The audio signal processing apparatus performs linear complementation so that the phase information of each of the block is "non-zero". In addition, the audio signal processing apparatus complements the amplitude based on the phase information (S1310).

(h) The audio signal processing apparatus transforms the amplitude and phase information of the new QMF block into block signals representing complex coefficients (S1311).

The amplitude adjustment and complementation are not described here. This is because the both relates to the relationship between the frequency components and amplitude of a signal in the QMF domain.

A sinusoidal signal having an excellent tonality may generate signal components of two different QMF sub-bands as shown in the above (c) and (e). As a result, the relationship between the amplitudes of these two sub-bands depend on the prototype filter of the QMF analysis filter bank (QMF transform).

Figure 20A:
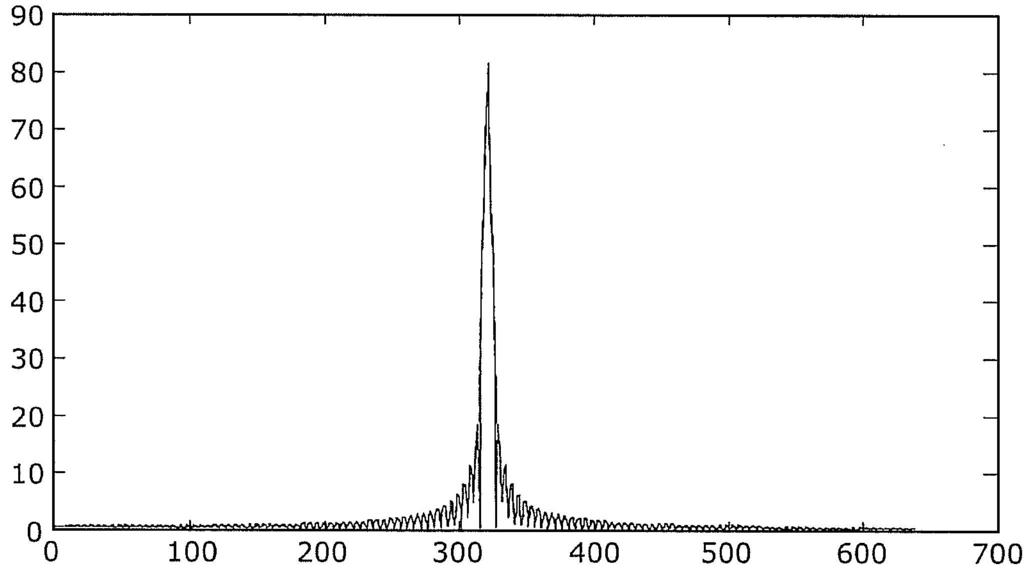
FIG. 20A is a diagram showing an amplitude response of a QMF prototype filter.

For example, it is a precondition that the QMF analysis filter bank (QMF transform) is a filter bank for use in the MPEG Surround and the HE-AAC format. FIG. 20A is a diagram showing an amplitude response of a prototype filter p(n) (having a filter length of 640 samples). In order to achieve an almost perfect reconstructivity, the amplitude response is suddenly attenuated outside the frequency range of [−0.5, 0.5]. Regarding the prototype filter as a reference, the coefficient of the complex analysis filter bank having M bands is defined according to the following expression.

[Math. 64]

$$h_k(n) = p(n)\exp\left\{i\frac{\pi}{M}\left(k+\frac{1}{2}\right)(n-\theta)\right\} \ (k=0, 1, \ldots, M-1)$$

Figure 20B:
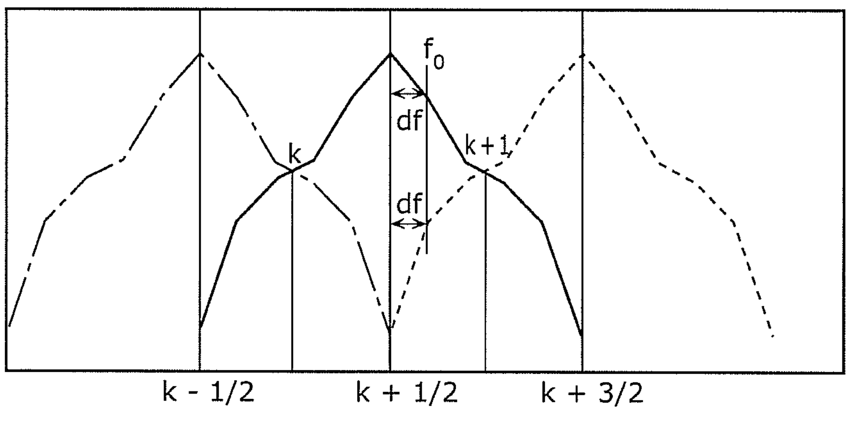
FIG. 20B is a diagram showing the relationships between frequencies and amplitudes.

In this case, the complex filter bank is configured such that the center frequency is k+½ in the k-th sub-band. FIG. 20B is a diagram showing decimated frequency responses. For convenience, the amplitude characteristics in the k−1-th sub-band is represented by the broken line at the left side of FIG. 20B, and the amplitude characteristics in the k+1-th sub-band is represented by the broken line at the right side of FIG. 20B.

As shown in FIG. 20B, when $0<df=f_0-(k+½)<1$ is satisfied for the component of a frequency $f_0(k-1 \le f_0 < k+1)$, the two blocks having the k-th and k+1-th sub-bands are provided. In addition, when $-1<df=f_0-(k+½)<0$ is satisfied, the two blocks having the k−1-th and k-th sub-bands are provided (See the above (e)). The corresponding amplitudes depend on (i) the difference between the frequency $f_0$ and the center frequency of the k-th sub-band and (ii) the amplitude of the sub-band filter.

The amplitude F(df) of the sub-band is a symmetric function in $-1 \le df < 1$.

[Math. 65]

$$F(x) = F(-x) = \begin{cases} 0 & x=-1 \\ \frac{\sqrt{2}}{2} & x=-1/2 \\ 1 & x=0 \end{cases}$$

Since two blocks are present in the same frequency, the phase difference needs to satisfy the following condition.

$$\Delta\psi(n,\tilde{q}(n))=\Delta\psi(n,q(n))+\pi \quad \text{[Math. 66]}$$

For the above reason, the phase complementation processing should not be processed as linear complementation. Instead, the relationship between the frequency components and the amplitude information of a signal should be as indicated above.

As described above, in Embodiment 6, phase adjustment and amplitude adjustment are performed in a QMF domain. As described so far, the audio signal processing apparatus transforms audio signal segments each corresponding to a unit of time into sequential coefficients in the QMF domain (QMF blocks). Next, the audio signal processing apparatus adjusts the amplitudes and phases of the respective QMF blocks such that the continuity in the phases and amplitudes of adjacent QMF blocks is maintained according to a prespecified stretch rate (s times, for example, s=2, 3, 4 etc.). In this way, the audio signal processing apparatus performs phase vocoder processing.

The audio signal processing apparatus cause the QMF synthesis filter bank to transform the QMF coefficients in the QMF domain subjected to the phase vocoder processing into time domain signals. This yields audio signals in the time domain each having a time stretched by s times. In addition, there is a case another audio signal processing apparatus provided at a later stage uses the QMF coefficients. In this case, the later-stage audio signal processing apparatus may perform any audio processing such as bandwidth expansion processing based on the SBR technique, on the coefficients of the QMF blocks subjected to the phase vocoder processing in the QMF domain. In addition, the later-stage audio signal processing apparatus may cause a QMF synthesis filter bank to transform the QMF coefficients into time domain audio signals.

The structure shown in FIG. 3 is an example of such a combination. This is an example of an audio decoding apparatus which performs a combination of the phase vocoder processing in the QMF domain and the technique for expanding the bandwidth of an audio signal. The following description is given of the structure of the audio decoding apparatus using the phase vocoder.

The demultiplexing unit 1201 demultiplexes an input bitstream into parameters for generating high frequency components and coded information for decoding low frequency components. The parameter decoding unit 1207 decodes the parameters for generating high frequency components. The decoding unit 1202 decodes the audio signal of the low frequency components, based on the coded information for decoding low frequency components. The QMF analysis filter bank 1203 transforms the decoded audio signal into an audio signal in the QMF domain.

A frequency modulating circuit 1205 and a time stretching circuit 1204 performs the phase vocoder processing on the QMF domain audio signal. Subsequently, a high frequency generating circuit 1206 generates a signal of high frequency components using the parameters for generating high frequency components. A contour adjusting circuit 1208 adjusts the frequency contour of the high frequency components. The QMF synthesis filter bank 1209 transforms the audio signals of the low frequency components and the high frequency components in the QMF domain into time domain audio signals.

It is to be noted that the coding processing and the decoding processing on the low frequency components may use any format that conforms to any one of the audio coding schemes such as the MPEG-AAC format, the MPEG-Layer 3 format, etc., or may use the format that conforms to a speech coding scheme such as the ACELP.

In addition, when phase vocoder processing is performed in the QMF domain, it is possible to perform weighting on the modulation factor r(m, n) on a per sub-band index (m, n) of the QMF block basis. In this way, the QMF coefficient is modulated by the modulation factor having a different value for each sub-band index. For example, a stretch using a sub-band index corresponding to a high frequency component may increase the distortion in the resulting audio signal. For such a sub-band index, a stretch factor that reduces the stretch rate is used.

Furthermore, the audio signal processing apparatus may include another QMF analysis filter bank at a later stage of the QMF analysis filter bank, as an additional structural element for performing the phase vocoder processing in the QMF domain. When only a first QMF analysis filter bank is provided, the frequency resolution of low frequency components may be low. In this case, it is impossible to obtain a sufficient effect even when the phase vocoder processing is performed on the audio signal including a lot of low frequency components.

For this reason, in order to increase the frequency resolution of the low frequency components, it is possible to use a second QMF analysis filter bank for analyzing the low frequency portions (such as the half of the QMF blocks included in the output by the first QMF analysis filter bank). In this way, the frequency resolution is doubled. Furthermore, since the phase vocoder processing is performed in the aforementioned QMF domain, it is possible to increase the effects of reducing the operation amount and the memory consumption amount with the sound quality maintained.

FIG. 4 is a diagram showing an exemplary structure for increasing the resolutions in the QMF domain. The QMF synthesis filter bank 2401 synthesizes an input audio signal using a QMF synthesis filter first. Next, the QMF analysis filter bank 2402 calculates the QMF coefficients using another QMF analysis filter having a doubled resolution. Plural phase vocoder processing circuits (a first time stretching circuit 2403, a second time stretching circuit 2404, and a third time stretching circuit 2405) are arranged in parallel to perform pitch shift processing involving a double time stretch, a triple time stretch, and a quadruple time stretch on the QMF domain signal having the doubled resolution, respectively.

The respective phase vocoder processing circuits integrally perform the phase vocoder processing using the doubled resolution and mutually different stretch rates. A merge circuit 2406 synthesizes the signals resulting from the phase vocoder processing.

The following describes an example of applying the time stretch processing and pitch stretch processing described so far to an audio signal coding apparatus.

Figure 21:
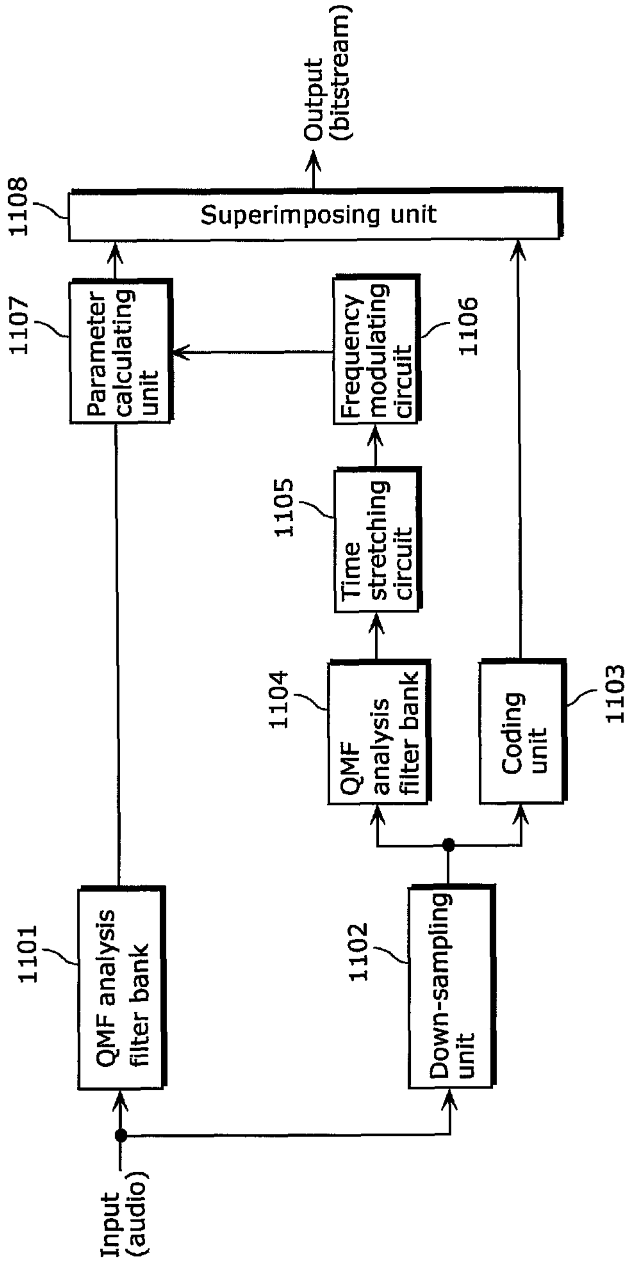
FIG. 21 is a structural diagram of an audio coding apparatus according to Embodiment 6.

FIG. 21 is a structural diagram showing the audio coding apparatus which codes an audio signal by performing time stretch processing and pitch stretch processing. The audio coding apparatus as shown in FIG. 21 performs frame processing on the audio signal segments each having a constant number of samples.

First, a down-sampling unit 1102 generates a signal including only low frequency components by down-sampling the audio signal. A coding unit 1103 generates coded information by coding the audio signal including only low frequency components, using the audio coding schemes such as the MPEG-AAC, the MPEG-Layer 3, or the AC3. At the same time, the QMF analysis filter bank 1104 transforms the audio signal including only the low frequency components into a QMF coefficient. On the other hand, A QMF analysis filter bank 1101 transforms an audio signal including full band components into a QMF coefficient.

A time stretching circuit 1105 and the frequency modulating circuit 1106 generates a virtual high frequency QMF coefficient by adjusting the signal (QMF coefficient) generated by transforming the audio signal including only low frequency components into a QMF domain signal as shown in any of the above-described embodiments.

A parameter calculating unit 1107 calculates the contour information of the high frequency components by comparing the aforementioned virtual high frequency QMF coefficients and the QMF coefficient (actual QMF coefficient) including the full band components. A superimposing unit 1108 superimposes the calculated contour information on the coded information.

FIG. 3 is a structural diagram of an audio decoding apparatus. The audio decoding apparatus as shown in FIG. 3 is an apparatus which receives the coded information generated by the audio coding apparatus and decodes the coded information to generate an audio signal. The demultiplexing unit 120 demultiplexes the received coded information into first coded information and second coded information. The parameter decoding unit 1207 transforms the second coded information into the contour information of the high frequency QMF coefficient. On the other hand, the decoding unit 1202 decodes the audio signal including only the low frequency components, based on the first coded information. The QMF analysis filter bank 1203 transforms the decoded audio signal into a QMF coefficient including only low frequency components. The time stretching circuit 1204 and the frequency modulating circuit 1205 performs time and pitch adjustments on the QMF coefficient including only the low frequency components, as shown in any of the above-described embodiments. In this way, a virtual QMF coefficient including high frequency components is generated.

The contour adjusting circuit 1208 and the high frequency generating circuit 1206 adjust the virtual QMF coefficient including the high frequency components, based on the contour information included in the received second coded information. The QMF synthesis filter bank 1209 synthesizes the adjusted QMF coefficient and the low frequency QMF coefficient. Next, the QMF synthesis filter bank 1209 transforms the resulting synthesis QMF coefficient into a time domain audio signal including both the low frequency components and the high frequency components, using the QMF synthesis filter.

In this way, the audio coding apparatus transmits the time stretch and/or compression rate(s) as coded information. The audio decoding apparatus decodes the audio signal using the time stretch and/or compression rate(s). In this way, the audio coding apparatus can change time stretch and/or compression rate(s) variously on a per frame basis. This enables flexible control of the high frequency components. Therefore, a high coding efficiency is achieved.

Figure 22:
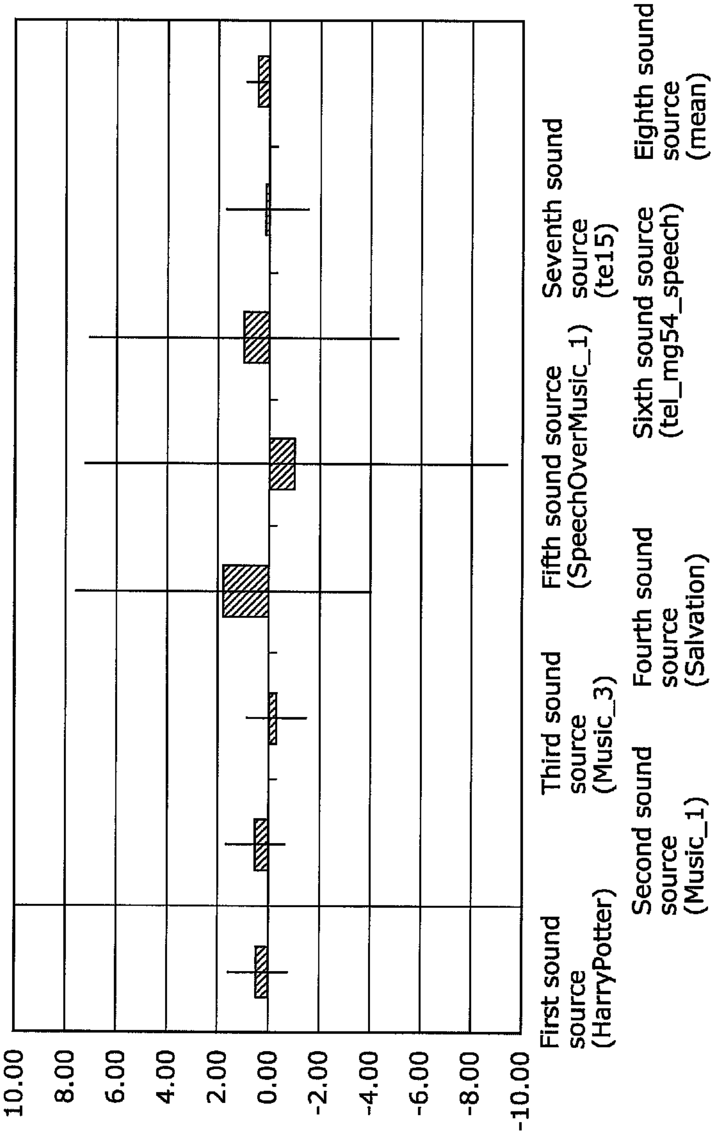
FIG. 22 is an illustration of results of evaluation on the quality of sounds.

FIG. 22 is a diagram showing the results of a sound quality comparison test in a case of using conventional SFTF-based circuits for time stretching and frequency modulation and a case of using QMF-based circuits for time stretching and frequency modulation. The results shown in FIG. 22 are obtained from tests under conditions of a bit rate of 16 kbps and a monophonic signal. In addition, these results are based on the evaluation according to the MUSHRA (Multiple Stimuli with Hidden Reference and Anchor) method.

In FIG. 22, the vertical axis represents the sound quality difference from the one according to the STFT method, and the horizontal axis represents the sound sources each having different audio characteristics. FIG. 22 shows that the QMF-based methods achieve approximately equivalent sound quality in coding and decoding, compared with the sound quality achieved according to the SFTF-based methods in coding and decoding. The sound sources used in the texts are sound sources having a sound quality that is likely to be degraded in coding and decoding. For this reason, it is apparent that the other general audio signals are coded and decoded with the equivalent performances maintained.

In this way, the audio signal processing apparatus according to the present invention performs time stretch processing and pitch stretch processing in the QMF domain. The audio signal processing according to the present invention is performed using a QMF filter, unlike the classical STFT-based time stretch processing and pitch stretch processing. For this reason, the audio signal processing according to the present invention does not need to use any FFT that requires a large operation amount, and thus can achieve the equivalent advantageous effect with a less operation amount. In addition, since the STFT-based methods involve processing using a hop size, processing delay occurs. In contrast, the QMF-based methods produce a very small processing delay by the QMF filter. For this reason, the audio signal processing apparatus according to the present invention further provides an excellent advantageous effect of being able to significantly reduce the processing delay.

Embodiment 7

Figure 23A:
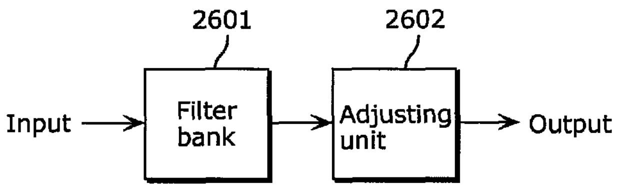
FIG. 23A is a structural diagram of an audio signal processing apparatus according to Embodiment 7.

FIG. 23A is a structural diagram of an audio signal processing apparatus according to Embodiment 7. The audio signal processing apparatus as shown in FIG. 23A includes a filter bank 2601, and an adjusting unit 2602. A filter bank 2601 performs the same operations as performed by the QMF analysis filter bank 901 etc. as shown in FIG. 1. An adjusting unit 2602 performs the same operations as performed by the adjusting circuit 902 etc. as shown in FIG. 1. An audio signal processing apparatus as shown in FIG. 23A transforms an input audio signal sequence using a predetermined adjustment factor. Here, the predetermined adjustment factor corresponds to any one of a time stretch or compression rate, a frequency modulation rate, and a combination of these rates.

Figure 23B:
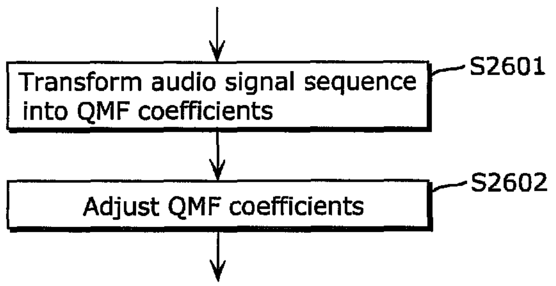
FIG. 23B is a flowchart of processing performed by the audio signal processing apparatus according to Embodiment 7.

FIG. 23B is a flowchart indicating processing performed by the audio signal processing apparatus as shown in FIG. 23A. The filter bank 2601 transforms the input audio signal sequence into QMF coefficients, using a QMF analysis filter (S2601). The adjusting unit 2602 adjusts the QMF coefficients depending on the adjustment factor (S2602).

For example, the adjusting unit 2602 adjusts the phase information and the amplitude information of QMF coefficients depending on the adjustment factor indicating a predetermined time stretch or compression rate such that an input audio signal sequence having a time length stretched by the predetermined stretch or reduction rate can be obtained from the adjusted QMF coefficients. Alternatively, the adjusting unit 2602 adjusts the phase information and amplitude information of the QMF coefficients depending on the adjustment factor indicating the predetermined frequency modulation rate such that an input audio signal sequence having a frequency modulated (pitch-shifted) by the predetermined frequency modulation rate can be obtained from the adjusted QMF coefficients.

Figure 24:
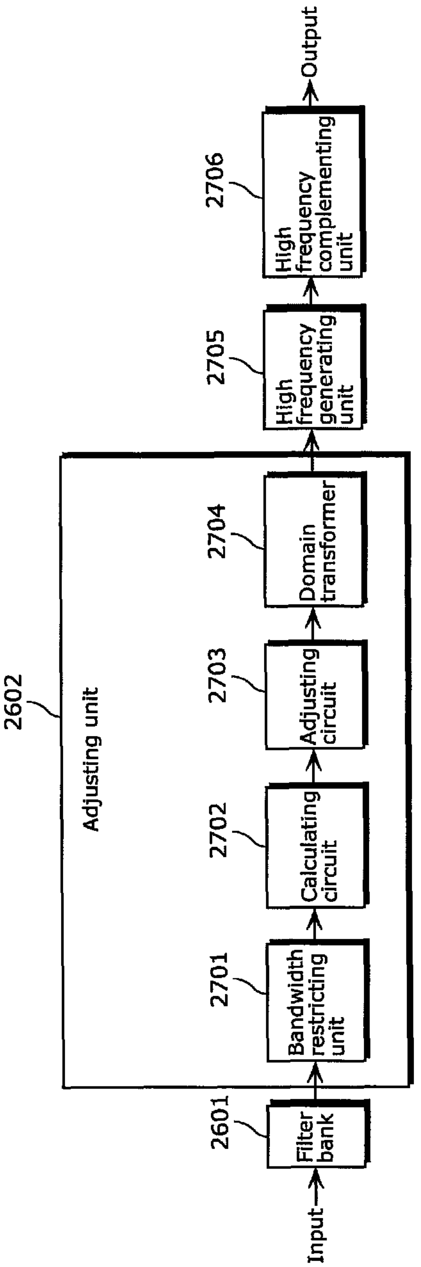
FIG. 24 is a structural diagram of a variation of the audio signal processing apparatus according to Embodiment 7.

FIG. 24 is a structural diagram of a variation of the audio signal processing apparatus according to Embodiment 23A. The audio signal processing apparatus as shown in FIG. 24 includes a high frequency generating unit 2705 and a high frequency complementing unit 2706, in addition to the structural elements of the audio signal processing apparatus as shown in FIG. 23A. In addition, the adjusting unit 2602 includes a bandwidth restricting unit 2701, a calculating circuit 2702, an adjusting circuit 2703, and a domain transformer 2704.

The filter bank 2601 generates QMF coefficients based on constant time intervals by performing sequential transform on an input audio signal sequence to generate QMF coefficients based on the constant time intervals. The calculating circuit 2702 calculates the phase information and the amplitude information for each of combinations of one of time slots and one of sub-bands in the QMF coefficients generated based on the constant time intervals. The adjusting circuit 2703 adjusts the phase information and amplitude information of the QMF coefficients by adjusting the phase information for each combination of the time slot and the sub-band in the QMF coefficients, depending on the predetermined adjustment factor.

The bandwidth restricting unit 2701 operates in the same manner as the bandwidth restricting filter 1802 as shown in FIG. 14. In other words, the bandwidth restricting unit 2701 extracts new QMF coefficients corresponding to the predetermined bandwidth from the QMF coefficients, before the adjustment of the QMF coefficients. The domain transformer 2704 operates in the same manner as the QMF domain transformer as shown in FIG. 17. In other words, the domain transformer 2704 transforms the QMF coefficients into new QMF coefficients having different time and frequency resolutions.

It is to be noted that, the bandwidth restricting unit 2701 extracts new QMF coefficients corresponding to the predetermined bandwidth from the QMF coefficients, after the adjustment of the QMF coefficients. In addition, the domain transformer 2704 may transform the QMF coefficients into new QMF coefficients having different time and frequency resolutions before the adjustment of the QMF coefficients.

The high frequency generating unit 2705 operates in the same manner as the high frequency generating circuit 1206 as shown in FIG. 3. In other words, the high frequency generating unit 2705 generates high frequency coefficients which are new QMF coefficients corresponding to a high frequency bandwidth higher than the frequency bandwidth corresponding to the QMF coefficients before being subjected to the adjustment, based on the adjusted QMF coefficients and using the predetermined transform factor.

The high frequency complementing unit 2706 operates in the same manner as the contour adjusting circuit 1208 as shown in FIG. 3. In other words, the high frequency complementing unit 2706 complements a factor of a bandwidth without any high frequency coefficients using the high frequency coefficients partly corresponding to the adjacent bandwidths located at the both sides of the bandwidth without any high frequency coefficients. Here, the bandwidth without any high frequency coefficients is a frequency bandwidth for which no high frequency coefficients has been generated by the high frequency generating unit 2705.

Figure 25:
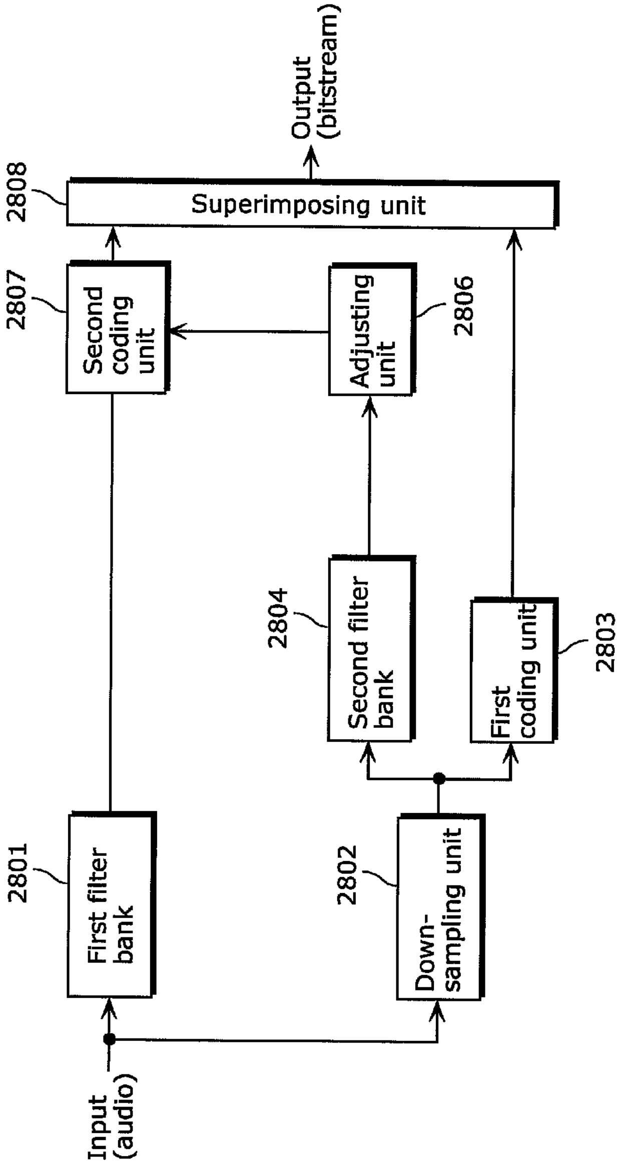
FIG. 25 is a structural diagram of the audio coding apparatus according to Embodiment 7.

FIG. 25 is a structural diagram of the audio coding apparatus according to Embodiment 7. The audio coding apparatus as shown in FIG. 25 includes a down-sampling unit 2802, a first filter bank 2801, a second filter bank 2804, a first coding unit 2803, a second coding unit 2807, an adjusting unit 2806, and a superimposing unit 2808. The audio coding apparatus as shown in FIG. 25 operates in the same manner as the audio coding apparatus as shown in FIG. 21. The structural elements as shown in FIG. 25 correspond to the structural elements as shown in FIG. 21 as indicated below.

A down-sampling unit 2802 operates in the same manner as the down-sampling unit 1102. The first filter bank 2801 operates in the same manner as the QMF analysis filter bank 1101. The second filter bank 2804 operates in the same manner as the QMF analysis filter bank 1104. The first coding unit 2803 operates in the same manner as the coding unit 1103. The second coding unit 2807 operates in the same manner as the parameter calculating unit 1107. The adjusting unit 2806 operates in the same manner as the time stretching circuit 1105. The superimposing unit 2808 operates in the same manner as the superimposing unit 1108.

Figure 26:
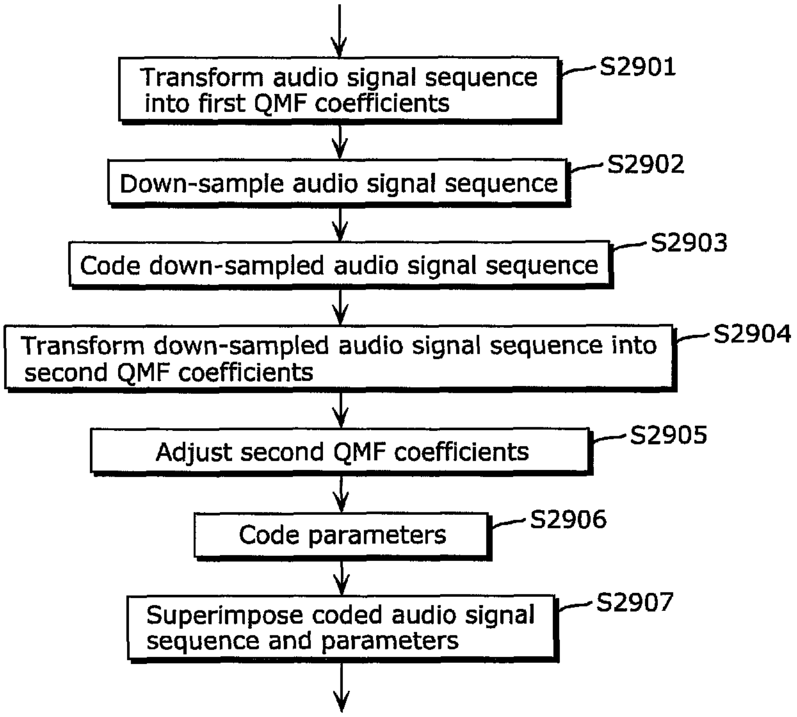
FIG. 26 is a flowchart of processing performed by the audio coding apparatus according to Embodiment 7.

FIG. 26 is a flowchart of processing performed by the audio coding apparatus as shown in FIG. 25.

First, the first filter bank 2801 transforms an input audio signal sequence into QMF coefficients, using a QMF analysis filter (S2901). Next, the down-sampling unit 2802 generates a new audio signal sequence by down-sampling the audio signal sequence (S2902). Next, the first coding unit 2803 codes the generated new audio signal sequence (S2903). Next, the second filter bank 2804 transforms the generated new input audio signal sequence into second QMF coefficients, using a QMF analysis filter (S2904).

Next, the adjusting unit 2806 adjusts the second QMF coefficients depending on the predetermined adjustment factor (S2905). As described above, the predetermined adjustment factor corresponds to any one of a time stretch or compression rate, a frequency modulation rate, and a combination of these rates.

Next, the second coding unit 2807 generates parameters for use in decoding by comparing the first QMF coefficients and the adjusted second QMF coefficients, and codes the generated parameters (S2906). Next, the superimposing unit 2808 superimposes the coded audio sequence and the coded parameters (S2907).

Figure 27:
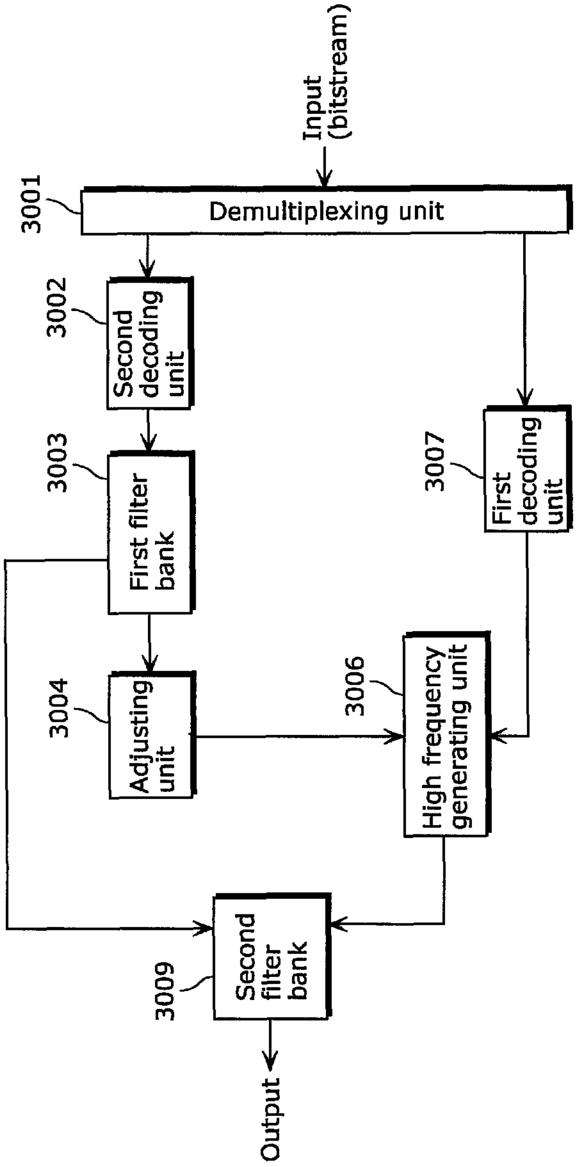
FIG. 27 is a structural diagram of the audio decoding apparatus according to Embodiment 7.

FIG. 27 is a structural diagram of the audio decoding apparatus according to Embodiment 7. The audio decoding apparatus as shown in FIG. 27 includes a demultiplexing unit 3001, a first decoding unit 3007, a second decoding unit 3002, a first filter bank 3003, a second filter bank 3009, an adjusting unit 3004, and a high frequency generating unit 3006. The audio decoding apparatus as shown in FIG. 27 operates in the same manner as the audio decoding apparatus as shown in FIG. 3. The structural elements as shown in FIG. 27 correspond to the structural elements as shown in FIG. 3 as indicated below.

The demultiplexing unit 3001 operates in the same manner as the demultiplexing unit 1201. The first decoding unit 3007 operates in the same manner as the parameter decoding unit 1207. The second decoding unit 3002 operates in the same manner as the decoding unit 1202. The first filter bank 3003 operates in the same manner as the QMF analysis filter bank 1203. The second filter bank 3009 operates in the same manner as the QMF synthesis filter bank 1209. The adjusting unit 3004 operates in the same manner as the time stretching circuit 1204. The high frequency generating unit 3006 operates in the same manner as the high frequency generating circuit 1206.

Figure 28:
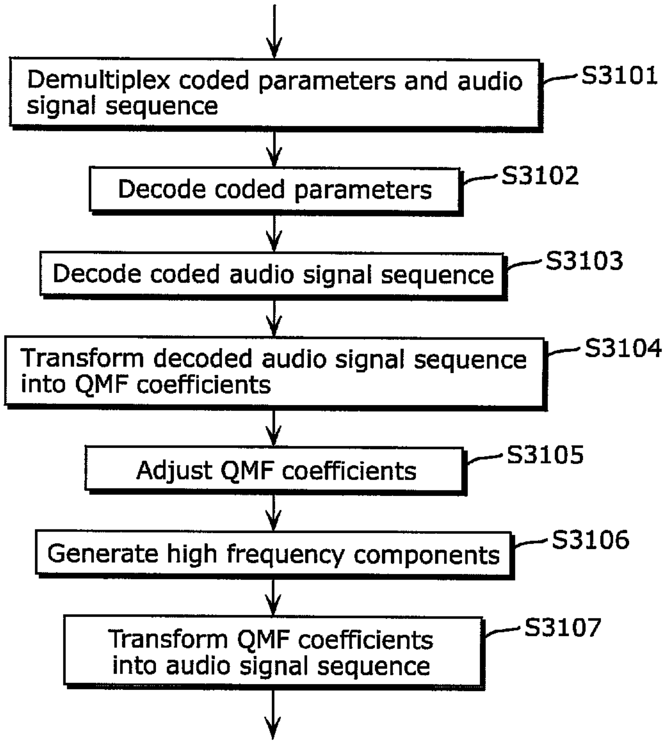
FIG. 28 is a flowchart of processing performed by the audio decoding apparatus according to Embodiment 7.

FIG. 28 is a flowchart of processing performed by the audio decoding apparatus as shown in FIG. 27.

First, the demultiplexing unit 3001 demultiplexes the input bitstream into coded parameters and a coded audio signal sequence (S3101). Next, the first decoding unit 3007 decodes the coded parameters (S3102). Next, the second decoding unit 3002 decodes the coded audio signal sequence (S3103). Next, the first filter bank 3003 transforms the audio signal sequence decoded by the second decoding unit 3002 into QMF coefficients, using a QMF analysis filter (S3104).

Next, the adjusting unit 3004 adjusts the QMF coefficients depending on the predetermined adjustment factor (S3105). As described above, the predetermined adjustment factor corresponds to any one of a time stretch or compression rate, a frequency modulation rate, and a combination of these rates.

Next, the high frequency generating unit 3006 generates high frequency coefficients which are new QMF coefficients corresponding to a frequency bandwidth higher than the frequency bandwidth corresponding to the QMF coefficients, based on the adjusted QMF coefficients and using the decoded parameters (S3106). Next, the second filter bank 3009 transforms the QMF coefficients and the high frequency coefficients into time domain audio signal sequence, using the QMF synthesis filter.

Figure 29:
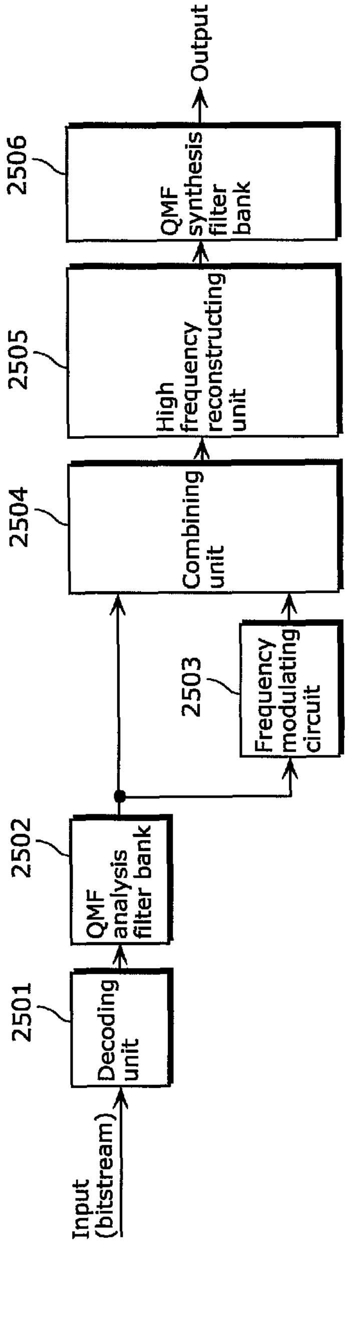
FIG. 29 is a structural diagram of a variation of the audio decoding apparatus according to Embodiment 7.
Figure 30A:
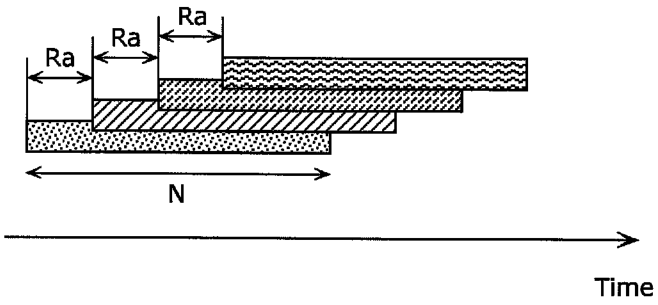
FIG. 30A is an illustration of the state of an audio signal before being subjected to time stretch processing.
Figure 30B:
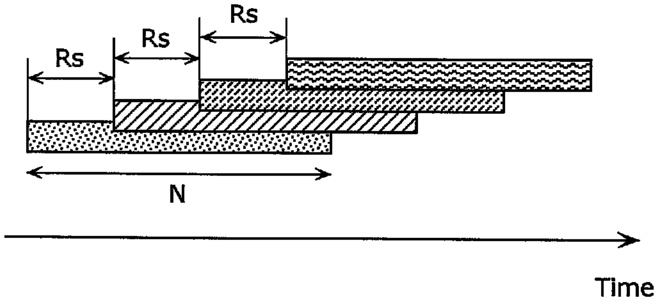
FIG. 30B is an illustration of the state of the audio signal after being subjected to the time stretch processing.
Figure 31:
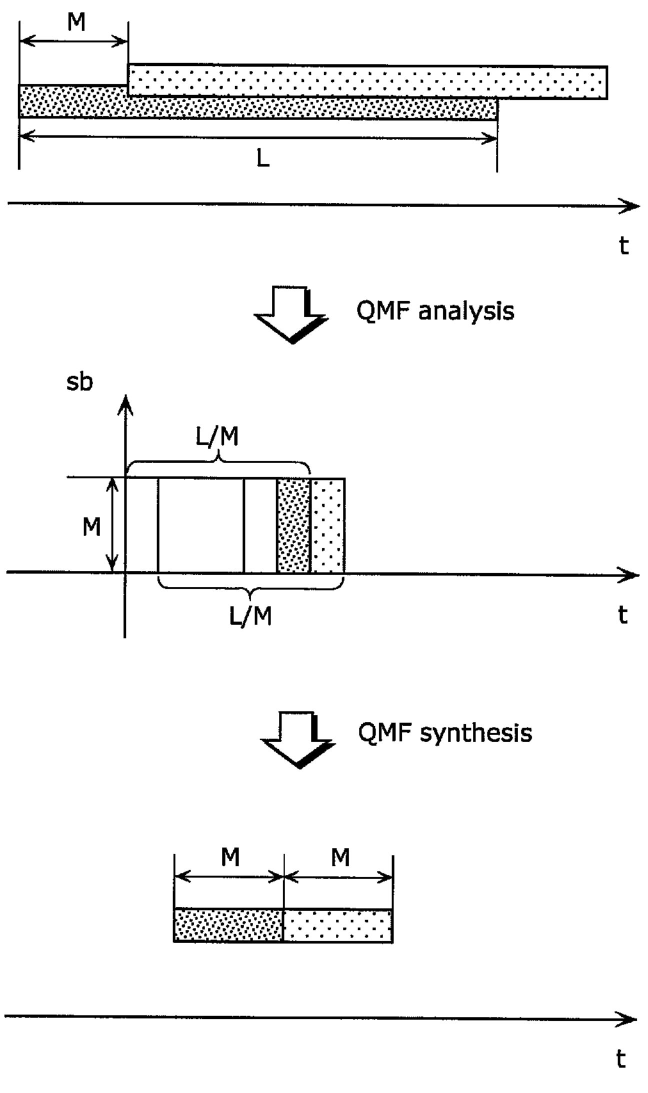
FIG. 31 is an illustration of QMF analysis processing and QMF synthesis processing.

FIG. 29 is a structural diagram of a variation of the audio decoding apparatus as shown in FIG. 27. The audio decoding apparatus as shown in FIG. 29 includes a decoding unit 2501, a QMF analysis filter bank 2502, a frequency modulating circuit 2503, a combining unit 2504, a high frequency reconstructing unit 2505, and a QMF synthesis filter bank 2506.

The decoding unit 2501 decodes an audio signal in the bitstream. The QMF analysis filter bank 2502 transforms the decoded audio signal into a QMF coefficient. The frequency modulating circuit 2503 performs frequency modulation processing on the QMF coefficient. This frequency modulating circuit 2503 includes the structural elements as shown in FIG. 4. As shown in FIG. 4, time stretch processing is internally executed in the frequency modulation processing. The combining unit 2504 combines the QMF coefficient obtained from the QMF analysis filter bank 2502 and the QMF coefficient obtained from the frequency modulating circuit 2503. The high frequency reconstructing unit 2505 reconstructs the QMF coefficient corresponding to high frequency from the combined QMF coefficient. The QMF synthesis filter bank 2506 transforms the QMF coefficient obtained from the high frequency reconstructing unit 2505 into an audio signal.

The audio signal processing apparatus according to the present invention makes it possible to reduce the operation amount more significantly than in the STFT-based phase vocoder processing. Furthermore, since the audio signal processing apparatus outputs a signal in the QMF domain, the audio signal processing apparatus can solve the inefficiency in the domain transform in the parametric coding such as the SBR technique and Parametric Stereo. Furthermore, the audio signal processing apparatus can reduce the memory capacity required for the operation in the domain transform.

Although the audio signal processing apparatuses, the audio coding apparatuses, and the audio decoding apparatuses according to the present invention have been described above based on the above embodiments, the present invention is not limited thereto. Those skilled in the art will readily appreciate that many modifications are possible in the exemplary embodiments, and also other embodiments are obtainable by arbitrarily combining the structural elements in the embodiments. Accordingly, all such modifications and other embodiments are intended to be included within the scope of the present invention.

For example, processing executed by a particular processing unit may be executed by another processing unit. In addition, the execution order of processes may be modified, or plural processes may be performed in parallel.

Furthermore, the present invention can be implemented not only as an audio signal processing apparatus, an audio coding apparatus, and an audio decoding apparatus, but also as methods including the steps corresponding to the processing units of the audio signal processing apparatus, the audio coding apparatus, and the audio decoding apparatus. Furthermore, the present invention can be implemented as programs causing a computer to execute the steps of the methods. Furthermore, the present invention can be implemented as computer-readable recording media such as CD-ROMs having any of the programs recorded thereon.

In addition, the structural elements of each of the audio signal processing apparatus, the audio coding apparatus, and the audio decoding apparatus may be implemented as an LSI (Large Scale Integration) that is an integrated circuit. Each of these structural elements may be made into one chip individually, or a part or an entire thereof may be made into one chip. The name used here is LSI, but it may also be called IC (Integrated circuit), system LSI, super LSI, or ultra LSI depending on the degree of integration.

Moreover, ways to achieve integration are not limited to the LSI, and special circuit or general purpose processor and so forth can also achieve the integration. Field Programmable Gate Array (FPGA) that can be programmed or a reconfigurable processor that allows re-configuration of the connection or configuration of LSI can be used for the same purpose.

Furthermore, when a circuit integration technology for replacing LSIs with new circuits appears in the future with advancement in semiconductor technology and derivative other technologies, the circuit integration technology may be naturally used to integrate the structural elements of the audio signal processing apparatus, the audio coding apparatus, and the audio decoding apparatus.

INDUSTRIAL APPLICABILITY

The audio signal processing apparatus according to the present invention is applicable to audio recorders, audio players, mobile phones and so on.

REFERENCE SIGNS LIST

500 Re-sampling unit
501 Up-sampling unit
502 Low-pass filter
503, 1102, 2802 Down-sampling unit
504, 601, 901, 1001, 1101, 1104, 1203, 1801, 2402, 2502 QMF analysis filter bank
505, 602, 1105, 1204, 1804 Time stretching circuit
603, 1003 QMF domain transformer
902, 1002, 2703 Adjusting circuit
903, 1005, 1209, 1805, 2401, 2506 QMF synthesis filter bank
1004 Band pass filter
1103 Coding unit
1106, 1205, 1803, 2503 Frequency modulating circuit
1107 Parameter calculating unit
1108, 2808 Superimposing unit
1201, 3001 Demultiplexing unit
1202, 2501 Decoding unit
1206 High frequency generating circuit
1207 Parameter decoding unit
1208 Contour adjusting circuit
1802 Bandwidth restricting filter
2403 First time stretching circuit
2404 Second time stretching circuit
2405 Third time stretching circuit
2406 Merge circuit
2504 Combining unit
2505 High frequency reconstructing unit
2601 Filter bank
2602, 2806, 3004 Adjusting unit
2701 Bandwidth restricting unit
2702 Calculating circuit
2704 Domain transformer
2705, 3006 High frequency generating unit
2706 High frequency complementing unit
2801, 3003 First filter bank
2803 First coding unit
2804, 3009 Second filter bank
2807 Second coding unit
3002 Second decoding unit
3007 First decoding unit

The invention claimed is:

1. An audio signal processing apparatus which transforms an input audio signal sequence according to at least one of (i) a predetermined time stretch or compression rate and (ii) a predetermined frequency modulation rate, said audio signal processing apparatus comprising:

a filter bank which transforms the input audio signal sequence into Quadrature Mirror Filter coefficients using a Quadrature Mirror Filter analysis filter for Quadrature Mirror Filter analysis; and an adjusting unit configured to (i) calculate phase information and amplitude information of the Quadrature Mirror Filter coefficients for each of a plurality of time slots of the Quadrature Mirror Filter coefficients and for each of a plurality of sub-bands of the Quadrature Mirror Filter coefficients, and (ii) adjust the phase information and the amplitude information using, for each of the time slots and for each of the sub-bands, an adjustment factor indicating the at least one of the time stretch or compression rate and the frequency modulation rate such that the input audio signal sequence being (a) time stretched at the time stretch or compressed at the compression rate or (b) frequency modulated at the frequency modulation rate can be obtained from the Quadrature Mirror Filter coefficients.

2. The audio signal processing apparatus according to claim 1, wherein said adjusting unit is configured to adjust the phase information and the amplitude information depending on the adjustment factor indicating the time stretch or compression rate such that the input audio signal sequence being time stretched at the time stretch or compressed at the compression rate can be obtained from the Quadrature Mirror Filter coefficients after the adjustment of the phase information and the amplitude information.

3. The audio signal processing apparatus according to claim 1, wherein said adjusting unit is configured to adjust the phase information and the amplitude information depending on the adjustment factor indicating the frequency modulation rate such that the input audio signal sequence being a frequency modulated at the frequency modulation rate can be obtained from the Quadrature Mirror Filter coefficients after the adjustment of the phase information and the amplitude information.

4. The audio signal processing apparatus according to claim 1, wherein said filter bank performs sequential transform of the input audio signal sequence into the Quadrature Mirror Filter coefficients in units of time intervals of input audio signals of the input audio signal sequence to generate the Quadrature Mirror Filter coefficients based on the time intervals, and said adjusting unit includes:

a calculating circuit which calculates the phase information for each of the time slots of the Quadrature Mirror Filter coefficients and for each of the sub-bands of the Quadrature Mirror Filter coefficients, the Quadrature Mirror Filter coefficients being generated based on the time intervals; and an adjusting circuit which adjusts the phase information for each of the time slots and for each of the sub-bands using the adjustment factor.

5. The audio signal processing apparatus according to claim 4, wherein said adjusting circuit adjusts the phase information for each of the time slots, by adding, for each of the sub-bands, (a) a value calculated depending on the phase information of a starting time slot of the Quadrature Mirror Filter coefficients and the adjustment factor to (b) the phase information for each of the time slots.

6. The audio signal processing apparatus according to claim 4, wherein said calculating circuit further calculates the amplitude information for each of the time slots of the Quadrature Mirror Filter coefficients and each of the sub-bands of the Quadrature Mirror Filter coefficients, the Quadrature Mirror Filter coefficients being generated based on the time intervals, and said adjusting circuit adjusts the amplitude information for each of the time slots and for each of the sub-bands using the adjustment factor.

7. The audio signal processing apparatus according to claim 1, wherein said adjusting unit further includes a bandwidth restricting unit configured to extract, from the Quadrature Mirror Filter coefficients, new Quadrature Mirror Filter coefficients corresponding to a predetermined bandwidth, either before or after the adjustment of the phase information and the amplitude information.

8. The audio signal processing apparatus according to claim 1, wherein, for each of the sub-bands, said adjusting unit is configured to adjust the phase information and the amplitude information by weighting a rate for the adjustment of the phase information and the amplitude information.

9. The audio signal processing apparatus according to claim 1, wherein said adjusting unit further includes a domain transformer which transforms the Quadrature Mirror Filter coefficients into new Quadrature Mirror Filter coefficients having a different time resolution and a different frequency resolution, either before or after the adjustment of the phase information and the amplitude information.

10. The audio signal processing apparatus according to claim 1, wherein said adjusting unit is configured to adjust the Quadrature Mirror Filter coefficients by detecting a transient component included in the Quadrature Mirror Filter coefficients before the adjustment of the phase information and the amplitude information, extracting the detected transient component from the Quadrature Mirror Filter coefficients before the adjustment of the phase information and the amplitude information, adjusting the extracted transient component, and returning the adjusted transient component to the Quadrature Mirror Filter coefficients after the adjustment of the phase information and the amplitude information.

11. The audio signal processing apparatus according to claim 1, further comprising:

a high frequency generating unit configured to generate, from the Quadrature Mirror Filter coefficients after the adjustment of the phase information and the amplitude information by using a predetermined transform factor, high frequency coefficients that are new Quadrature Mirror Filter coefficients corresponding to a frequency bandwidth higher than a frequency bandwidth corresponding to the Quadrature Mirror Filter coefficients before the adjustment of the phase information and the amplitude information; and a high frequency complementing unit configured to complement a coefficient of a bandwidth without any high frequency coefficients using the high frequency coefficients, the bandwidth without any high frequency coefficients being a bandwidth which is included in the high frequency bandwidth and for which no high frequency coefficients has been generated by said high frequency generating unit.

12. An audio encoding apparatus which encodes a first audio signal sequence, said audio encoding apparatus comprising:

a first filter bank which transforms the first audio signal sequence into first Quadrature Mirror Filter coefficients using a filter for Quadrature Mirror Filter analysis;

a down-sampling unit configured to down-sample the first audio signal sequence to generate a second audio signal sequence;

a first encoding unit configured to encode the second audio signal sequence;

a second filter bank which transforms the second audio signal sequence into second Quadrature Mirror Filter coefficients using the filter for the Quadrature Mirror Filter analysis;

an adjusting unit configured to (i) calculate phase information and amplitude information of the second Quadrature Mirror Filter coefficients for each of a plurality of time slots of the second Quadrature Mirror Filter coefficients and for each of a plurality of sub-bands of the second Quadrature Mirror Filter coefficients, and (ii) adjust the phase information and the amplitude information using, for each of the time slots and for each of the sub-bands, an adjustment factor indicating at least one of a predetermined time stretch or compression rate and a predetermined frequency modulation rate such that the second audio signal sequence being (a) time stretched at the time stretch or compressed at the compression rate or (b) frequency modulated at the frequency modulation rate can be obtained from the second Quadrature Mirror Filter coefficients;

a second encoding unit configured to generate a parameter to be used for decoding by comparing the first Quadrature Mirror Filter coefficients and the second Quadrature Mirror Filter coefficients after the adjustment of the phase information and the amplitude information, and encode the parameter; and a superimposing unit configured to superimpose the encoded second audio signal sequence and the encoded parameter.

13. An audio decoding apparatus which decodes a first audio signal sequence in an input bitstream, said audio decoding apparatus comprising:

a demultiplexing unit configured to demultiplex the input bitstream into an encoded parameter and an encoded second audio signal sequence;

a first decoding unit configured to decode the encoded parameter;

a second decoding unit configured to decode the encoded second audio signal sequence;

a first filter bank which transforms the second audio signal sequence decoded by said second decoding unit into Quadrature Mirror Filter coefficients using a filter for Quadrature Mirror Filter analysis;

an adjusting unit configured to (i) calculate phase information and amplitude information of the Quadrature Mirror Filter coefficients for each of a plurality of time slots of the Quadrature Mirror Filter coefficients and for each of a plurality of sub-bands of the Quadrature Mirror Filter coefficients, and (ii) adjust the phase information and the amplitude information using, for each of the time slots and for each of the sub-bands, an adjustment factor indicating at least one of a predetermined time stretch or compression rate and a predetermined frequency modulation rate such that the second audio signal sequence being (a) time stretched at the time stretch or compressed at the compression rate or (b) frequency modulated at the frequency modulation rate can be obtained from the Quadrature Mirror Filter coefficients;

a high frequency generating unit configured to generate, from the Quadrature Mirror Filter coefficients after the adjustment of the phase information and the amplitude information by using the decoded parameter, high frequency coefficients that are new Quadrature Mirror Filter coefficients corresponding to a frequency bandwidth higher than a frequency bandwidth corresponding to the Quadrature Mirror Filter coefficients before the adjustment of the phase information and the amplitude information; and a second filter bank which transforms the high frequency coefficients and the Quadrature Mirror Filter coefficients before the adjustment of the phase information and the amplitude information into the first audio signal sequence in a time domain, using a filter for Quadrature Mirror Filter synthesis.

14. An audio signal processing method for transforming an input audio signal sequence according to at least one of (i) a predetermined time stretch or compression rate and (ii) a predetermined frequency modulation rate, said audio signal processing method comprising:

transforming the input audio signal sequence into Quadrature Mirror Filter coefficients using a filter for Quadrature Mirror Filter analysis; and (i) calculating phase information and amplitude information of the Quadrature Mirror Filter coefficients for each of a plurality of time slots of the Quadrature Mirror Filter coefficients and for each of a plurality of sub-bands of the Quadrature Mirror Filter coefficients, and (ii) adjusting the phase information and the amplitude information using, for each of the time slots and for each of the sub-bands, an adjustment factor indicating the at least one of the time stretch or compression rate and the frequency modulation rate such that the input audio signal sequence being (a) time stretched at the time stretch or compressed at the compression rate or (b) frequency modulated at the frequency modulation rate can be obtained from the Quadrature Mirror Filter coefficients.

15. An audio encoding method for encoding a first audio signal sequence, said audio encoding method comprising:

transforming the first audio signal sequence into first Quadrature Mirror Filter coefficients using a filter for Quadrature Mirror Filter analysis;

down-sampling the first audio signal sequence to generate a second audio signal sequence;

encoding the second audio signal sequence;

transforming the second audio signal sequence into second Quadrature Mirror Filter coefficients using the filter for the Quadrature Mirror Filter analysis;

(i) calculating phase information and amplitude information of the second Quadrature Mirror Filter coefficients for each of a plurality of time slots of the second Quadrature Mirror Filter coefficients and for each of a plurality of sub-bands of the second Quadrature Mirror Filter coefficients, and (ii) adjusting the phase information and the amplitude information using, for each of the time slots and for each of the sub-bands, an adjustment factor indicating at least one of a predetermined time stretch or compression rate and a predetermined frequency modulation rate such that the second audio signal sequence being (a) time stretched at the time stretch or compressed at the compression rate or (b) frequency modulated at the frequency modulation rate can be obtained from the second Quadrature Mirror Filter coefficients;

generating a parameter to be used for decoding by comparing the first Quadrature Mirror Filter coefficients and the second Quadrature Mirror Filter coefficients after the adjustment of the phase information and the amplitude information, and encoding the parameter; and superimposing the encoded second audio signal sequence and the encoded parameter.

16. An audio decoding method for decoding a first audio signal sequence in an input bitstream, said audio decoding method comprising:

demultiplexing the input bitstream into an encoded parameter and an encoded second audio signal sequence;

decoding the encoded parameter;

decoding the encoded second audio signal sequence;

transforming the second audio signal sequence decoded in said decoding into Quadrature Mirror Filter coefficients using a filter for Quadrature Mirror Filter analysis;

(i) calculating phase information and amplitude information of the Quadrature Mirror Filter coefficients for each of a plurality of time slots of the Quadrature Mirror Filter coefficients and for each of a plurality of sub-bands of the Quadrature Mirror Filter coefficients, and (ii) adjusting the phase information and the amplitude information using, for each of the time slots and for each of the sub-bands, an adjustment factor indicating at least one of a predetermined time stretch or compression rate and a predetermined frequency modulation rate such that the second audio signal sequence being (a) time stretched at the time stretch or compressed at the compression rate or (b) frequency modulated at the frequency modulation rate can be obtained from the Quadrature Mirror Filter coefficients;

generating, from the Quadrature Mirror Filter coefficients after the adjustment of the phase information and the amplitude information by using the decoded parameter, high frequency coefficients that are new Quadrature Mirror Filter coefficients corresponding to a frequency bandwidth higher than a frequency bandwidth corresponding to the Quadrature Mirror Filter coefficients before the adjustment of the phase information and the amplitude information; and transforming the high frequency coefficients and the Quadrature Mirror Filter coefficients before the adjustment of the phase information and the amplitude information into the first audio signal sequence in a time domain, using a filter for Quadrature Mirror Filter synthesis.

17. A non-transitory computer-readable recording medium having a program recorded thereon, the program causing a computer to execute the audio signal processing method according to claim 14.

18. A non-transitory computer-readable recording medium having a program recorded thereon, the program causing a computer to execute the audio encoding method according to claim 15.

19. A non-transitory computer-readable recording medium having a program recorded thereon, the program causing a computer to execute the audio decoding method according to claim 16.

20. An integrated circuit which transforms an input audio signal sequence according to at least one of (i) a predetermined time stretch or compression rate and (ii) a predetermined frequency modulation rate, said integrated circuit comprising:

a filter bank which transforms the input audio signal sequence into Quadrature Mirror Filter coefficients using a filter for Quadrature Mirror Filter analysis; and an adjusting unit configured to (i) calculate phase information and amplitude information of the Quadrature Mirror Filter coefficients for each of a plurality of time slots of the Quadrature Mirror Filter coefficients and for each of a plurality of sub-bands of the Quadrature Mirror Filter coefficients, and (ii) adjust the phase information and the amplitude information using, for each of the time slots and for each of the sub-bands, an adjustment factor indicating the at least one of the time stretch or compression rate and the frequency modulation rate such that the input audio signal sequence being (a) time stretched at the time stretch or compressed at the compression rate or (b) frequency modulated at the frequency modulation rate can be obtained from the Quadrature Mirror Filter coefficients.

21. An integrated circuit which encodes a first audio signal sequence, said integrated circuit comprising:

a first filter bank which transforms the first audio signal sequence into first Quadrature Mirror Filter coefficients using a filter for Quadrature Mirror Filter analysis;

a down-sampling unit configured to down-sample the first audio signal sequence to generate a second audio signal sequence;

a first encoding unit configured to encode the second audio signal sequence;

a second filter bank which transforms the second audio signal sequence into second Quadrature Mirror Filter coefficients using the filter for the Quadrature Mirror Filter analysis;

an adjusting unit configured to (i) calculate phase information and amplitude information of the second Quadrature Mirror Filter coefficients for each of a plurality of time slots of the second Quadrature Mirror Filter coefficients and for each of a plurality of sub-bands of the second Quadrature Mirror Filter coefficients, and (ii) adjust the phase information and the amplitude information using, for each of the time slots and for each of the sub-bands, an adjustment factor indicating at least one of a predetermined time stretch or compression rate and a predetermined frequency modulation rate such that the second audio signal sequence being (a) time stretched at the time stretch or compressed at the compression rate or (b) frequency modulated at the frequency modulation rate can be obtained from the second Quadrature Mirror Filter coefficients;

a second encoding unit configured to generate a parameter to be used for decoding by comparing the first Quadrature Mirror Filter coefficients and the second Quadrature Mirror Filter coefficients after the adjustment of the phase information and the amplitude information, and encode the parameter; and a superimposing unit configured to superimpose the encoded second audio signal sequence and the encoded parameter.

22. An integrated circuit which decodes a first audio signal sequence in an input bitstream, said integrated circuit comprising:

a demultiplexing unit configured to demultiplex the input bitstream into an encoded parameter and an encoded second audio signal sequence;

a first decoding unit configured to decode the encoded parameter;

a second decoding unit configured to decode the encoded second audio signal sequence;

a first filter bank which transforms the second audio signal sequence decoded by said second decoding unit into Quadrature Mirror Filter coefficients using a filter for Quadrature Mirror Filter analysis;

an adjusting unit configured to (i) calculate phase information and amplitude information of the Quadrature Mirror Filter coefficients for each of a plurality of time slots of the Quadrature Mirror Filter coefficients and for each of a plurality of sub-bands of the Quadrature Mirror Filter coefficients, and (ii) adjust the phase information and the amplitude information using, for each of the time slots and for each of the sub-bands, an adjustment factor indicating at least one of a predetermined time stretch or compression rate and a predetermined frequency modulation rate such that the second audio signal sequence being (a) time stretched at the time stretch or compressed at the compression rate or (b) frequency modulated at the frequency modulation rate can be obtained from the Quadrature Mirror Filter coefficients;

a high frequency generating unit configured to generate, from the Quadrature Mirror Filter coefficients after the adjustment of the phase information and the amplitude information by using the decoded parameter, high frequency coefficients that are new Quadrature Mirror Filter coefficients corresponding to a frequency bandwidth higher than a frequency bandwidth corresponding to the Quadrature Mirror Filter coefficients before the adjustment of the phase information and the amplitude information; and a second filter bank which transforms the high frequency coefficients and the Quadrature Mirror Filter coefficients before the adjustment of the phase information and the amplitude information into the first audio signal sequence in a time domain, using a filter for Quadrature Mirror Filter synthesis.

* * * * *